United States Patent
Rieder et al.

(10) Patent No.: US 8,596,143 B2
(45) Date of Patent: *Dec. 3, 2013

(54) MEASURING SYSTEM HAVING A MEASURING TRANSDUCER OF VIBRATION-TYPE

(75) Inventors: Alfred Rieder, Landshut (DE); Hao Zhu, Freising (DE); Ennio Bitto, Aesch (CH); Christian Schutze, Basel (CH); Christof Huber, Bern (CH); Marcel Braun, Inzlingen (DE)

(73) Assignee: Endress + Hauser Flowtec AG, Reinach (CH)

( * ) Notice: Subject to any disclaimer, the term of this patent is extended or adjusted under 35 U.S.C. 154(b) by 137 days.

This patent is subject to a terminal disclaimer.

(21) Appl. No.: 13/233,587

(22) Filed: Sep. 15, 2011

(65) Prior Publication Data

US 2012/0090407 A1    Apr. 19, 2012

Related U.S. Application Data

(60) Provisional application No. 61/344,696, filed on Sep. 16, 2010.

(30) Foreign Application Priority Data

Sep. 16, 2010  (DE) .......................... 10 2010 045 484

(51) Int. Cl.
  *G01F 1/84* (2006.01)
(52) U.S. Cl.
  USPC .................................................. 73/861.357
(58) Field of Classification Search
  USPC ................ 73/861.355, 861.356, 861.357
  See application file for complete search history.

(56) References Cited

U.S. PATENT DOCUMENTS

| 2012/0073384 A1* | 3/2012 | Rieder ...................... 73/861.355 |
| 2012/0090407 A1* | 4/2012 | Rieder et al. ............. 73/861.357 |

FOREIGN PATENT DOCUMENTS

| DE | 19634663 A1 | 3/1997 |
| DE | 102004056235 A1 | 5/2006 |
| DE | 102005013770 A1 | 6/2006 |
| EP | 2159552 A1 | 3/2010 |
| WO | WO 96/08697 | 3/1996 |
| WO | WO 02/52230 A1 | 7/2002 |

OTHER PUBLICATIONS

English translation of IPR, WIPO, Geneva, Switzerland, Mar. 28, 2013.
EPO Search Report.

* cited by examiner

*Primary Examiner* — Jewel V Thompson
(74) *Attorney, Agent, or Firm* — Bacon & Thomas, PLLc

(57) ABSTRACT

A measuring system comprises: a measuring transducer for producing oscillation measurement signals; and transmitter electronics electrically coupled with the measuring transducer for activating the measuring transducer and for evaluating oscillation measurement signals delivered by the measuring transducer. The measuring transducer includes: a transducer housing, a first housing end housing end, first flow divider having exactly four flow openings, an outlet-side, second housing end formed by means of an outlet-side, second flow divider having exactly four flow openings mutually spaced from one another, and a tube arrangement having exactly four, straight, measuring tubes forming flow paths arranged for parallel flow and connected to the flow dividers, an electromechanical exciter mechanism for producing and/or maintaining mechanical oscillations of the four measuring tubes and a vibration sensor arrangement reacting to vibrations of the measuring tubes.

90 Claims, 12 Drawing Sheets

MEASURING SYSTEM HAVING A MEASURING TRANSDUCER OF VIBRATION-TYPE

CROSS-REFERENCE TO RELATED APPLICATION

This application is a nonprovisional which claims the benefit of U.S. Provisional Application 61/344,696, filed on Sep. 16, 2010.

TECHNICAL FIELD

The invention relates to a measuring transducer of vibration-type for measuring a medium flowably guided in a pipeline, especially a gas, liquid, powder or other flowable material, especially for measuring density and/or mass flow rate, especially also a mass flow integrated over a time interval, of a medium flowing in a pipeline, at least at times, with mass flow rate of more than 400 t/h, especially more than 1000 t/h. Additionally, the invention relates to a measuring system having such a measuring transducer.

BACKGROUND DISCUSSION

Often used in process measurements and automation, technology for measuring physical parameters, such as e.g. mass flow, density and/or viscosity, of media flowing in pipelines are measuring systems, most often in the form of in-line measuring devices of compact construction, which, by means of a measuring transducer of vibration-type, through which medium flows, and a measuring, and driver, circuit connected thereto, effect, in the medium, reaction forces, such as e.g. Coriolis forces corresponding with mass flow of the medium, inertial forces corresponding with density of the medium and/or frictional forces corresponding with viscosity of the medium, etc., and produce, derived from these, a measurement signal representing the particular mass flow, viscosity and/or density of the medium. Such measuring transducers, especially measuring transducers embodied as Coriolis, mass flow meters or Coriolis, mass flow/densimeters, are described in detail e.g. in U.S. Pat. No. 4,793,191, U.S. Pat. No. 4,823, 614, U.S. Pat. No. 4,831,885, U.S. Pat. No. 5,602,345, US-A 2007/0151368, US-A 2010/0050783, WO-A 96/08697, WO-A 2009/120222 or WO-A 2009/120223.

Measuring transducers of the type being discussed here include a transducer housing, of which an inlet-side, first housing end is formed at least partially by means of a first flow divider having exactly two, mutually spaced, circularly cylindrical, or tapered or conical, flow openings and an outlet-side, second housing end is formed at least partially by means of a second flow divider having exactly two, mutually spaced, flow openings. As shown in U.S. Pat. No. 5,602,345 or WO-A 96/08697, the transducer housing can be formed, for example, by means of a circularly cylindrical tube, in given cases, also a rather thick-walled, circularly cylindrical tube.

For guiding the medium, which flows, at least at times, each of the aforementioned measuring transducers includes, furthermore, in each case, two or more—in US-A 2010/0050783, or WO-A 96/08697, namely, exactly four straight, measuring tubes, which are connected such that the medium can flow in parallel. The measuring tubes are made of metal, for example titanium, zirconium or tantalum and positioned within the transducer housing and held oscillatably therein by means of the aforementioned flow dividers.

In the case of measuring transducers shown in US-A 2010/0050783 or WO-A 96/08697 with exactly four, equally-constructed, straight measuring tubes extending parallel relative to one another, a first of the measuring tubes opens with an inlet-side, first, measuring tube end into a first flow opening of the inlet-side, first flow divider and with an outlet-side, second measuring tube end into a first flow opening of the outlet-side, second flow divider, a second of the measuring tubes opens with an inlet-side, first measuring tube end into a second flow opening of the first flow divider and with an outlet-side, second measuring tube end into a second flow opening of the second flow divider, a third of the measuring tubes opens with an inlet-side, first, measuring tube end into a third flow opening of the inlet-side, first flow divider and with an outlet-side, second measuring tube end into a third flow opening of the outlet-side, second flow divider, and a fourth of the measuring tubes opens with an inlet-side, first measuring tube end into a fourth flow opening of the first flow divider and with an outlet-side, second measuring tube end into a fourth flow opening of the second flow divider. Each of the flow dividers includes additionally, in each case, a flange with a sealing surface for fluid tight connecting of the measuring transducer to tubular segments of the pipeline serving, respectively, for supplying and for removing medium to and from the measuring transducer.

For producing the above discussed reaction forces, the measuring tubes of vibration type are caused to vibrate during operation, about their respective static rest positions, driven by an exciter mechanism serving for producing, or maintaining, as the case may be, mechanical oscillations, especially bending oscillations, of the measuring tubes in the so-called wanted mode. The oscillations in the wanted mode are, most often, especially in the case of application of the measuring transducer as a Coriolis, mass flow meter and/or densimeter, developed, at least partially, as lateral bending oscillations and, in the case of medium flowing through the measuring tubes, as a result of therein induced Coriolis forces, as additional, equal frequency oscillations superimposed in the so-called Coriolis mode. Accordingly, the—here most often electrodynamic—exciter mechanism is embodied in such a manner, that, therewith, the two measuring tubes—in the case of four measuring tubes, in each case, two of the measuring tubes of one of the two measuring tube pairs—are excitable in the wanted mode, at least partially, especially also predominantly, to opposite equal bending oscillations in a common plane of oscillation—most often, the tubes are excitable differentially, thus through introduction of exciter forces acting simultaneously along a shared line of action, however, in opposed directions.

For registering vibrations of the measuring tubes, especially also the oscillations actively excited by means of the exciter mechanism in the wanted mode and for producing oscillation measurement signals representing vibrations, the measuring transducers have, additionally, in each case, a, most often, likewise electrodynamic, vibration sensor arrangement reacting to relative movements of the measuring tubes. Typically, the vibration sensor arrangement is formed by means of an inlet-side, oscillation sensor registering oscillations of the measuring tubes, as, among other things, also shown in US-A 2010/0050783, or WO-A 96/08697, differentially—thus only relative movements of the measuring tubes—as well as by means of an outlet-side, oscillation sensor also registering oscillations of the measuring tubes differentially. Each of the oscillation sensors, which are usually constructed equally with one another, is, in such case, formed by means of a permanent magnet held on the first measuring tube and a cylindrical coil held on the second measuring tube and permeated by the magnetic field of the permanent magnet.

In operation, the above described inner part of the measuring transducer, here, thus, an inner part formed by means of the two, or four, measuring tubes and the exciter mechanism and vibration sensor arrangement held thereto, is excited by means of the electromechanical exciter mechanism, at least at times, to execute mechanical oscillations in the wanted mode at least one dominating, wanted, oscillation frequency. Selected as oscillation frequency for the oscillations in the wanted mode is, in such case, usually a natural, instantaneous, resonance frequency of the inner part, which, in turn, depends essentially both on size, shape and material of the measuring tubes as well as also on an instantaneous density of the medium; in given cases, this wanted oscillation frequency can also be influenced significantly by an instantaneous viscosity of the medium. As a result of fluctuating density of the medium being measured and/or as a result of media change occurring during operation, the wanted oscillation frequency during operation of the measuring transducer varies naturally, at least within a calibrated and, thus, predetermined, wanted frequency band, which correspondingly has a predetermined lower, and a predetermined upper, limit frequency.

For defining a wanted oscillation length of the measuring tubes and, associated therewith, for adjusting the band of the wanted frequency, measuring transducers of the above described type include, additionally, most often, at least one inlet-side, coupling element, which is affixed to both measuring tubes and spaced from the two flow dividers, for forming inlet-side, oscillation nodes for opposite equal vibrations, especially bending oscillations, of the measuring tubes, as well as at least one outlet-side, coupling element, which is affixed to both measuring tubes and spaced both from the two flow dividers, as well as also from the inlet-side, coupling element, for forming outlet-side, oscillation nodes for opposite equal vibrations, especially bending oscillations, of the measuring tubes. In such case, a minimum separation between inlet-side and outlet side coupling elements, which thus also belong to the inner part, corresponds to the wanted oscillation length of the measuring tubes. By means of the coupling elements, additionally also an oscillation quality factor of the inner part, as well as also the sensitivity of the measuring transducer, in total, can be influenced, in a manner such that, for a minimum required sensitivity of the measuring transducer, at least one minimum, wanted oscillation length is provided.

Development in the field of measuring transducers of vibration-type has, in the meantime, reached a level, wherein modern measuring transducers of the described type can, for a broad application spectrum of flow measurement technology, satisfy highest requirements as regards precision and reproducibility of the measurement results. Thus, such measuring transducers are, in practice, applied for mass flow rates from some few g/h (gram per hour) up to some t/min (tons per minute), at pressures of up to 100 bar for liquids or even over 300 bar for gases. The accuracy of measurement achieved, in such case, lies usually at about 99.9% of the actual value, or above, or at a measuring error of about 0.1%, wherein a lower limit of the guaranteed measurement range can lie quite easily at about 1% of the measurement range end value. Due to the high bandwidth of their opportunities for use, industrial grade measuring transducers of vibration-type are available with nominal diameters (corresponding to the caliber of the pipeline to be connected to the measuring transducer, or corresponding to the caliber of the measuring transducer measured at the connecting flange), which lie in a nominal diameter range between 1 mm and 250 mm and at maximum nominal mass flow rate of 2200 t/h, in each case, for pressure losses of less than 1 bar. A caliber of the measuring tubes lies, in such case, for instance, in a range between 80 mm and 100 mm.

In spite of the fact that, in the meantime, measuring transducers for use in pipelines with very high mass flow rates and, associated therewith, very large calibers of far beyond 100 mm have become available, there is still considerable interest in obtaining measuring transducers of high precision and low pressure loss also for yet larger pipeline calibers, about 300 mm or more, or mass flow rates of 2500 t/h or more, for instance for applications in the petrochemical industry or in the field of transport and transfer of petroleum, natural gas, fuels, etc. This would, in the case of correspondingly scaled enlarging of the already established measuring transducer designs with two measuring tubes, as known from the state of the art, for instance, the above mentioned U.S. Pat. No. 4,793,191, U.S. Pat. No. 5,602,345, US-A 2007/0151368, WO-A 2009/120222, or WO-A 2009/120223, lead to the fact that the geometric dimensions would be exorbitantly large, especially the installed length corresponding to a distance between the sealing surfaces of both flanges, especially dimensions for the desired oscillation characteristics, the required mechanical load bearing ability (especially also for preventing possible deformations of the measuring transducer significant for the oscillatory behavior of the measuring tubes), as well as the maximum allowed pressure loss. Along with that, also the empty mass of the measuring transducer increases unavoidably, with conventional measuring transducers of large nominal diameter already having an empty mass of about 400 kg. Further investigations, which have been carried out for measuring transducers with two straight measuring tubes, constructed as regards their to-scale enlargement to still greater nominal diameters, have, for example, shown that, for nominal diameters of more than 300 mm, the empty mass of a to-scale enlarged, conventional measuring transducer would lie far above 600 kg, accompanied by an installed length of more than 3000 mm.

In the case of application of four straight measuring tubes, as a result of the measurement range end value, or expanded measurement range, increased as a result of the type of construction, it is true that, at first, indeed, a certain amount of reduction of the installed length of the measuring transducer can be achieved at equal nominal diameter, or equal pressure loss brought about by the measuring transducer. Insofar, thus a more powerful measuring system can be provided than is possible with established measuring transducers with two measuring tubes at comparable technical effort. However in the case of the measuring transducer concepts known from the state of the art with four straight measuring tubes, at least in the case of greater nominal diameters of over 100 mm, there is regretfully a comparatively higher (cross-) sensitivity of the zero-point for mass flow measurement to mechanical alternating loads, consequently pipeline vibrations or pressure fluctuations, introduced externally via the pipeline into the measuring transducer. This increased "mechanical" zero-point sensitivity is especially to be attributed to the facts that there is, in comparison to measuring transducers with two measuring tubes of equal nominal diameter, or comparable flow resistance, on the one hand, a larger contact area, via which oscillations of the measuring tubes are externally effectively influenceable—here, namely, practically the entire cross section of each of the flow dividers flowed through by medium during operation —, and, on the other hand, as a result of the flow dividers being more flexible in comparison to conventional flow dividers there is a more effective coupling created for outer mechanical disturbances. An opportunity to remove this increased zero-point sensitivity is then correspondingly to stiffen the transducer housing, consequently to increase its wall thicknesses and/or to provide additional stiffening elements. To achieve this, it would, however, be necessary also to bring back increased empty mass of the measuring transducer in considerable measure, consequently a mass to nominal diameter ratio of the measuring transducer, defined by a ratio of the empty mass of the measuring transducer to the nominal diameter of the measuring transducer, worsens, and, indeed, in such a measure that measuring transducers with four straight measuring tubes are no longer mentionably better than conventional measuring transducers, and can, in fact, even be worse.

SUMMARY OF THE INVENTION

Proceeding from the above, recounted state of the art, it is consequently an object of the invention to improve measuring systems formed by means of measuring transducers of vibration type toward the goal that they have, also in the case of large nominal diameters of over 100 mm and empty mass as small as possible, consequently in the case of an acceptable mass to nominal diameter ratio of less than 2 kg/mm, a stable mass flow zero point influenceable as little as possible by the pipeline. Moreover, the measuring system formed by means of the measuring transducer should have as little as possible cross-sensitivity to possible changes of stress conditions in the measuring transducer, for instance, as a result of temperature changes, or temperature gradients within the measuring transducer. Additionally, the measuring transducer, and consequently the measuring system formed therewith, should also, in the case of the use in applications with large mass flow rates of more as 400 t/h, be built as compactly as possible and bring about only low pressure losses of less than 2 bar.

For achieving the object, the invention resides in a measuring system for measuring density and/or mass flow rate, for example, also total mass flow totaled over a time interval and/or viscosity, of a medium, for instance, a gas, a liquid, a powder or other flowable material, flowing, at least at times, in a pipeline, for example, with mass flow rate of more than 400 t/h.

The measuring system embodied, for example, as an in-line measuring device and/or a measuring device of compact construction, comprises a measuring transducer of vibration type for producing oscillation measurement signals serving, for instance, for registering density and/or mass flow rate and/or viscosity.

The measuring transducer includes a transducer housing, for example, an essentially tubular and/or externally circularly cylindrical, transducer housing, of which an inlet-side, first housing end is formed by means of an inlet-side, first flow divider having exactly four, for example, circularly cylindrical, tapered or conical, flow openings spaced, in each case, from one another, and an outlet-side, second housing end is formed by means of an outlet-side, second flow divider having exactly four, for example, circularly cylindrical, tapered or conical, flow openings spaced, in each case, from one another, a tube arrangement with exactly four, straight, measuring tubes forming flow paths arranged for parallel flow and connected to the flow dividers, especially equally constructed flow dividers, for guiding flowing medium, for instance measuring tubes held oscillatably in the transducer housing only by means of said flow dividers and/or equally constructed measuring tubes and/or measuring tubes at least pairwise parallel relative to one another, of which a first measuring tube, for example a circularly cylindrical, first measuring tube, opens with an inlet-side, first measuring tube end into a first flow opening of the first flow divider and with an outlet-side, second measuring tube end into a first flow opening of the second flow divider, a second measuring tube, for example a circularly cylindrical, second measuring tube, opens with an inlet-side, first measuring tube end into a second flow opening of the first flow divider and with an outlet-side, second measuring tube end into a second flow opening of the second flow divider, a third measuring tube, for example a circularly cylindrical, third measuring tube, opens with an inlet-side, first measuring tube end into a third flow opening of the first flow divider and with an outlet-side, second measuring tube end into a third flow opening of the second flow divider, and a fourth measuring tube, for example a circularly cylindrical, fourth measuring tube, opens with an inlet-side, first measuring tube end into a fourth flow opening of the first flow divider and with an outlet-side, second measuring tube end into a fourth flow opening of the second flow divider.

an electromechanical exciter mechanism, for example, one formed by means of an electrodynamic, first oscillation exciter and/or a first oscillation exciter differentially exciting oscillations of the first measuring tube relative to the second measuring tube, for producing and/or maintaining mechanical oscillations, for example, bending oscillations, of the four measuring tubes, as well as a vibration sensor arrangement reacting to vibrations of the measuring tubes, especially also bending oscillations excited by means of the exciter mechanism, for example, an electrodynamic vibration sensor arrangement and/or one formed by means of oscillation sensors constructed equally to one another, for producing oscillation measurement signals representing vibrations, for example, bending oscillations, of the measuring tubes.

The four straight measuring tubes of the measuring system of the invention are additionally so embodied and so arranged in the measuring transducer that the tube arrangement has, lying both between the first measuring tube and the third measuring tube as well as also between the second measuring tube and the fourth measuring tube, a first imaginary longitudinal section plane, relative to which the tube arrangement is mirror symmetric, as well as, perpendicular to its imaginary first longitudinal section plane and extending both between the first measuring tube and second measuring tube as well as also between the third measuring tube and fourth measuring tube, a second imaginary longitudinal section plane, relative to which the tube arrangement is likewise mirror symmetric, and that a measuring tube length of each of the, for example, equally long, measuring tubes corresponding to a minimum distance between the flow opening of the first flow divider communicating with the respective inlet-side, first measuring tube end and the flow opening of the second flow divider communicating with the respective outlet-side second measuring tube end amounts to 1000 mm or more. Each of the four measuring tubes includes additionally a middle segment making up at least 40% of the measuring tube length, in which each of said measuring tubes has no mechanical connection with another of the measuring tubes and/or in which each of said measuring tubes is freely movable relative to the other measuring tubes.

Moreover, the measuring system comprises, electrically coupled with the measuring transducer, for example, arranged in an electronics housing mechanically connected with the transducer housing, a transmitter electronics for activating the measuring transducer, especially its exciter mechanism, and for evaluating oscillation measurement signals delivered by the measuring transducer.

The transmitter electronics, formed, for example, by means of a microcomputer and/or a digital signal processor, feeds electrical excitation power into the exciter mechanism during operation by means of at least one variable and/or at least at times periodic, electrical driver signal, for example, one with a variable maximum voltage level and/or a variable maximal electrical current level, for instance, an electrical driver signal having at least one signal frequency corresponding to an eigenfrequency of a natural mode of oscillation of the tube arrangement.

The exciter mechanism is additionally adapted to convert the electrical excitation power, for instance an electrical excitation power dependent on a voltage level and an electrical current level of the at least one driver signal, at least partially both into bending oscillations of the first measuring tube and into bending oscillations of the second measuring tube opposite-equal to the bending oscillations of the first measuring tube relative to the second imaginary longitudinal section plane of the tube arrangement, for example, also bending oscillations of the second measuring tube coplanar with the bending oscillations of the first measuring tube, as well as also into bending oscillations of the third measuring tube and into bending oscillations of the fourth measuring tube opposite-equal to the bending oscillations of the third measuring tube relative to the second imaginary longitudinal section plane of the tube arrangement, in such a manner, that the four measuring tubes, excited by the exciter mechanism, execute, at least partially, for example, also predominantly, bending oscillations in a natural, bending oscillation, fundamental mode of first type (V-mode) inherent to the tube arrangement, in which the first measuring tube and the second measuring tube execute, relative to the second imaginary longitudinal section plane, opposite equal, for example, thus coplanar and/or, relative to the second imaginary longitudinal section plane, symmetric, bending oscillations about, in each case, a static rest position associated with the respective measuring tube, and in which the third measuring tube and the fourth measuring tube execute, relative to the second imaginary longitudinal section plane, opposite equal, for example, coplanar and/or thus, relative to the second imaginary longitudinal section plane, symmetric, bending oscillations about, in each case, a static rest position associated with the respective measuring tube, in such a manner, that, relative to the second imaginary longitudinal section plane, said bending oscillations of the first measuring tube are thus opposite equal to said bending oscillations of the third measuring tube, and that, relative to the second imaginary longitudinal section plane, said bending oscillations of the second measuring tube are thus opposite equal to said bending oscillations of the fourth measuring tube.

According to a first embodiment of the invention, it is additionally provided that the middle segment of each of the four measuring tubes makes up at least 60% of the measuring tube length, $L_{18}$, and/or less than 90% of the measuring tube length, of the respective measuring tube.

According to a second embodiment of the invention, it is additionally provided that the exciter mechanism has at least a first oscillation exciter acting, e.g. differentially, on the first and second measuring tubes, for example, a first oscillation exciter affixed thereto and/or an electro-dynamic, first oscillation exciter, for converting electrical excitation power fed by means of the transmitter electronics into the exciter mechanism into mechanical exciter forces effecting bending oscillations of the first measuring tube, for example, variable and/or periodic bending oscillations having at least one signal frequency corresponding to an eigenfrequency of a natural mode of oscillation of the tube arrangement, as well as effecting bending oscillations of the second measuring tube opposite-equal to said bending oscillations of the first measuring tube relative to the second imaginary longitudinal section plane of the tube arrangement. Developing this embodiment of the invention further, it is additionally provided, that the exciter mechanism has, further, a second oscillation exciter acting, for example, differentially, on the third and fourth measuring tubes, for instance, a second oscillation exciter affixed thereto and/or an electro-dynamic, second oscillation exciter and/or one constructed equally to the first oscillation exciter and/or one connected electrically in series with the first oscillation exciter, for converting electrical excitation power fed by means of the transmitter electronics into the exciter mechanism into mechanical exciter forces effecting bending oscillations of the third measuring tube, for instance, variable and/or periodic bending oscillations having at least one signal frequency corresponding to an eigenfrequency of a natural mode of oscillation of the tube arrangement, as well as effecting bending oscillations of the fourth measuring tube opposite-equal to said bending oscillations of the third measuring tube relative to the second imaginary longitudinal section plane of the tube arrangement.

According to a third embodiment of the invention, it is additionally provided that the at least one driver signal has a plurality of signal components with signal frequencies differing from one another, and that at least one of the signal components, for instance, a signal component dominating as regards signal power, of the at least one driver signal has a signal frequency corresponding to an eigenfrequency of a natural mode of oscillation of the tube arrangement, for example, of the bending oscillation mode of first type, in which each of the four measuring tubes executes bending oscillations.

According to a fourth embodiment of the invention, it is additionally provided that the exciter mechanism effects oscillations of the measuring tubes, for instance, bending oscillations in the first bending oscillation mode of first type, by the feature that an exciter force generated by means of the first oscillation exciter and acting on the first measuring tube is oppositely directed, for example, opposite-equal, to an exciter force generated at the same time by means of the first oscillation exciter and acting on the second measuring tube.

According to a fifth embodiment of the invention, it is additionally provided that an eigenfrequency (for example, an eigenfrequency measurable in the case of tube arrangement completely filled with water) of the bending oscillation mode of first type differs from an eigenfrequency of a bending oscillation mode of second type likewise inherent to the tube arrangement, for example, an eigenfrequency of a bending oscillation mode of second type measurable in the case of tube arrangement completely filled with water and/or measurable at the same time as the eigenfrequency of the bending oscillation mode of first type, in which mode of second type the first measuring tube and the second measuring tube execute, relative to the second imaginary longitudinal section plane, opposite equal bending oscillations about, in each case, a static rest position associated with the respective measuring tube, and in which mode of second type the third measuring tube and the fourth measuring tube execute, relative to the second imaginary longitudinal section plane, opposite equal bending oscillations about, in each case, a static rest position associated with the respective measuring tube, in such a manner, that, relative to the second imaginary longitudinal section plane, said bending oscillations of the first measuring tube are thus opposite equal to said bending oscillations of the fourth measuring tube, and that, relative to the second imaginary longitudinal section plane, said bending oscillations of the second measuring tube are thus opposite equal to said bending oscillations of the third measuring tube. Thus, e.g., the eigenfrequencies differ in such a manner that said eigenfrequency of the bending oscillation mode of first type is greater by more than 10 Hz than said eigenfrequency of the bending oscillation mode of second type or that said eigenfrequency of the bending oscillation mode of first type is smaller by more than 10 Hz than said eigenfrequency of the bending oscillation mode of second type.

According to a sixth embodiment of the invention, it is additionally provided that the exciter mechanism is embodied or adapted in such a manner that a bending oscillation mode of second type (likewise inherent to the tube arrangement) is excitable, for example, also simultaneously with the bending oscillation mode of first type, in which bending oscillation mode of second type, the first measuring tube and the second measuring tube execute bending oscillations opposite-equal relative to the second imaginary longitudinal section plane about, in each case, a static rest position associated with the respective measuring tube, and in which the third measuring tube and the fourth measuring tube execute bending oscillations opposite-equal relative to the second imaginary longitudinal section plane about, in each case, a static rest position associated with the respective measuring tube, in such a manner, that, relative to the second imaginary longitudinal section plane, said bending oscillations of the first measuring tube are also opposite-equal to said bending oscillations of the fourth measuring tube, and that, relative to the second imaginary longitudinal section plane, said bending oscillations of the second measuring tube are also opposite-equal to said bending oscillations of the third measuring tube.

According to a seventh embodiment of the invention, it is additionally provided that each of the four measuring tubes, especially measuring tubes of equal caliber and/or equal length, has a caliber, which amounts to more than 60 mm, especially more than 80 mm.

According to an eighth embodiment of the invention, it is additionally provided that the first flow divider has a flange, especially a flange having mass of more than 50 kg, for connecting the measuring transducer to a tubular segment of the pipeline serving for supplying medium to the measuring transducer and the second flow divider has a flange, especially a flange having a mass of more than 50 kg, for connecting the measuring transducer to a segment of the pipeline serving for removing medium from the measuring transducer. Developing this embodiment of the invention further, each of the flanges has a sealing surface for fluid tight connecting of the measuring transducer with the, in each case, corresponding tubular segment of the pipeline, wherein a distance between the sealing surfaces of both flanges defines an installed length of the measuring transducer, especially an installed length amounting to more than 1200 mm and/or less than 3000 mm. Especially, the measuring transducer is additionally so embodied, that, in such case, a measuring tube length of the first measuring tube corresponding to a minimum separation between the first flow opening of the first flow divider and the first flow opening of the second flow divider is so selected that a measuring tube length to installed length ratio of the measuring transducer, as defined by a ratio of the measuring tube length of the first measuring tube to the installed length of the measuring transducer, amounts to more than 0.7, especially more than 0.8 and/or less than 0.95, and/or that a caliber to installed length ratio of the measuring transducer, as defined by a ratio of the caliber of the first measuring tube to the installed length of the measuring transducer, amounts to more than 0.02, especially more than 0.05 and/or less than 0.09. Alternatively thereto or in supplementation thereof, the measuring transducer is so embodied that a nominal diameter to installed length ratio of the measuring transducer, as defined by a ratio of the nominal diameter of the measuring transducer to the installed length of the measuring transducer, is smaller than 0.3, especially smaller than 0.2 and/or greater than 0.1, wherein the nominal diameter corresponds to a caliber of the pipeline, in whose course the measuring transducer is to be used.

In a ninth embodiment of the invention, it is additionally provided that the measuring tube length amounts to more than 1200 mm and/or less than 2000 mm.

In a tenth embodiment of the invention, it is additionally provided that each of the four measuring tubes, especially, four measuring tubes of equal caliber, is so arranged, that a smallest lateral separation of each of the four measuring tubes, especially, measuring tubes of equal length, from a housing side wall of the transducer housing is, in each case, greater than zero, especially, also greater than 3 mm and/or greater than twice a respective tube wall thickness; and/or that a smallest lateral separation between two neighboring measuring tubes amounts to, in each case, greater than 3 mm and/or greater than the sum of their respective tube wall thicknesses.

In an eleventh embodiment of the invention, it is additionally provided that each of the flow openings is so arranged that a smallest lateral separation of each of the flow openings from a housing side wall of the transducer housing amounts, in each case, to greater than zero, especially, also greater than 3 mm and/or greater than twice a smallest tube wall thickness of the measuring tubes; and/or that a smallest lateral separation between the flow openings amounts to greater than 3 mm and/or greater than twice a smallest tube wall thickness of the measuring tubes.

According to a twelfth embodiment of the invention, it is additionally provided that a mass ratio of an empty mass of the total measuring transducer to an empty mass of the first measuring tube is greater than 10, especially greater than 15 and smaller than 25.

In a thirteenth embodiment of the measuring transducer of the invention, it is additionally provided that an empty mass, $M_{18}$, of the first measuring tube, especially each of the measuring tubes, is greater than 20 kg, especially greater than 30 kg and/or smaller than 50 kg.

According to a fourteenth embodiment of the invention, it is additionally provided that an empty mass of the measuring transducer is greater than 200 kg, especially greater than 300 kg.

According to a fifteenth embodiment of the invention, it is additionally provided that a nominal diameter of the measuring transducer, which corresponds to a caliber of the pipeline, in whose course the measuring transducer is to be inserted, amounts to more than 100 mm, especially is greater than 300 mm. In advantageous manner, the measuring transducer is additionally so embodied that a mass to nominal diameter ratio of the measuring transducer, defined by a ratio of the empty mass of the measuring transducer to the nominal diameter of the measuring transducer is less than 2 kg/mm, especially less than 1 kg/mm and/or greater than 0.5 kg/mm.

According to a sixteenth embodiment of the invention, it is additionally provided that the four measuring tubes are of equal construction as regards material of their tube walls, and/or as regards their geometric tube dimensions, especially tube length, tube wall thickness, tube outer diameter and/or caliber.

According to a seventeenth embodiment of the invention, it is additionally provided that a material of the tube walls of the four measuring tubes is, at least partially, titanium and/or zirconium and/or duplex steel and/or super duplex steel.

According to an eighteenth embodiment of the invention, it is additionally provided that the transducer housing, flow dividers and tube walls of the measuring tubes are, in each case, steel, for example, stainless steel.

According to a nineteenth embodiment of the invention, it is additionally provided that the minimum bending oscillation, resonance frequencies at least of the first and second measuring tubes are essentially equal and the minimum bending oscillation, resonance frequencies at least of the third and fourth measuring tubes are essentially equal. In such case, the minimum bending oscillation, resonance frequencies of all four measuring tubes can be essentially equal or, however, also only pairwise equal.

According to a twentieth embodiment of the invention, it is additionally provided that the four flow openings of the first flow divider are so arranged that imaginary areal centers of gravity associated with cross sectional areas, especially circularly shaped, cross sectional areas, of the flow openings of the first flow divider form the vertices of an imaginary square, wherein said cross sectional areas lie in a shared imaginary, cutting plane of the first flow divider extending perpendicular to a longitudinal axis of the measuring transducer, especially a longitudinal axis parallel to a principal flow axis of the measuring transducer.

According to a twenty-first embodiment of the invention, it is additionally provided that the four flow openings of the second flow divider are so arranged that imaginary areal centers of gravity associated with cross sectional areas, especially circularly shaped, cross sectional areas, of the flow openings of the second flow divider form the vertices of an imaginary square, wherein said cross sectional areas lie in a shared imaginary, cutting plane of the second flow divider extending perpendicular to a longitudinal axis of the measuring transducer, especially a longitudinal axis parallel to a principal flow axis of the measuring transducer.

According to a twenty-second embodiment of the invention, it is additionally provided that a middle segment of the transducer housing is formed by means of a, for example, a circularly cylindrical, straight tube.

According to a twenty-third embodiment of the invention, it is additionally provided that the transducer housing is essentially tubular, for example, circularly cylindrical. In such case, it is additionally provided that the transducer housing has a largest housing inner diameter, which is greater than 150 mm, especially greater than 250 mm, especially in such a manner, that a housing to measuring tube inner diameter ratio of the measuring transducer, defined by a ratio of the largest housing inner diameter to a caliber of the first measuring tube is kept greater than 3, especially greater than 4 and/or less than 5, and/or that a housing inner diameter to nominal diameter ratio of the measuring transducer, defined by a ratio of the largest housing inner diameter to the nominal diameter of the measuring transducer is less than 1.5, especially less than 1.2 and/or greater than 0.9, wherein the nominal diameter corresponds to a caliber of the pipeline, in whose course the measuring transducer is to be used. The housing inner diameter to nominal diameter ratio of the measuring transducer can, in such case, in advantageous manner, for example, also be equal to one.

According to a twenty-fourth embodiment of the invention, it is additionally provided that the transmitter electronics, based on electrical excitation power converted in the exciter mechanism, generates a viscosity measured value representing viscosity of the flowing medium; and/or that the transmitter electronics, based on oscillation signals delivered by the measuring transducer, generates a mass flow measured value representing mass flow rate of the flowing medium and/or density measured value representing density of the flowing medium.

According to a twenty-fifth embodiment of the invention, it is additionally provided that the sensor arrangement is formed by means of an inlet-side, first oscillation sensor, especially an electrodynamic one and/or one differentially registering oscillations of the first measuring tube relative to the second measuring tube, as well as by an outlet-side, second oscillation sensor, especially an electrodynamic one and/or one differentially registering oscillations of the first measuring tube relative to the second measuring tube, especially in such a manner, that a measuring length of the measuring transducer corresponding to a minimum distance between the first oscillation sensor and the second oscillation sensor amounts to more than 500 mm, especially more than 600 mm and/or less than 1200 mm, and/or that a caliber to measuring length ratio of the measuring transducer, defined by a ratio of a caliber of the first measuring tube to the measuring length of the measuring transducer, amounts to more than 0.05, especially more than 0.09. Additionally, the first oscillation sensor can be formed by means of a permanent magnet held on the first measuring tube and a cylindrical coil permeated by the magnetic field of the permanent magnet and held on the second measuring tube, and the second oscillation sensor by means of a permanent magnet held on the first measuring tube and a cylindrical coil permeated by the magnetic field of the permanent magnet and held on the second measuring tube. Developing this embodiment of the invention further, it is additionally provided that the sensor arrangement is formed by means of an inlet-side, first oscillation sensor, especially an electrodynamic one and/or one differentially registering oscillations of the first measuring tube relative to the second measuring tube, by an outlet-side, second oscillation sensor, especially an electrodynamic one and/or one differentially registering oscillations of the first measuring tube relative to the second measuring tube, by an inlet-side, third oscillation sensor, especially an electrodynamic one and/or one differentially registering oscillations of the third measuring tube relative to the fourth measuring tube, as well as by an outlet-side, fourth oscillation sensor, especially an electrodynamic one and/or one differentially registering oscillations of the third measuring tube relative to the fourth measuring tube, especially in such a manner that a measuring length of the measuring transducer corresponding to a minimum distance between the first oscillation sensor and the second oscillation sensor amounts to more than 500 mm, especially more than 600 mm and/or less than 1200 mm, and/or that a caliber to measuring length ratio of the measuring transducer, defined by a ratio of a caliber of the first measuring tube to the measuring length of the measuring transducer, amounts to more than 0.05, especially more than 0.09. In such case, in advantageous manner, the first and third oscillation sensors can be interconnected electrically in series in such a manner that a common oscillation measurement signal represents shared inlet-side, oscillations of the first and third measuring tubes relative to the second and fourth measuring tubes, and/or the second and fourth oscillation sensors can be interconnected electrically in series in such a manner that a common oscillation measurement signal represents shared outlet-side, oscillations of the first and third measuring tubes relative to the second and fourth measuring tubes. Alternatively, or in supplementation, the first oscillation sensor can additionally be formed by means of a permanent magnet held on the first measuring tube and a cylindrical coil permeated by the magnetic field of the permanent magnet and held on the second measuring tube, and the second oscillation sensor by means of a permanent magnet held on the first measuring tube and a cylindrical coil permeated by the magnetic field of the permanent magnet and held on the second measuring tube, and/or the third oscillation sensor can be formed by means of a permanent magnet held on the third measuring tube and a cylindrical coil permeated by the magnetic field of the permanent magnet and held on the fourth measuring tube and the fourth oscillation sensor by means of a permanent magnet held on the third measuring tube and a cylindrical coil permeated by the magnetic field of the permanent magnet and held on the fourth measuring tube.

According to a twenty-sixth embodiment of the invention, it is additionally provided that the exciter mechanism is formed by means of a first oscillation exciter, especially an electrodynamic, first oscillation exciter and/or a first oscillation exciter differentially exciting oscillations of the first measuring tube relative to the second measuring tube.

Especially, the exciter mechanism, according to a first further development of the twenty-sixth embodiment of the invention, is formed by means of a second oscillation exciter, for example, an electrodynamic second oscillation exciter and/or a second oscillation exciter differentially exciting oscillations of the third measuring tube relative to the fourth measuring tube. In such case, it is additionally provided that the first and second oscillation exciters are interconnected electrically in series, in such a manner that a combined driver signal excites combined oscillations of the first and third measuring tubes relative to the second and fourth measuring tube. The oscillation exciter of the exciter mechanism can be formed, for example, by means of a permanent magnet held on the first measuring tube and a cylindrical coil permeated by the magnetic field of the permanent magnet and held on the second measuring tube, and wherein the second oscillation exciter is formed by means of a permanent magnet held on the third measuring tube and a cylindrical coil permeated by the magnetic field of the permanent magnet and held on the fourth measuring tube.

According to a first further development of the twenty-sixth embodiment of the invention, the measuring transducer further comprises: A first plate shaped, stiffening element, which, for tuning resonance frequencies of bending oscillations of the first measuring tube and of the third measuring tube in a third plane of oscillation essentially perpendicular to the first and/or second plane of oscillation, is affixed to the first measuring tube and to the third measuring tube, and, indeed, in each case, to a segment of the first and, respectively, third measuring tube lying between the first oscillation exciter and the first flow divider; a second plate shaped, stiffening element, which, for tuning resonance frequencies of bending oscillations of the second measuring tube and of the fourth measuring tube in a fourth plane of oscillation essentially perpendicular to the first and/or second plane of oscillation, is affixed to the second measuring tube and to the fourth measuring tube, and, indeed, in each case, to a segment of the second and, respectively, fourth measuring tube lying between the first oscillation exciter and the first flow divider; a third plate shaped, stiffening element, which, for tuning resonance frequencies of bending oscillations of the first measuring tube and of the third measuring tube in the third plane of oscillation, is affixed to the first measuring tube and to the third measuring tube, and, indeed, in each case, to a segment of the first and, respectively, third measuring tube lying between the first oscillation exciter and the second flow divider; as well as a fourth plate shaped, stiffening element, which, for tuning resonance frequencies of bending oscillations of the second measuring tube and of the fourth measuring tube in the fourth plane of oscillation is affixed to the second measuring tube and to the fourth measuring tube, and, indeed, in each case, to a segment of the second and, respectively, fourth measuring tube lying between the first oscillation exciter and the second flow divider.

The plate-shaped stiffening elements can, for the case, in which the sensor arrangement is formed by means of an inlet-side, first oscillation sensor and by means of an outlet-side, second oscillation sensor, be arranged e.g. in such a manner in the measuring transducer that the first plate-shaped stiffening element is affixed to the segment of the first measuring tube lying between the first oscillation sensor and the first flow divider, along one of the straight lateral surface elements of the segment—for instance, that nearest the third measuring tube—as well as to the segment of the third measuring tube lying between the first oscillation sensor and the first flow divider, along one of the straight lateral surface elements of the segment—for instance, that nearest the first measuring tube —, the second plate-shaped stiffening element is affixed to the segment of the second measuring tube lying between the first oscillation sensor and the first flow divider, along one of the straight lateral surface elements of the segment—for instance, that nearest the fourth measuring tube—as well as to the segment of the fourth measuring tube lying between the first oscillation sensor and the first flow divider, along one of the straight lateral surface elements of the segment—for instance, that nearest the second measuring tube —, the third plate-shaped stiffening element is affixed to the segment of the first measuring tube lying between the second oscillation sensor and the second flow divider, along one of the straight lateral surface elements of the segment—for instance, that nearest the third measuring tube—as well as to the segment of the third measuring tube lying between the second oscillation sensor and the second flow divider, along one of the straight lateral surface elements of the segment—for instance, that nearest the first measuring tube —, and the fourth plate-shaped stiffening element is affixed to the segment of the second measuring tube lying between the second oscillation sensor and the second flow divider, along one of the straight lateral surface elements of the segment —, for instance, that nearest the fourth measuring tube—as well as to the segment of the fourth measuring tube lying between the second oscillation sensor and the second flow divider, along one of the straight lateral surface elements of the segment—for instance, that nearest the second measuring tube. Additionally, it is, in such case, provided that each of the four plate-shaped stiffening elements, for example, plate-shaped stiffening elements constructed equally to one another, is so embodied and so placed in the measuring transducer that it has, corresponding to a smallest distance between the lateral surface elements of those two measuring tubes, along which it is, in each case, affixed, a width, which is smaller (especially by more than half) than a length of said plate-shaped stiffening element measured in the direction of said lateral surface elements. In supplementation thereto, each of the four plate-shaped stiffening elements can additionally, in each case, be so embodied that the length of each of the plate-shaped stiffening elements is greater (especially by more than the twice) than a thickness of the said plate-shaped stiffening element.

According to a first further development of the invention, the measuring transducer further comprises: A first coupling element of first type, especially a plate-shaped, first coupling element of first type, which, for forming inlet-side, oscillation nodes at least for vibrations, especially bending oscillations, of the first measuring tube and for thereto opposite phase vibrations, especially bending oscillations, of the second measuring tube, is spaced both from the first flow divider as well as also from the second flow divider and affixed on the inlet side at least to the first measuring tube and to the second measuring tube; as well as a second coupling element of first type, especially a plate-shaped, second coupling element of first type and/or one constructed equally to the first coupling element and/or parallel to the first coupling element, which, for forming outlet-side oscillation nodes at least for vibrations, especially bending oscillations, of the first measuring tube and for thereto opposite phase vibrations, especially bending oscillations, of the second measuring tube, is spaced both from the first flow divider as well as also from the second flow divider, as well as also from the first coupling element, and affixed on the outlet side at least to the first measuring tube and to the second measuring tube.

According to a first embodiment of the first further development of the invention, it is additionally provided that all four measuring tubes are mechanically connected with one another by means of the first coupling element of first type as well as by means of the second coupling element of first type.

According to a second embodiment of the first further development of the invention, it is additionally provided that the first coupling element of first type is plate shaped, especially in such a manner that it has a rectangular, square, round, cross-, or X-shaped or H-shaped, basic shape.

According to a third embodiment of the first further development of the invention, it is additionally provided that the second coupling element of first type, especially one embodied equally as the first coupling element of first type, is plate shaped, especially in such a manner that it has a rectangular, square, round, cross-, or X-shaped or H-shaped, basic shape.

According to a fourth embodiment of the first further development of the invention, it is additionally provided that the first coupling element of first type is affixed also to the third measuring tube and to the fourth measuring tube, and that the second coupling element of first type is affixed to the third measuring tube and to the fourth measuring tube.

According to a fifth embodiment of the first further development of the invention, it is additionally provided that a center of mass of the first coupling element of first type has a distance to a center of mass of the measuring transducer, which is essentially equal to a distance of a center of mass of the second coupling element of first type to said center of mass of the measuring transducer.

According to a sixth embodiment of the first further development of the invention, the measuring transducer is additionally so embodied that a wanted oscillation length, $L_{18x}$, of the first measuring tube, especially of each of the measuring tubes, corresponding to a minimum distance between the first coupling element of first type and the second coupling element of first type amounts to less than 2500 mm, especially less than 2000 mm and/or more than 800 mm. Especially, the measuring transducer is, in such case, additionally so embodied that each of the four measuring tubes, especially measuring tubes of equal caliber and/or equal length, has a caliber, which amounts to more than 60 mm, especially more than 80 mm, especially in such a manner that a caliber to oscillatory length ratio of the measuring transducer, defined by a ratio of the caliber of the first measuring tube to the wanted oscillation length of the first measuring tube, amounts to more than 0.07, especially more than 0.09 and/or less than 0.15.

In supplementation to the first further development of the invention, it is additionally provided that the measuring transducer further comprises: A third coupling element of first type, for example, a plate-shaped, third coupling element of first type, which, for forming inlet-side oscillation nodes at least for vibrations, especially bending oscillations, of the third measuring tube and for thereto opposite phase vibrations, especially bending oscillations, of the fourth measuring tube, is spaced both from the first flow divider as well as also from the second flow divider and affixed on the inlet side at least to the third measuring tube and to the fourth measuring tube; as well as a fourth coupling element of first type, for example, a plate-shaped, fourth coupling element of first type, which, for forming outlet-side oscillation nodes at least for vibrations, especially bending oscillations, of the third measuring tube and for thereto opposite phase vibrations, especially bending oscillations, of the fourth measuring tube, is spaced both from the first flow divider as well as also from the second flow divider, as well as also from the third coupling element of first type, and affixed on the outlet side at least to the third measuring tube and to the fourth measuring tube. In such case, for example, also all four measuring tubes can be mechanically connected with one another by means of the third coupling element of first type as well as by means of the fourth coupling element of first type.

According to a seventh embodiment of the first further development of the invention, the measuring transducer further comprises: A first coupling element of second type, for example, a plate shaped or rod shaped, first coupling element of second type, which is spaced both from the first coupling element of first type as well as also from the second coupling element of first type and affixed to the first measuring tube and to the third measuring tube, but otherwise, however, to no other measuring tube; a second coupling element of second type, for example, a plate shaped or rod shaped, second coupling element of second type, which is spaced both from the first coupling element of first type as well as also from the second coupling element of first type, as well as also from the first coupling element of second type, and affixed to the second measuring tube and to the fourth measuring tube, but otherwise, however, to no other measuring tube; a third coupling element of second type, for example, a plate shaped or rod shaped, third coupling element of second type, which is spaced both from the first coupling element of first type as well as also from the second coupling element of first type, as well as also from the first coupling element of second type, and affixed to the first measuring tube and to the third measuring tube, but otherwise, however, to no other measuring tube; as well as a fourth coupling element of second type, for example, a plate shaped or rod shaped, fourth coupling element of second type, which is spaced both from the first and second coupling elements of first type as well as also from the second and third coupling elements of second type, and affixed to the second measuring tube and to the fourth measuring tube, but otherwise, however, to no other measuring tube. The first and second coupling elements of second type can be placed, for example, lying opposite one another in the measuring transducer and the third and fourth coupling element of second type can be placed, for example, lying opposite one another in the measuring transducer.

According to a second further development of the invention, the measuring transducer further comprises, for increasing the oscillation quality factor of the measuring tubes, a plurality of annular stiffening elements, especially equally constructed stiffening elements, of which each is so placed on exactly one of the measuring tubes that it grips around such along one of its peripheral lines. According to an embodiment of the first further development of the invention, at least four annular stiffening elements, for example, equally constructed stiffening elements, are placed on each of the measuring tubes, especially in such a manner that the stiffening elements are so placed in the measuring transducer that two adjoining stiffening elements mounted on the same measuring tube have a separation from one another, which amounts to at least 70% of a tube outer diameter of said measuring tube, at most, however, to 150% of such tube outer diameter, for example, a separation in the range of 80% to 120% of such tube outer diameter.

Moreover, the invention resides in an in-line measuring device for measuring density and/or mass flow rate, especially also a total mass flow totaled over a time interval, of a medium, especially a gas, a liquid, a powder or other flowable material, flowing, at least at times, in a pipeline, especially with mass flow rate of more than 400 t/h, which in-line measuring device, especially embodied as a compact device, comprises one of the aforementioned measuring transducers as well as a measuring device electronics, especially also a mechanically rigidly connected, measuring device electronics, electrically coupled with the measuring transducer.

A basic idea of the invention is to use, instead of the two parallel flow, measuring tubes used in the case of conventional measuring transducers of large nominal diameter, four parallel flow, straight measuring tubes, and so, on the one hand, to enable an optimal utilization of limited space, while, on the other hand, being able to assure an acceptable pressure loss over a broad measuring range, especially also in the case of very high mass flow rates of much more than 400 t/h, coupled with still very high accuracy of measurement. This is achieved in the case of the measuring system of the invention especially by the feature that, as wanted mode, namely the oscillations of the measuring tubes actively excited for the purpose of measuring mass flow, or density, there serves an oscillation mode inherent to the tube arrangement, referred to below, at times, as V-mode, in the form of a natural bending oscillation mode of first type, in which the first and second measuring tubes execute relative to the second imaginary longitudinal section plane opposite-equal bending oscillations about their respective associated static rest positions, and in which the third and fourth measuring tubes execute relative to the second imaginary longitudinal section plane opposite-equal bending oscillations about their respective static rest positions, in such a manner, that, relative to the second imaginary longitudinal section plane, said bending oscillations of the first measuring tube are also opposite-equal to said bending oscillations of the third measuring tube, and that, relative to the second imaginary longitudinal section plane, said bending oscillations of the second measuring tube are also opposite-equal to said bending oscillations of the fourth measuring tube. At said V-mode, for measuring transducers of the type being discussed, a very high oscillation quality factor could be observed, this especially also as a result of an observed significantly lessened dissipation of oscillatory energy from the measuring transducer into the thereto connected pipeline, for instance, as a result of actually undesired deformations of the flow dividers. Moreover, the oscillations of the measuring tubes corresponding to the V-mode, consequently the therewith corresponding oscillation measurement signals, have also a—in comparison to conventional measuring transducer—significantly lessened pressure pulse, and sound, dependence. This holds especially also in applications with operationally widely fluctuating temperature range of more than 100K and/or in applications with strong mechanical loading of the measuring transducer, for instance, as a result of pipeline forces acting axially or also asymmetrically on the measuring transducer. Moreover, in the case of the measuring system of the invention, the effective flow cross section of the inner part resulting from the total cross section of the four measuring tubes can be directly increased by more than 20% in comparison to conventional, two measuring tube, measuring transducers of equal nominal diameter and equal empty mass. A further advantage of the measuring transducer of the invention resides additionally in the fact that mainly established structural designs, such as regards materials used, joining technology, manufacturing steps, etc., can be applied, or must only slightly modified, whereby also manufacturing costs are, in total, quite comparable to those of conventional measuring transducers. As a result, a further advantage of the invention is to be found in the fact that, thereby, not only an opportunity is created for constructing comparatively compact measuring transducers of vibration-type also with large nominal diameters of over 100 mm, especially with a nominal diameter of greater than 250 mm, with manageable geometric dimensions and empty mass, but, additionally, also, this can be implemented in an economically sensible manner.

The measuring system of the invention is, due to its potentially large nominal diameter, on the one hand, and its relatively low pressure loss, on the other hand, especially suitable for measuring flowable media guided in a pipeline having a caliber of greater than 100 mm, especially 250 mm or greater and flowing, at least at times, with mass flow rates of more than 400 t/h, especially also more than 1500 t/h, such as is quite usual especially in the case of applications for measuring petroleum, natural gas or other petrochemical substances.

BRIEF DESCRIPTION OF THE DRAWINGS

The invention, as well as other advantageous embodiments thereof, will now be explained in greater detail on the basis of examples of embodiments presented in the figures of the drawing. Equal parts are provided in the figures with equal reference characters; when required to avoid clutter or when it otherwise appears sensible, already mentioned reference characters are omitted in subsequent figures. Other advantageous embodiments or further developments, especially also combinations of first only individually explained aspects of the invention, will become evident additionally from the figures of the drawing, as well as also alone from the dependent claims. In particular, the figures of the drawing show as follows:

DETAILED DISCUSSION IN CONJUNCTION WITH THE DRAWINGS

Figure 1:
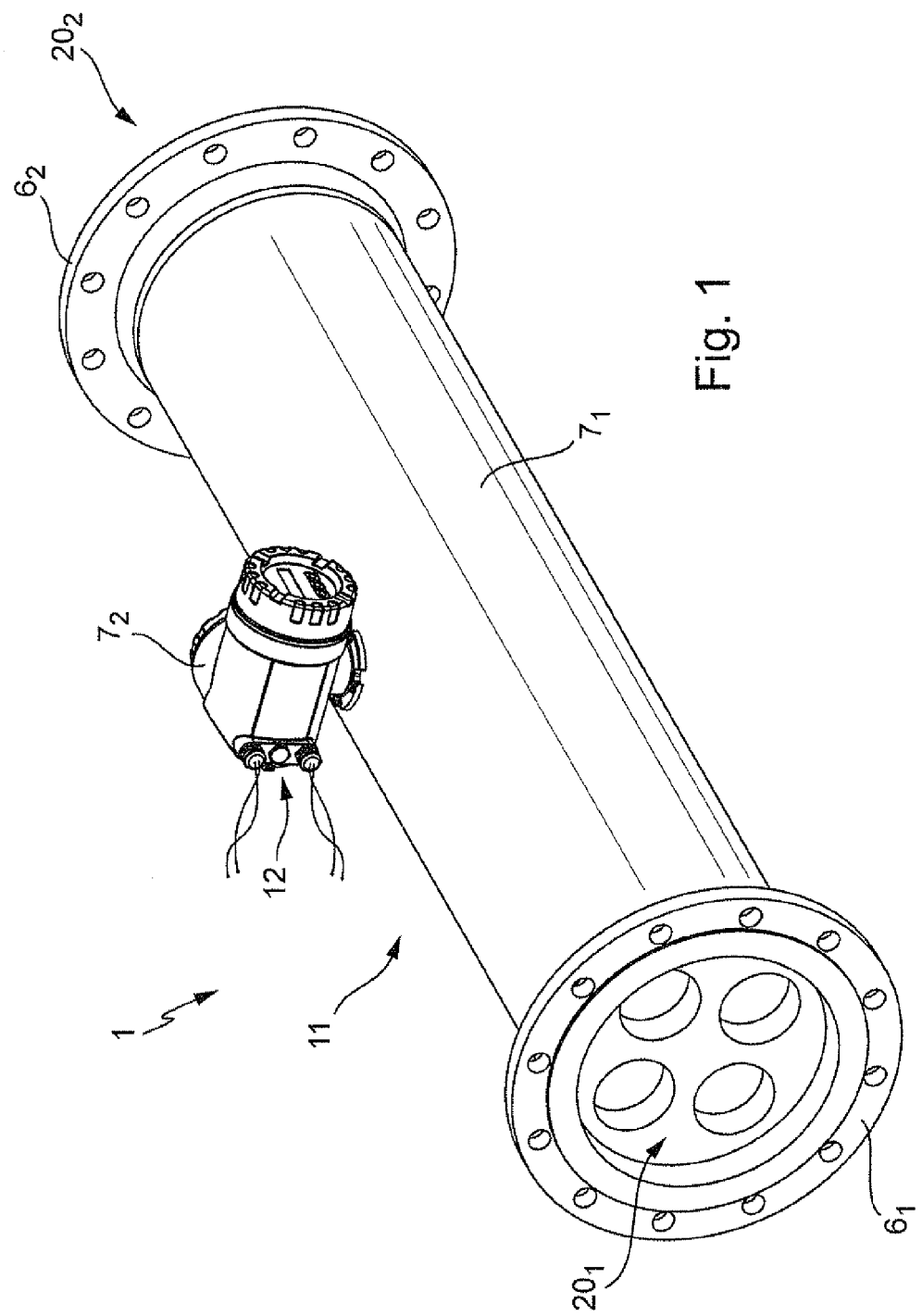
FIGS. 1 and 2 a measuring system—here in the form of an in-line measuring device of compact construction—serving, for example, as a Coriolis flow/density/viscosity transducer, in perspective, also partially sectioned, side views.
Figure 2:
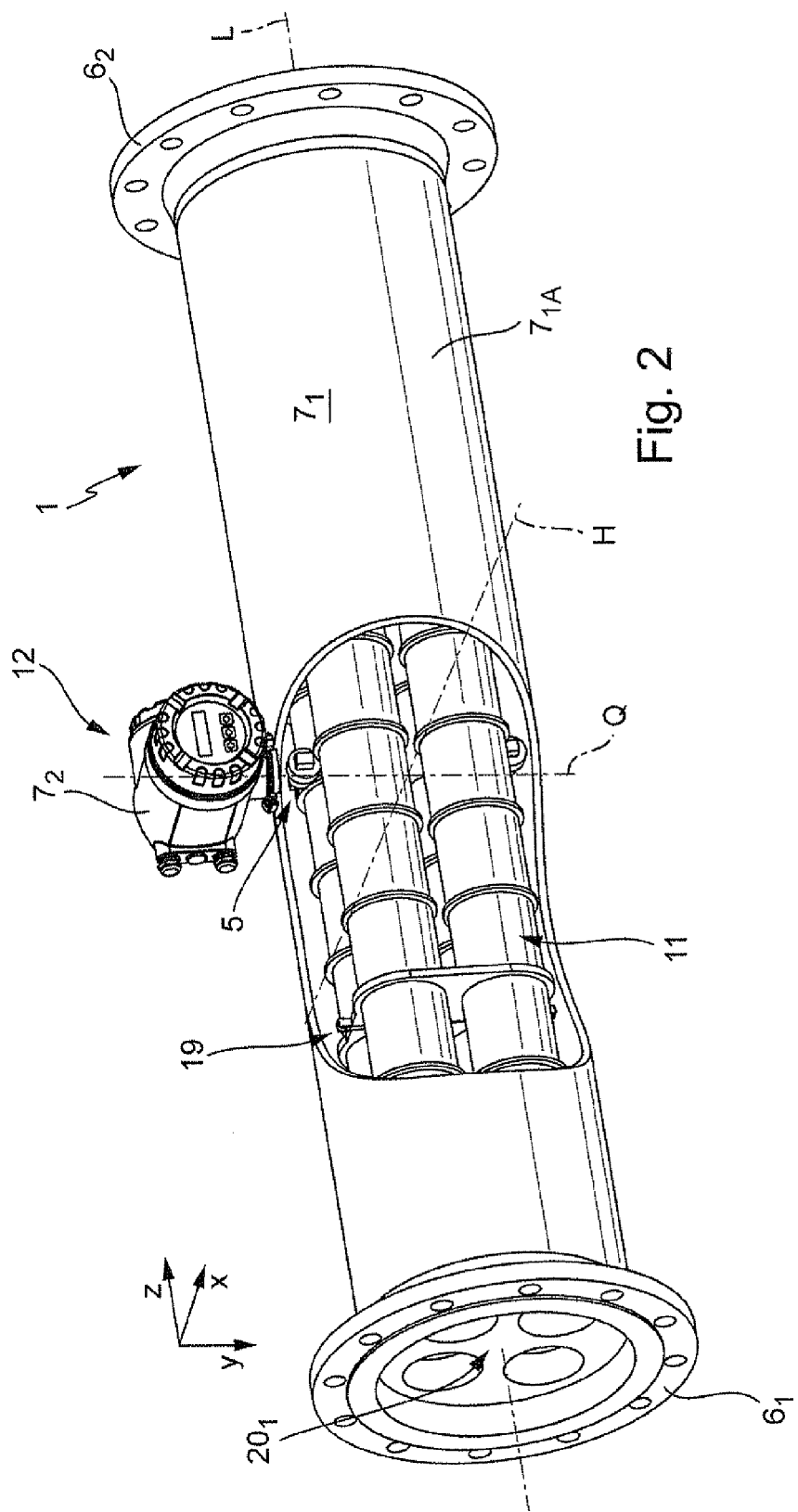

FIGS. 1 and 2 show, schematically, a measuring system 1, especially a measuring system embodied as a Coriolis, mass flow, and/or density, measuring device, which serves, especially, for registering a mass flow m of a medium flowing in a pipeline (not shown) and for representing such as a mass flow, measured value representing mass flow instantaneously. The medium can be practically any flowable material, for example, a powder, a liquid, a gas, a vapor, or the like. Alternatively or in supplementation, the measuring system 1 can, in given cases, also be used for measuring density $\rho$ and/or viscosity $\eta$ of the medium. Especially, the measuring system is provided for measuring media, such as e.g. petroleum, natural gas or other petrochemical materials, which are flowing in a pipeline having a caliber greater than 100 mm, especially a caliber of 300 mm or more. Especially, the measuring system is also provided for measuring flowing media of the aforementioned type, which are caused to flow with mass flow rates of greater than 400 t/h, especially greater than 1500 t/h.

Measuring system 1, shown here in the form of an in-line measuring device, namely a measuring device, which can be inserted into the course of a pipeline, comprises, for such purpose: a measuring transducer 11 of vibration-type, through which the medium being measured flows during operation; as well as, electrically connected with the measuring transducer 11, a transmitter electronics 12 (here not shown in detail) for operating the measuring transducer and for evaluating oscillation signals delivered by the measuring transducer. In advantageous manner, the transmitter electronics 12, which is formed, for example, by means of one or more microprocessors and/or by means of one or more digital signal processors, can e.g. be so designed that, during operation of the measuring system 1, it can exchange measuring, and/or other operating, data with a measured value processing unit superordinated to it, for example, a programmable logic controller (PLC), a personal computer and/or a work station, via a data transmission system, for example, a hardwired fieldbus system and/or wirelessly per radio. Furthermore, the transmitter electronics 12 can be so designed that it can be fed by an external energy supply, for example, also via the aforementioned fieldbus system. For the case, in which the measuring system 1 is provided for coupling to a fieldbus system or other communication system, the transmitter electronics 12, for example, also a transmitter electronics, which is programmable on-site and/or via a communication system, can include, additionally, a corresponding communication interface for data communication, e.g. for sending the measured data to the already mentioned, programmable logic controller or superordinated process control system and/or for receiving settings data for the measuring system.

FIGS. 4, 5a, 5b, 6a, and 6b show different representations of an example of an embodiment for a measuring transducer 11 of vibration-type suited for the measuring system 1, especially one serving as a Coriolis mass flow, density and/or viscosity transducer, which measuring transducer 11 is inserted, during operation, in the course of a pipeline (not shown), through which a medium to be measured, for example, a powdered, liquid, gaseous or vaporous medium, is flowing. The measuring transducer 11 serves to produce, as already mentioned, in a medium flowing therethrough, such mechanical reaction forces, especially Coriolis forces dependent on mass flow rate of the medium, inertial forces dependent on density of the medium and/or frictional forces dependent on viscosity of the medium, which react measurably, especially registerably by sensor, on the measuring transducer. Derived from these reaction forces describing the medium, by means of evaluating methods correspondingly implemented in the transmitter electronics in manner known to those skilled in the art, e.g. mass flow rate m (thus, mass flow), and/or density and/or viscosity of the medium can be measured.

The measuring transducer 11 includes a transducer housing $7_1$, serving as, among other things, a support means. The transducer housing is, here, essentially tubular and externally circularly cylindrical. Components of the measuring transducer 11 serving for registering the at least one measured variable are accommodated in the housing for protection against external, environmental influences. In the example of an embodiment shown here, at least one middle segment of the transducer housing $7_1$ is formed by means of a straight tube, especially a circularly cylindrical tube, so that, for manufacturing the transducer housing, for example, cost effective, welded or cast, standard tubes, for example, tubes of cast steel or forged steel, can be used.

An inlet-side, first housing end of the transducer housing 7 is formed by means of an inlet-side, first flow divider $20_1$ and an outlet-side, second housing end of the transducer housing $7_1$ is formed by means of outlet-side, second flow divider $20_2$. Each of the two flow dividers $20_1$, $20_2$, which are formed as integral components of the housing, has exactly four, for example, circularly cylindrical or tapered or conical, flow openings $20_{1A}$, $20_{1B}$, $20_{1C}$, $20_{1D}$, and $20_{2A}$, $20_{2B}$, $20_{2C}$, $20_{2D}$, respectively. The openings are mutually spaced from one another and/or each is embodied as an inner cone.

Moreover, each of the flow dividers $20_1$, $20_2$, for example, flow dividers manufactured of steel, is provided with a flange $6_1$, respectively $6_2$, for example, flanges manufactured of steel, for connecting the measuring transducer 11 to a tubular segment of the pipeline serving for supplying medium to the measuring transducer, and, respectively, to a tubular segment of such pipeline serving for removing medium from the measuring transducer. Each of the two flanges $6_1$, $6_2$ has, according to an embodiment of the invention, a mass of more than 50 kg, especially more than 60 kg and/or less than 100 kg. For leakage free, especially fluid tight, connecting of the measuring transducer with the, in each case, corresponding tubular segment of the pipeline, each of the flanges includes additionally, in each case, a corresponding, as planar as possible, sealing surface $6_{1A}$, and, respectively, $6_{2A}$. A distance between the two sealing surfaces $6_{1A}$, $6_{2A}$ of the two flanges defines, thus, for practical purposes, an installed length, $L_{11}$, of the measuring transducer 11. The flanges are dimensioned, especially as regards their inner diameter, their respective sealing surface as well as the flange bores serving for accommodating corresponding connection bolts, according to the nominal diameter $D_{11}$ provided for the measuring transducer 11 as well as the therefor, in given cases, relevant industrial standards, corresponding to a caliber of the pipeline, in whose course the measuring transducer is to be inserted.

As a result of the large nominal diameter lastly desired for the measuring transducer, its installed length $L_{11}$ amounts, according to an embodiment of the invention, to more than 1200 mm. Additionally, it is, however, provided that the installed length of the measuring transducer 11 is kept as small as possible, especially smaller than 3000 mm. The flanges $6_1$, $6_2$ can, as well as also directly evident from FIG. 4 and such as quite usual in the case of such measuring transducers, be arranged, for this purpose, as near as possible to the flow openings of the flow dividers $20_1$, $20_2$, in order so to provide an as short as possible inlet, or outlet, as the case may be, region in the flow dividers and, thus, in total, to provide an as short as possible installed length $L_{11}$ of the measuring transducer, especially an installed length $L_{11}$ of less than 3000 mm. For an as compact as possible measuring transducer and also in the case of desired high mass flow rates of over 2200 t/h, according to another embodiment of the invention, the installed length and the nominal diameter of the measuring transducer are so dimensioned and matched to one another that a nominal diameter to installed length ratio $D_{11}/L_{11}$ of the measuring transducer, as defined by a ratio of the nominal diameter $D_{11}$ of the measuring transducer to the installed length $L_{11}$ of the measuring transducer is smaller than 0.3, especially smaller than 0.2 and/or greater than 0.1.

In an additional embodiment of the measuring transducer, the transducer housing comprises an essentially tubular middle segment. Additionally, it is provided that the transducer housing is so dimensioned that a housing inner diameter to nominal diameter ratio of the measuring transducer defined by a ratio of the largest housing inner diameter to the nominal diameter of the measuring transducer is greater than 0.9, however, less than 1.5, as much as possible, however, less than 1.2.

In the case of the example of an embodiment shown here, the middle segment is adjoined, respectively, on the inlet side and on the outlet side by likewise tubular, end segments of the transducer housing. For the case shown in the example of an embodiment, in which the middle segment and the two end segments, as well as also the flow dividers connected with the respective flanges, respectively, in the in- and outlet regions, all have the same inner diameter, the transducer housing can, in advantageous manner, also be formed by means of a single tube, for example, a cast or forged tube, on whose ends the flanges are formed or welded on, and wherein the flow dividers are formed by means of plates (especially plates somewhat recessed from the flanges) having the flow openings and welded orbitally to the inner wall and/or by means of laser. Especially for the case, in which the mentioned housing inner diameter to nominal diameter ratio of the measuring transducer is selected to be equal to one, for manufacturing the transducer housing, for example, a tube with length correspondingly matching the selected measuring tube length and correspondingly adapted to fit the pipeline to be connected to as regards caliber, wall thickness and material, and, insofar, also as regards the allowed operating pressure, can be used.

For conveying the medium flowing, at least at times, through pipeline and measuring transducer, the measuring transducer of the invention comprises, additionally, a tube arrangement having exactly four straight measuring tubes $18_1$, $18_2$, $18_3$, $18_4$ held oscillatably in the transducer housing 10. The four measuring tubes, in this case, measuring tubes of equal length and parallel to one another, communicate, in each case, with the pipeline connected to the measuring transducer, and are, at least at times, especially also simultaneously, caused during operation to vibrate in at least one actively excited, oscillatory mode, the so-called wanted mode, suited for ascertaining the physical, measured variable. Of the four measuring tubes, a first measuring tube $18_1$ opens with an inlet-side, first measuring tube end into a first flow opening $20_{1A}$ of the first flow divider $20_1$ and with an outlet-side, second measuring tube end into a first flow opening $20_{2A}$ of the second flow divider $20_2$, a second measuring tube $18_2$ opens with an inlet-side, first measuring tube end into a second flow opening $20_{1B}$ of the first flow divider $20_1$ and with an outlet-side, second measuring tube end into a second flow opening $20_{2B}$ of the second flow divider $20_2$, a third measuring tube $18_3$ opens with an inlet-side, first measuring tube end into a third flow opening $20_{1C}$ of the first flow divider $20_1$ and with an outlet-side, second measuring tube end into a third flow opening $20_{2C}$ of the second flow divider $20_2$ and a fourth measuring tube $18_4$ opens with an inlet-side, first measuring tube end into a fourth flow opening $20_{1D}$ of the first flow divider $20_1$ and with an outlet-side, second measuring tube end into a fourth flow opening $20_{2D}$ of the second flow divider $20_2$. The four measuring tubes $18_1$, $18_2$, $18_3$, $18_4$ are, thus, connected to the flow dividers $20_1$, $20_2$, especially equally constructed flow dividers $20_1$, $20_2$, to form flow paths connected in parallel, and, indeed, in a manner enabling vibrations, especially bending oscillations, of the measuring tubes relative to one another, as well as also relative to the transducer housing. Additionally, it is provided that the four measuring tubes $18_1$, $18_2$, $18_3$, $18_4$ are held oscillatably (here, oscillatably, namely, at its middle segment $7_{1A}$) in the transducer housing $7_1$ only by means of said flow dividers $20_1$, $20_2$. Suited as material for the tube walls of the measuring tubes is, for example, stainless, in given cases, also high strength, stainless steel, titanium, zirconium or tantalum, or alloys formed therewith or also super alloys, such as, for instance, Hastelloy, Inconel etc. Moreover, the material for the four measuring tubes $18_1$, $18_2$, $18_3$, $18_4$ can, however, also be practically any other material usually applied therefor or at least a material suitable therefor, especially such with an as small as possible thermal expansion coefficient and an as high as possible yield point. Alternatively or in supplementation, according to an additional embodiment of the invention, at least the first and second measuring tubes $18_1$, $18_2$ are of equal construction as regards the material of their tube walls, and/or as regards their geometric tube dimensions, especially a measuring tube length, a tube wall thickness, a tube outer diameter and/or a caliber. Additionally, also at least the third and the fourth measuring tube $18_3$, $18_4$ are of equal construction as regards the material of their tube walls, and/or as regards their geometric tube dimensions, especially a measuring tube length, a tube wall thickness, a tube outer diameter and/or a caliber, so that, as a result, the four measuring tubes $18_1$, $18_2$, $18_3$, $18_4$ are, at least pairwise, essentially of equal construction. Preferably, the four measuring tubes $18_1$, $18_2$, $18_3$, $18_4$ are of equal construction as regards the material of their tube walls, and/or as regards their geometric tube dimensions, especially a measuring tube length, a tube wall thickness, a tube outer diameter, a form of their bending lines and/or a caliber, especially in such a manner, that, as a result, at least one minimum bending oscillation resonance frequency of each of the four measuring tubes $18_1$, $18_2$, $18_3$, $18_4$ (empty or uniformly flowed-through by a homogeneous medium) essentially equals the respective minimum bending oscillation resonance frequencies of the remaining other measuring tubes.

Figure 4:
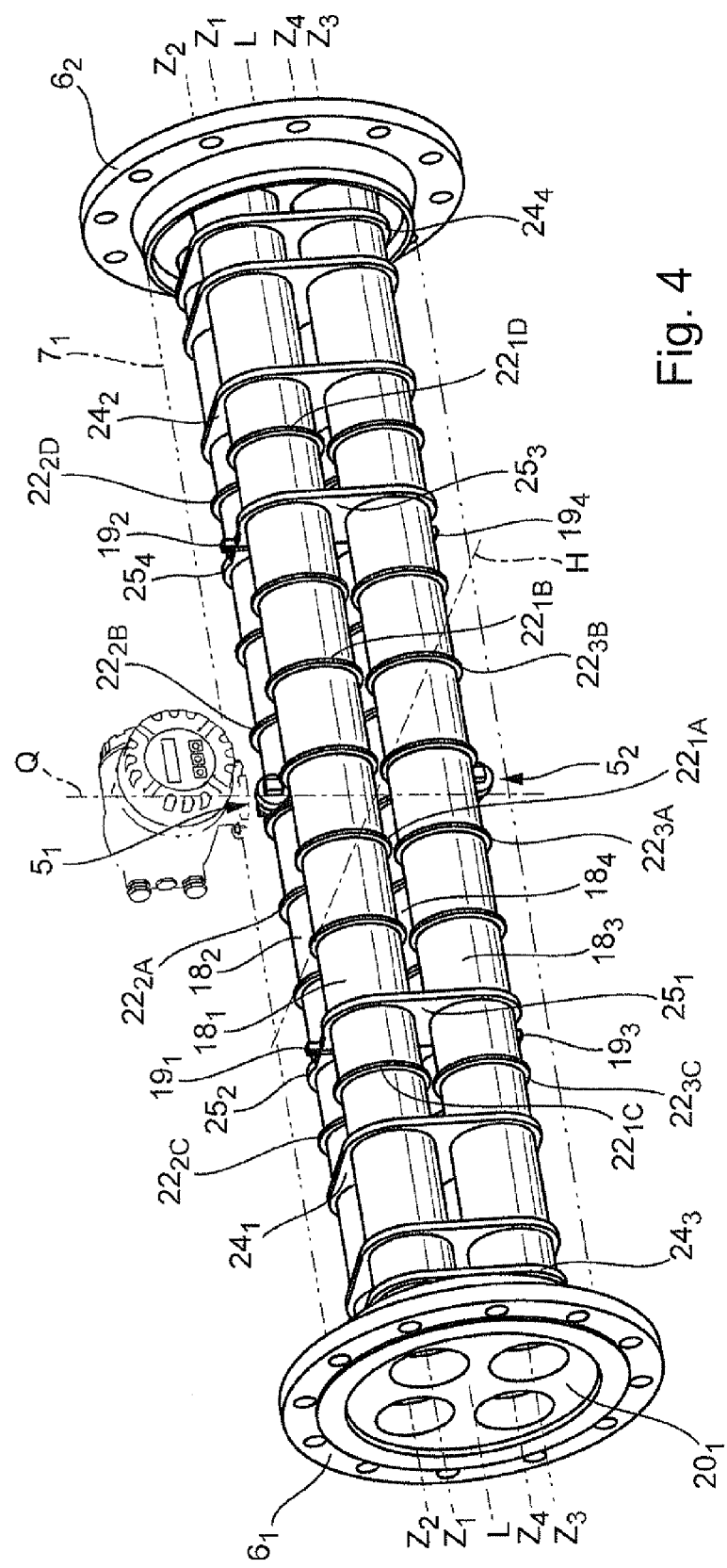
FIG. 4 a side view in perspective, showing a measuring transducer of vibration-type forming a component of a measuring system of FIG. 1.

In the case of the measuring transducer of the invention, the measuring tubes are, as directly evident also from the combination of FIGS. 2 and 4, additionally so embodied and arranged in the measuring transducer that the tube arrangement has, lying both between the first measuring tube $18_1$ and the third measuring tube $18_3$ as well as also between the second measuring tube $18_2$ and the fourth measuring tube $18_4$, a first imaginary longitudinal section plane XZ, with respect to which the tube arrangement is mirror symmetric, and that the tube arrangement has further, perpendicular to its imaginary first longitudinal section plane XZ, and extending both between the first measuring tube $18_1$ and second measuring tube $18_2$ as well as also between the third measuring tube $18_3$ and fourth measuring tube $18_4$, a second imaginary longitudinal section plane YZ, with respect to which the tube arrangement is likewise mirror symmetric. For the rest, the tube arrangement includes, as also directly evident from the combination of FIGS. 4-6b, an imaginary cross sectional plane XY perpendicular both to the first imaginary longitudinal section plane XZ as well as also to the second imaginary longitudinal section plane YZ. In an advantageous embodiment of the invention, the tube arrangement is additionally so embodied that a center of mass of the tube arrangement lies in the imaginary cross sectional plane XY, or that the inner part is mirror symmetric relative to the imaginary cross sectional plane XY.

For additional symmetrization of the measuring transducer and, thus, also for the added simplifying of its construction, the two flow dividers $20_1$, $20_2$ are, according to an additional embodiment of the invention, additionally so embodied and so arranged in the measuring transducer, that, as also schematically presented in FIG. 4, an imaginary first connecting axis $Z_1$ of the measuring transducer imaginarily connecting the first flow opening $20_{1A}$ of the first flow divider $20_1$ with the first flow opening $20_{2A}$ of the second flow divider $20_2$ extends parallel to an imaginary second connecting axis $Z_2$ of the measuring transducer imaginarily connecting the second, flow opening $20_{1B}$ of the first flow divider $20_1$ with the second flow opening $20_{2B}$ of the second flow divider $20_2$, and that an imaginary third connecting axis $Z_3$ of the measuring transducer imaginarily connecting the third flow opening $20_{1C}$ of the first flow divider $20_1$ with the third flow opening $20_{2C}$ of the second flow divider $20_2$ extends parallel to an imaginary fourth connecting axis $Z_4$ of the measuring transducer imaginarily connecting the fourth flow opening $20_{1D}$ of the first flow divider $20_1$ with the fourth flow opening $20_{2B}$ of the second flow divider $20_2$. As shown in FIG. 4, the flow dividers are additionally so embodied and so arranged in the measuring transducer that the connecting axes $Z_1$, $Z_2$, $Z_3$, $Z_4$ are also parallel to a principal flow axis L of the measuring transducer essentially aligning with the pipeline and/or coincident with the aforementioned line of intersection of the two imaginary longitudinal section planes XZ, YZ of the inner part. Furthermore, the two flow dividers $20_1$, $20_2$ can additionally also be so embodied and so arranged in the measuring transducer that a first imaginary longitudinal section plane $XZ_1$ of the measuring transducer, within which the first imaginary connecting axis $Z_1$ and the second imaginary connecting axis $Z_2$ extend, is parallel to a second imaginary longitudinal section plane $XZ_2$ of the measuring transducer, within which the imaginary third connecting axis $Z_3$ and the imaginary fourth connecting axis $Z_4$ extend.

Figure 3A:
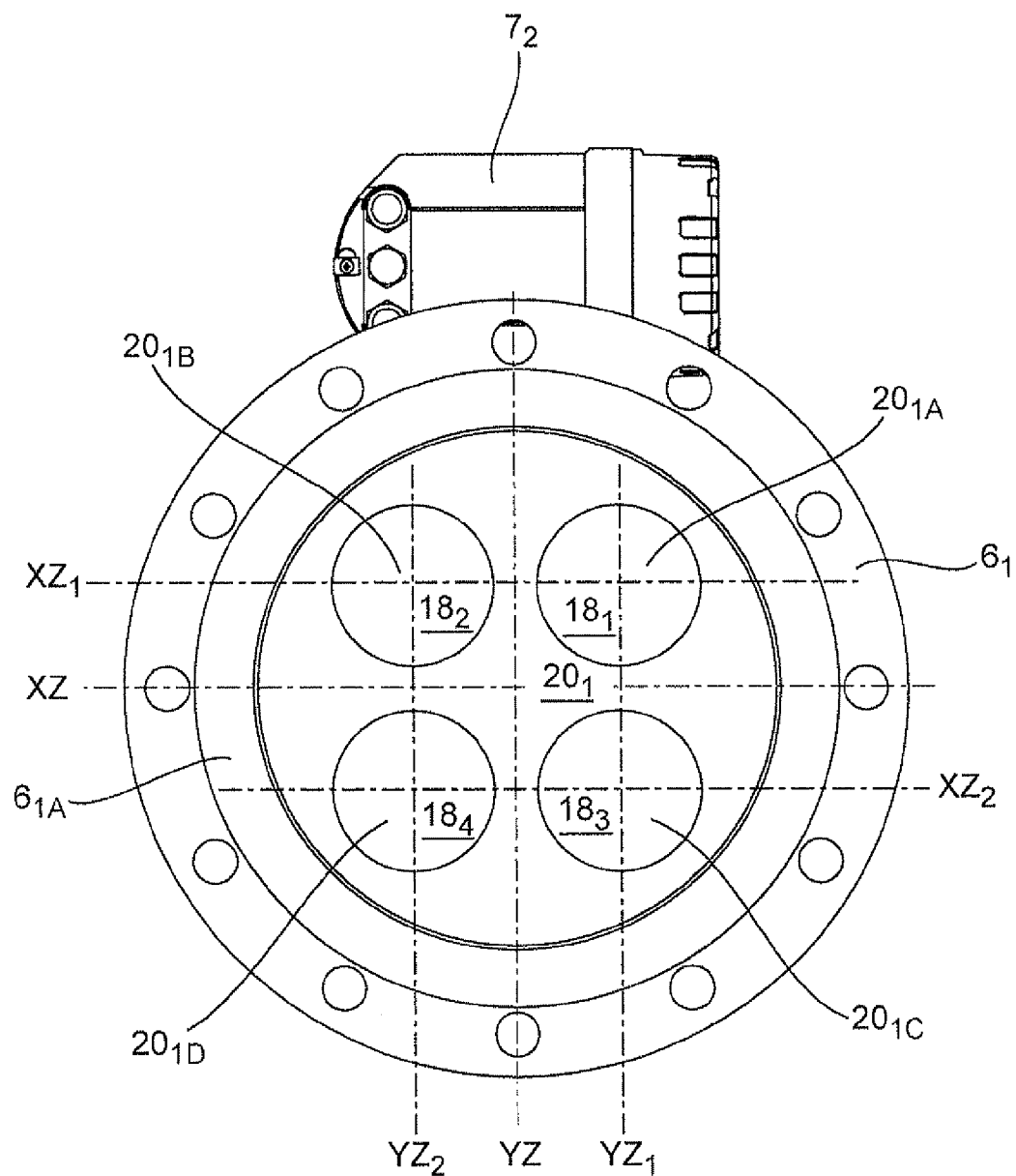
FIGS. 3*a* and 3*b* the projection of the measuring system of FIG. 1 in two different side views.

Moreover, the measuring tubes are, according to an additional embodiment of the invention, additionally so embodied and so arranged in the measuring transducer that the imaginary first longitudinal section plane XZ of the inner part, as, among other things, also evident from the combination of FIGS. 3a and 4, lies between the aforementioned first imaginary longitudinal section plane $XZ_1$ of the measuring transducer and the aforementioned second imaginary longitudinal section plane $XZ_2$ of the measuring transducer, for example, also such that the first longitudinal section plane XZ of the inner part is parallel to the first and second longitudinal section planes $XZ_1$, $XZ_2$ of the measuring transducer. Additionally, the measuring tubes are so embodied and arranged in the measuring transducer that equally also the second imaginary longitudinal section plane YZ of the inner part extends between the third imaginary longitudinal section plane $YZ_1$ of the measuring transducer and the fourth imaginary longitudinal section plane $YZ_2$ of the measuring transducer, for instance, in such a manner that the second imaginary longitudinal section plane YZ of the inner part is parallel to the third imaginary longitudinal section plane $YZ_1$ of the measuring transducer and parallel to the fourth imaginary longitudinal section plane $YZ_2$ of the measuring transducer. In the example of an embodiment shown here, the inner part is, as directly evident from the combination of FIGS. 4, 5a, 5b and 6a, additionally so embodied and so placed in the transducer housing, that, as a result, not only the shared line of intersection of the first and second imaginary longitudinal section planes XZ, YZ of the inner part is parallel, or coincident with, the longitudinal axis L, but, also, a shared line of intersection of the first longitudinal section plane XZ and the cross sectional plane XY is parallel to an imaginary transverse axis Q of the measuring transducer perpendicular to the longitudinal axis L and a shared line of intersection of the second longitudinal section plane YZ and the cross sectional plane XY is parallel to an imaginary vertical axis H of the measuring transducer perpendicular to the longitudinal axis L.

In an additional advantageous embodiment of the invention, the flow openings of the first flow divider $20_1$ are additionally so arranged that the imaginary areal center of gravity, which belong to the—here circularly shaped—cross sectional areas of the flow openings of the first flow divider, form the vertices of an imaginary rectangle or of an imaginary square, wherein said cross sectional areas lie, again, in a shared imaginary, cross sectional plane of the first flow divider extending perpendicular to a longitudinal axis L of the measuring transducer —, for example, a longitudinal axis extending within the first longitudinal section plane XZ of the inner part, or parallel to or even coincident with the mentioned principal flow axis of the measuring transducer —, or perpendicular to the longitudinal section planes of the measuring transducer. Additionally, also the flow openings of the second flow divider $20_2$ are so arranged that imaginary areal centers of gravity associated with—here likewise circularly shaped—cross sectional areas of the flow openings of the second flow divider $20_2$ form the vertices of an imaginary rectangle, or square, wherein said cross sectional areas lie, again, in a shared imaginary, cross sectional plane of the second flow divider extending perpendicular to the mentioned main flow, or also the longitudinal, axis, L, of the measuring transducer, or perpendicular to the longitudinal section planes of the measuring transducer.

Moreover, used as material for the transducer housing $7_1$ can be steels, such as, for instance, structural steel, or stainless steel, or also other suitable, or usually suitable, for such purpose, high strength materials. For most applications of industrial measurements technology, especially also in the petrochemical industry, additionally also measuring tubes of stainless steel, for example, also duplex steel, super duplex steel or another (high strength) stainless steel, can satisfy the requirements relative to mechanical strength, chemical resistance as well as thermal requirements, so that in numerous cases of application the transducer housing $7_1$, the flow dividers $20_1$, $20_2$, as well as also the tube walls of the measuring tubes $18_1$, $18_2$, $18_3$, $18_4$ can, in each case, be of steel of, in each case, sufficiently high quality, which, especially relative to the material- and manufacturing costs, as well as also the thermally related dilation behavior of the measuring transducer 11 during operation, can be advantageous. Moreover, the transducer housing $7_1$ additionally in advantageous manner can also be so embodied and so dimensioned that, in the case of possible damage to one or a number of the measuring tubes, e.g. through crack formation or bursting, outflowing medium can be completely retained in the interior of the transducer housing $7_1$ up to a required maximum positive pressure, for as long as desired, wherein such critical state can be registered and signaled as early as possible by means of corresponding pressure sensors and/or based on operating parameters produced by the mentioned transmitter electronics 12 internally during operation. For simplifying transport of the measuring transducer, or of the total in-line measuring device formed therewith, additionally, transport eyes can be provided on the inlet side and outlet sides affixed externally on the transducer housing.

As already initially mentioned, the reaction forces required for the measuring are effected in the measuring transducer 11 in the medium to be measured by causing the measuring tubes $18_1$, $18_2$, $18_3$, $18_4$ to oscillate, for example, simultaneously, in an actively excited oscillatory mode, the so-called wanted mode. For exciting oscillations of the measuring tubes, especially also oscillations in the wanted mode, the measuring transducer further comprises an exciter mechanism 5 formed by means of at least one electromechanical, for example, electrodynamic, oscillation exciter acting on the measuring tubes $18_1$, $18_2$, $18_3$, $18_4$. Exciter mechanism 5 serves to cause each of the measuring tubes operationally, at least at times, to execute oscillations, especially bending oscillations, in the wanted mode and to maintain such oscillations with oscillation amplitude sufficiently large for producing in the medium, and for registering, the above named reaction forces suitable for the particular measuring, or for the wanted oscillations. The at least one oscillation exciter, and thus the therewith formed, exciter mechanism, serves, in such case, especially for converting an electrical excitation power $P_{exc}$ fed from the transmitter electronics —, for instance, by means of at least one electrical driver signal—into such, e.g. pulsating or harmonic, exciter forces $F_{exc}$, which act, as simultaneously as possible, uniformly, however, with opposite sense, on at least two of the measuring tubes, for instance, the first and the second measuring tubes and, in given cases, are also coupled mechanically from the two measuring tubes further onto the other two measuring tubes, and so effect oscillations in the wanted mode. The exciter forces $F_{exc}$ generated by converting electrical excitation power $P_{exc}$ fed into the exciter mechanism can, in manner known, per se, to those skilled in the art, e.g. by means of an operating circuit provided in the transmitter electronics 12 and lastly delivering the driver signal, be tuned, for instance, by means of electrical current- and/or voltage controllers implemented in the operating circuit, as regards their amplitude and, e.g. by means of a phase control loop (PLL) likewise provided in the operating circuit, as regards their frequency; compare, for this, for example, also U.S. Pat. No. 4,801,897 or U.S. Pat. No. 6,311,136. In an additional embodiment of the invention, it is, consequently, additionally provided that the transmitter electronics, for generating the exciter forces, feeds required electrical excitation power into the exciter mechanism by means of at least one electrical driver signal, for example, an, at least at times, periodic driver signal, supplied to the oscillation exciter, and, thus, to the exciter mechanism, for example, via connecting lines. The driver signal is variable with at least one signal frequency corresponding to an eigenfrequency of a natural mode of oscillation of the tube arrangement. For example, the at least one driver signal can also have a plurality of signal components with signal frequencies differing from one another, of which at least one signal component (for instance, one dominating as regards signal power) has a signal frequency corresponding to an eigenfrequency of a natural mode of oscillation of the tube arrangement, in which each of the four measuring tubes executes bending oscillations, for example, thus the mentioned bending oscillation mode of first type. Moreover, it can additionally be advantageous—, for instance, for the purpose of fitting the fed-in excitation power to that instantaneously actually necessary for a sufficient oscillation amplitude —, to make the at least one driver signal variable relative to a maximal voltage level (voltage amplitude) and/or a maximal electrical current level (electrical current amplitude)—, for instance, in such a manner, that, for example, exciter current flows through the cylindrical coil of the at least one oscillation exciter driven by a variable exciter voltage provided by means of said driver signal.

Goal of the active exciting of the measuring tubes to oscillations is, in particular, especially also for the case, in which the measuring system ultimately formed by means of the measuring transducer should be used for measuring mass flow, to induce, by means of the measuring tubes vibrating in the wanted mode, sufficiently strong Coriolis forces in the flowing medium, such that, as a result, additional deformations—consequently deformations corresponding to an oscillatory mode of higher order of the tube arrangement—the so-called Coriolis mode—of each of the measuring tubes can be effected with oscillation amplitude sufficient for the measuring. For example, the measuring tubes $18_1$, $18_2$, $18_3$, $18_4$ can be excited by means of the thereto held, electro-mechanical exciter mechanism to, especially simultaneous, bending oscillations, especially at an instantaneous mechanical eigenfrequency of the tube arrangement formed by means of the four measuring tubes $18_1$, $18_2$, $18_3$, $18_4$, in the case of which they are—at least predominantly—laterally deflected and, as directly evident for those skilled in the art from the combination of FIGS. 3a, 3b, 6a, 6b, 7a, 7b, caused to oscillate pairwise essentially opposite-equally relative to one another. This, especially, in such a manner that each of the measuring tubes $18_1$, $18_2$, $18_3$, $18_4$ executes during operation at the same time vibrations at least at times and/or at least partially, in each case, formed as bending oscillations about a static rest position. In other words, the measuring tubes can, as quite usual in the case of measuring transducers of vibration-type having straight measuring tubes, be caused, in each case, to oscillate, at least sectionally, in the manner of tensioned string, consequently thus with bending oscillations in a respective bending oscillation plane. In an embodiment of the invention, the exciter mechanism is additionally embodied in such a manner that, therewith, the first measuring tube $18_1$ and the second measuring tube $18_2$ are excitable to execute, relative to the second imaginary longitudinal section plane YZ, opposite equal, especially also, relative to the second imaginary longitudinal section plane YZ, symmetric, bending oscillations and the third measuring tube $18_3$ and the fourth measuring tube $18_4$ are excitable to execute, relative to the second imaginary longitudinal section plane YZ, opposite equal, especially also, relative to the second imaginary longitudinal section plane YZ, symmetric, bending oscillations. Moreover, the exciter mechanism is additionally embodied in such a manner that, therewith, the first measuring tube $18_1$ and the third measuring tube $18_3$ are excitable to execute, relative to the second imaginary longitudinal section plane YZ, opposite equal, for example, also, relative to the second imaginary longitudinal section plane YZ, symmetric, bending oscillations and the second measuring tube $18_2$ and the fourth measuring tube $18_4$ are excitable to execute, relative to the second imaginary longitudinal section plane YZ, opposite equal, for example, relative to the second imaginary longitudinal section plane YZ, symmetric, bending oscillations. The exciter mechanism, and thus the therewith excited, bending oscillations of the measuring tubes, can, in such case, be so embodied that the first measuring tube $18_1$ and the second measuring tube $18_2$ execute, in the wanted mode, opposite-equal bending oscillations in a shared imaginary first plane of oscillation $XZ_1$, insofar, thus, coplanar bending oscillations, and the third measuring tube $18_3$ and the fourth measuring tube $18_4$ execute, in the wanted mode, equally opposite-equal bending oscillations in a shared (consequently coplanar bending oscillations) imaginary second plane of oscillation $XZ_2$,—here a plane additionally essentially parallel to the first plane of oscillation $XZ_1$.

In an additional embodiment of the invention, the measuring tubes $18_1$, $18_2$, $18_3$, $18_4$ are excited during operation by means of the exciter mechanism 5 additionally at least partially, especially predominantly, to wanted mode, bending oscillations, which have a bending oscillation frequency, which, for instance, equals an instantaneous mechanical resonance frequency of the tube arrangement comprising the four measuring tubes $18_1, 18_2, 18_3, 18_4$, consequently corresponding to an instantaneous eigenfrequency of a bending oscillation mode of the tube arrangement, or which lies at least in the vicinity of such an eigen- or resonance frequency. The instantaneous mechanical resonance frequencies of bending oscillations are, in such case, as is known, dependent in special measure on size, shape and material of the measuring tubes $18_1, 18_2, 18_3, 18_4$, as well as also on an instantaneous density of the medium flowing through the measuring tubes and can, thus, during operation of the measuring transducer, vary within a quite some number of kilohertz wide, wanted frequency band. In the case of exciting the measuring tubes at an instantaneous resonance frequency, thus, on the one hand, based on the instantaneously excited oscillation frequency, an average density of the medium flowing through the four measuring tubes can be instantaneously easily ascertained. On the other hand, so also, the electrical power instantaneously required for maintaining the oscillations excited in the wanted mode can be minimized. Especially, the four measuring tubes $18_1, 18_2, 18_3, 18_4$, are caused to oscillate, driven by the exciter mechanism, additionally, at least at times, with essentially equal oscillation frequency, especially, in each case, one and the same natural mechanical eigenfrequency, and, thus, a shared, natural mechanical eigenfrequency. In advantageous manner, the oscillatory behavior of the inner part formed by means of the four measuring tubes $18_1, 18_2, 18_3, 18_4$, as well as also the driver signals controlling the exciter mechanism, are additionally so matched to one another that at least the oscillations of the four measuring tubes $18_1, 18_2, 18_3, 18_4$ excited in the wanted mode are so developed that the first and second measuring tubes $18_1, 18_2$ oscillate —, for instance, in the manner of a terminally tensioned string—essentially opposite equally to one another, consequently at least in the imaginary cross sectional plane XY with an opposing phase shift of, for instance, 180°, and also the third and the fourth measuring tube $18_3, 18_4$ equally oscillate essentially opposite equally to one another.

Figure 7A:
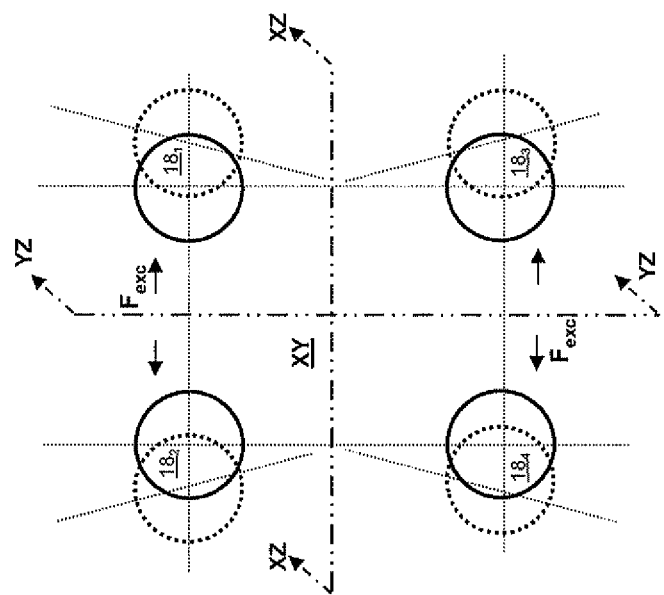
FIGS. 7*a* and 7*b* schematically, oscillation modes (V-mode; X-mode) of a tube arrangement of FIG. 4*b*, in each case as projected onto an imaginary cross sectional plane of said tube arrangement.

Investigations with measuring systems with a measuring transducer of the type being discussed have additionally surprisingly shown that, as wanted mode, especially also for ascertaining mass flow rate as well as density of the medium conveyed in the measuring transducer, especially that tube arrangement inherent, natural, oscillatory mode is suited—in the following referred to as the bending oscillation, fundamental mode of first type, or also as the V-mode oscillation —, in which, as also shown schematically in FIG. 7a, the first measuring tube and the second measuring tube execute relative to the second imaginary longitudinal section plane YZ opposite equal bending oscillations about, in each case, a static rest position associated with the respective measuring tube, and in which the third measuring tube and the fourth measuring tube execute relative to the second imaginary longitudinal section plane likewise opposite equal bending oscillations about, in each case, a static rest position associated with the respective measuring tube, and, indeed, such that— relative to the second imaginary longitudinal section plane YZ—said bending oscillations of the first measuring tube are also opposite equal to said bending oscillations of the third measuring tube, and that—relative to the second imaginary longitudinal section plane YZ—said bending oscillations of the second measuring tube are also opposite equal to said bending oscillations of the fourth measuring tube. The opposite equal bending oscillations (causing the inner part in projection on the cross sectional plane XY to appear, at times, V-shaped (compare FIG. 7a)) of the first and second measuring tubes, and, respectively, of the third and fourth measuring tubes, in the V-mode are, in the case of a symmetrically constructed tube arrangement and a uniformly flowed through tube arrangement, additionally symmetrically developed relative to the second imaginary longitudinal section plane YZ. The special suitability of the V-mode as wanted mode for measuring transducers with four straight measuring tubes could, in such case, especially also be attributed especially to the, for the oscillatory behavior of the measuring transducer—considered both spatially as well as also in time —, in such case, as a whole, very favorable resulting stress distribution in the measuring transducer, especially also in the region of the two flow dividers, as well as also to the equally favorable, consequently very small, oscillation related deformations of the measuring transducer in general, as well as also of the flow dividers in particular.

Figure 7B:
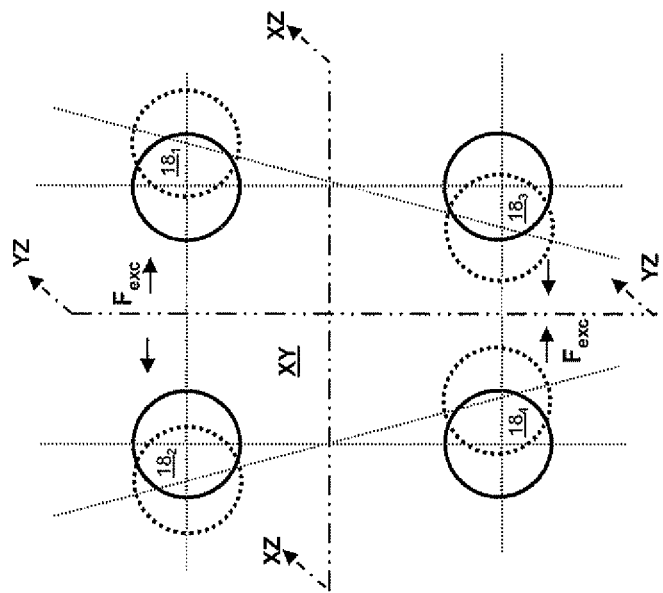

Besides the aforementioned V-mode, the inner part has additionally also a natural bending oscillation mode of second type—referenced in the following as the X-mode —, in which—as shown schematically in FIG. 7b—the first measuring tube and the second measuring tube execute, relative to the second imaginary longitudinal section plane YZ, opposite equal bending oscillations about the, in each case, associated static rest position and in which the third measuring tube and the fourth measuring tube execute, relative to the second imaginary longitudinal section plane YZ, opposite equal bending oscillations about, in each case, the associated static rest position, in contrast with the bending oscillations in the V-mode, however, in the manner that—relative to the second imaginary longitudinal section plane YZ—said bending oscillations of the first measuring tube are also opposite equal to said bending oscillations of the fourth measuring tube, and that—relative to the second imaginary longitudinal section plane YZ—said bending oscillations of the second measuring tube are also opposite equal to said bending oscillations of the third measuring tube. In the case of symmetrically constructed and uniformly flowed through inner parts, moreover, also the bending oscillations (causing the inner part in projection on the cross sectional plane XY to appear, at times, X-shaped (compare FIG. 7b)) in the X-mode are likewise symmetric relative to the second imaginary longitudinal section plane YZ.

In order to assure a separate, especially also defined, exciting of the V-mode, or of the X-mode, over an as broad as possible operating range of the measuring transducer (characterized by, among other things, during operation, fluctuating densities, mass flow rates, temperature distributions in the measuring transducer, etc.), according to an additional embodiment of the invention, the tube arrangement formed by means of the four measuring tubes, consequently the therewith formed, measuring transducer, is so dimensioned that an eigenfrequency $f_{18V}$ of the bending oscillation mode of first type (V-mode) measurable, for example, in the case of a tube arrangement filled completely with water, is different from an eigenfrequency $f_{18X}$ of the bending oscillation mode of second type (X-mode) measurable especially in the case of a tube arrangement filled completely with water, and, respectively, at the same time as the eigenfrequency $f_{18V}$ of the bending oscillation mode of first type (V-mode), for example, such that the eigenfrequencies $f_{18V}, f_{18X}$ of the two said bending oscillation modes (V-mode, X-mode) deviate from one another by 10 Hz or more. Especially also for the case of large nominal diameters of more than 100 mm, the tube arrangement is so embodied that said eigenfrequency $f_{18V}$ of the bending oscillation mode of first type is more than 10 Hz greater than said eigenfrequency $f_{18X}$ of the bending oscillation mode of second type. The exciter mechanism is, according to an additional embodiment of the invention, consequently, embodied in such a manner that, therewith, the first measuring tube $18_1$ and the second measuring tube $18_2$ are excitable during operation to opposite equal bending oscillations and the third measuring tube $18_3$ and the fourth measuring tube $18_4$ during operation to opposite equal bending oscillations, especially also bending oscillations corresponding to the bending oscillation mode of first type (V-mode) at its instantaneous eigenfrequency $f_{18V}$, and, respectively, bending oscillations corresponding to the bending oscillation mode of second type (X-mode) at its instantaneous eigenfrequency $f_{18X}$, the latter bending oscillations, in given cases, also simultaneously with the bending oscillations corresponding to the bending oscillation mode of first type (V-mode).

In an additional embodiment of the invention, the exciter mechanism 5 is formed by means of a first oscillation exciter $5_1$ acting, especially differentially, on the first measuring tube $18_1$ and the second measuring tube $18_2$, especially also for the purpose of exciting opposite equal bending oscillations of the first and second measuring tubes and/or of the third and fourth measuring tubes. Additionally, it is provided that serving as first oscillation exciter $5_1$ is an oscillation exciter of electrodynamic type acting, especially differentially, on at least two of the measuring tubes $18_1$, $18_2$, $18_3$, $18_4$. Accordingly, the first oscillation exciter $5_1$ is formed additionally by means of a permanent magnet held on the first measuring tube and a cylindrical coil held on the second measuring tube and permeated by the magnetic field of the permanent magnet, especially in the manner of a coil, plunging arrangement, in the case of which the cylindrical coil is arranged coaxially with the permanent magnet and the permanent magnet is embodied as an armature plunging within the coil.

For the purpose of increasing the efficiency of the exciter mechanism and, respectively, for the purpose of increasing the exciter forces generated therewith while simultaneously achieving an as symmetric as possible construction, the exciter mechanism comprises, in a further development of the invention, additionally a second oscillation exciter $5_2$ acting, especially electrodynamically and/or differentially, on the third measuring tube $18_3$ and the fourth measuring tube $18_4$. The second oscillation exciter $5_2$ is, in advantageous manner, embodied with equal construction to that of the first oscillation exciter $5_1$, at least insofar as it works analogously to its principle of action, for example, thus likewise is of electrodynamic type. In an additional embodiment, the second oscillation exciter $5_2$ is, consequently, formed by means of a permanent magnet held on the third measuring tube and a cylindrical coil held on the fourth measuring tube and permeated by the magnetic field of the permanent magnet. The two oscillation exciters $5_1$, $5_2$ of the exciter mechanism 5 can, in advantageous manner, be electrically serially interconnected, especially in such a manner that a common driver signal consequently excites simultaneous oscillations of the measuring tubes $18_1$, $18_3$, $18_2$, $18_4$, for instance, bending oscillations in the V-mode and/or in the X-mode. Particularly for the earlier mentioned case, in which both bending oscillations in the V-mode as well as also bending oscillations in the X-mode should be actively excited by means of the two oscillation exciters $5_1$, $5_2$, it can be of advantage so to dimension the oscillation exciters $5_1$, $5_2$ and so to apply them to the tube arrangement, that, as a result, a transmission factor of the first oscillation exciter $5_1$, defined by a ratio of therein fed electrical excitation power to an exciter force effecting oscillations of the measuring tubes produced therewith, is different, at least within a frequency band including the V-mode and the X-mode, from a transmission factor of the second oscillation exciter $5_2$, defined by a ratio of therein fed electrical excitation power to an exciter force effecting oscillations of the measuring tubes produced therewith, for instance, in such a manner that said transmission factors deviate from one another by 10% or more. This enables, for example, also a separated exciting of V- and X-modes, especially also in the case of series connection of the two oscillation exciters $5_1$, $5_2$ and/or supplying of the two oscillation exciters $5_1$, $5_2$ with a single, shared, driver signal, and can be achieved in the case of electrodynamic oscillation exciters $5_1$, $5_2$ in very simple manner e.g. by application of cylindrical coils with different impedances, or different turns numbers and/or by differently dimensioned permanent magnets, or permanent magnets of different magnetic materials. It should here additionally be mentioned that, although the oscillation exciter, or the oscillation exciters, of the exciter mechanism shown here in the example of an embodiment act, in each case, for instance, centrally on the respective measuring tubes, alternatively or in supplementation, also oscillation exciters acting instead on the inlet and on the outlet sides of the particular measuring tube can be used, for instance, in the manner of the exciter mechanisms proposed in U.S. Pat. No. 4,823,614 or U.S. Pat. No. 4,831,885.

As evident from FIGS. 2, 4, 5a and 5b and usual in the case of measuring transducers of the type being discussed, additionally provided in the measuring transducer 11 is a vibration sensor arrangement 19, for example, an electrodynamic sensor arrangement, reacting to vibrations of the measuring tubes $18_1$, $18_2$, $18_3$, or $18_4$, especially inlet, and outlet-side vibrations, especially bending oscillations excited by means of the exciter mechanism 5, for producing oscillation signals representing vibrations, especially bending oscillations, of the measuring tubes and influenced, for example, as regards a frequency, a signal amplitude and/or a phase position—relative to one another and/or relative to the driver signal—by the measured variable to be registered, such as, for instance, mass flow rate and/or density and a viscosity of the medium, respectively.

In an additional embodiment of the invention, the vibration sensor arrangement is formed by means of an inlet-side, first oscillation sensor $19_1$, especially an electrodynamic, first oscillation sensor and/or a first oscillation sensor differentially registering at least oscillations of the first measuring tube $18_1$ relative to the second measuring tube $18_2$, as well as an outlet-side, second oscillation sensor $19_2$, especially an electrodynamic, second oscillation sensor and/or a second oscillation sensor differentially registering at least oscillations of the first measuring tube $18_1$ relative to the second measuring tube $18_2$, which two oscillation sensors deliver, respectively, a first, and a second, oscillation signal reacting to movements of the measuring tubes $18_1$, $18_2$, $18_3$, $18_4$, especially their lateral deflections and/or deformations. This, especially, in such a manner that at least two of the oscillation signals delivered by the vibration sensor arrangement 19 have a phase shift relative to one another, which corresponds to, or depends on, the instantaneous mass flow rate of the medium flowing through the measuring tubes, as well as, in each case, a signal frequency, which depends on an instantaneous density of the medium flowing in the measuring tubes. The two oscillation sensors $19_1$, $19_2$, for example, oscillation sensors constructed equally to one another, can, for such purpose—such as quite usual in the case of measuring transducers of the type being discussed—be placed essentially equidistantly from the first oscillation exciter $5_1$ in the measuring transducer 11. Moreover, the oscillation sensors of the vibration sensor arrangement 19 can, at least, insofar as they are of equal construction to that of the at least one oscillation exciter of the exciter mechanism 5, work analogously to its principle of action, for example, thus be likewise of electrodynamic type. In a further development of the invention, the vibration sensor arrangement 19 is additionally formed also by means of an inlet-side, third oscillation sensor $19_3$, especially an electrodynamic, oscillation sensor and/or an oscillation sensor differentially registering oscillations of the third measuring tube $18_3$ relative to the fourth measuring tube $18_4$, as well as an outlet-side, fourth oscillation sensor $19_4$, especially an electrodynamic, fourth oscillation sensor $19_4$ and/or an electrodynamic oscillation sensor differentially registering oscillations of the third measuring tube $18_3$ relative to the fourth measuring tube $18_4$. For additional improving of signal quality, as well as also for simplifying the transmitter electronics 12 receiving the measurement signals, furthermore, the first and third oscillation sensors $19_1$, $19_3$ can be electrically interconnected in series, for example, in such a manner that a combined oscillation signal represents combined inlet-side, oscillations of the first and third measuring tubes $18_1$, $18_3$ relative to the second and fourth measuring tubes $18_2$, $18_4$. Alternatively or in supplementation, also the second and fourth oscillation sensors $19_2$, $19_4$ can be electrically interconnected in series in such a manner that a combined oscillation signal of both oscillation sensors $19_2$, $19_4$ represents combined outlet-side, oscillations of the first and third measuring tubes $18_1$, $18_3$ relative to the second and fourth measuring tubes $18_2$, $18_4$.

For the aforementioned case, in which the oscillation sensors of the vibration sensor arrangement 19, especially oscillation sensors constructed equally to one another, should register oscillations of the measuring tubes differentially and electrodynamically, the first oscillation sensor $19_1$ is formed by means of a permanent magnet held to the first measuring tube—here in the region of oscillations to be registered on the inlet side—and a cylindrical coil permeated by the magnetic field of the permanent magnet and held to the second measuring tube—here correspondingly likewise in the region of oscillations to be registered on the inlet side —, and the second oscillation sensor $19_2$ is formed by means of a permanent magnet held—in the region of oscillations to be registered on the outlet side—to the first measuring tube and a cylindrical coil permeated by the magnetic field of the permanent magnet and held to the second measuring tube—here correspondingly likewise in the region of oscillations to be registered on the outlet side. Equally, additionally also the, in given cases, provided, third oscillation sensor $19_3$ can correspondingly be formed by means of a permanent magnet held to the third measuring tube and a cylindrical coil permeated by the magnetic field of the permanent magnet and held to the fourth measuring tube, and the, in given cases, provided, fourth oscillation sensor $19_4$ by means of a permanent magnet held to the third measuring tube and a cylindrical coil permeated by the magnetic field of the permanent magnet and held to the fourth measuring tube.

For assuring an as high as possible sensitivity of the measuring transducer to mass flow, in an additional embodiment of the invention, the measuring tubes and the oscillation sensors are so arranged in the measuring transducer that a measuring length, $L_{19}$, of the measuring transducer corresponding to a distance measured along a deflection curve, or bending line, of the first measuring tube between the first oscillation sensor $19_1$ and the second oscillation sensor $19_2$ amounts to more than 500 mm, especially more than 600 mm. Particularly for creating an as compact as possible measuring transducer, which is, nevertheless, as sensitive as possible to mass flow, in an additional embodiment of the invention, the oscillation sensors $19_1$, $19_2$, are, matched to the installed length $L_{11}$ of the measuring transducer, so arranged in the measuring transducer that a measuring length to installed length ratio $L_{19}/L_{11}$ of the measuring transducer, which is defined by a ratio of the measuring length to the installed length of the measuring transducer, amounts to more than 0.3, especially more than 0.4 and/or less than 0.7. Alternatively or in supplementation, the oscillation sensors, in an additional embodiment of the invention, are, matched to the measuring tubes, so placed in the measuring transducer that a caliber to measuring length ratio $D_{18}/L_{19}$, of the measuring transducer, which is defined by a ratio of the caliber $D_{18}$ of the first measuring tube to the mentioned measuring length $L_{19}$ of the measuring transducer, amounts to more than 0.05, especially more than 0.09.

It is to be noted here additionally that, although, in the case of the oscillation sensors of the vibration sensor arrangement 19 illustrated in the example of an embodiment, the oscillation sensor is, in each case, of electrodynamic type, thus, in each case, formed by means of a cylindrical magnet coil affixed to one of the measuring tubes and a therein plunging permanent magnet correspondingly affixed to an oppositely lying measuring tube, additionally also other oscillation sensors known to those skilled in the art, such as e.g. optoelectronic sensors, can be used for forming the sensor arrangement. For the rest, such as quite usual in the case of measuring transducers of the type being discussed, supplementally to the oscillation sensors, other, especially auxiliary sensors, or sensors registering disturbance variables, can be provided in the measuring transducer, such as e.g. acceleration sensors for registering movements of the total measuring system caused by external forces and/or asymmetries in the tube arrangement, strain gages for registering expansions of one or more of the measuring tubes and/or the transducer housing, pressure sensors for registering a static pressure reigning in the transducer housing and/or temperature sensors for registering temperatures of one or more of the measuring tubes and/or the transducer housing, by means of which, for example, the ability of the measuring transducer to function and/or changes of the sensitivity of the measuring transducer to the measured variables primarily to be registered, especially mass flow rate and/or density, as a result of cross sensitivities, or external disturbances, can be monitored and, in given cases, correspondingly compensated.

The vibration sensor arrangement 19 is additionally, as usual in the case of such measuring transducers, coupled in suitable manner, for example, hardwired via connecting lines, with a measuring circuit correspondingly provided in the transmitter electronics, for example, a measuring circuit formed by means of at least one microprocessor and/or by means of at least one digital signal processor. The measuring circuit receives the oscillation signals of the vibration sensor arrangement 19 and generates therefrom, in given cases, also taking into consideration electrical excitation power fed by means of the at least one driver signal into the exciter mechanism, and, consequently, also therein converted, the initially mentioned measured values, which can represent, for example, mass flow rate, a totaled mass flow and/or density and/or a viscosity of the medium to be measured, and which, in given cases, can be displayed on-site and/or also sent in the form of digital measured data to a data processing system superordinated to the measuring system and there correspondingly further processed. Especially, the measuring circuit, and, consequently, the therewith formed transmitter electronics, are additionally provided and designed, based on electrical excitation power converted in the exciter mechanism, to generate, for example, periodically recurringly and/or on query, a viscosity measured value representing viscosity of the flowing medium and/or, based on oscillation signals delivered by the measuring transducer, to generate, for example, periodically recurringly and/or on query, a mass flow measured value representing mass flow rate of the flowing medium and/or, for example, periodically recurringly and/or on query, density measured value representing density of the flowing medium.

The above mentioned application of differentially acting, oscillation exciters, or oscillation sensors introduces, among other things, also the advantage that for operating the measuring transducer of the invention, also such established measuring, and driver, circuits can be used, such as have found broad application, for example, already in conventional Coriolis mass flow and/or density measuring devices.

The transmitter electronics 12, including the therein realized measuring, and driver, circuits, can, furthermore, be accommodated, for example, in a separate electronics housing $7_2$, which is arranged removed from the measuring transducer or, such as shown in FIG. 1, is affixed directly on the measuring transducer 1, for example, externally on the transducer housing $7_1$, in order to form a single compact device. In the case of the here illustrated example of an embodiment, consequently, placed on the transducer housing $7_1$ is, additionally, a neck-like, transition piece serving for holding the electronics housing $7_2$. Within the transition piece can additionally be arranged a feedthrough for the electrical connecting lines between measuring transducer 11, especially the therein placed oscillation exciters and sensors, and the mentioned transmitter electronics 12. The feedthrough is manufactured to be hermetically sealed and/or pressure resistant, for example, by means of glass, and/or plastic potting compound.

As already multiply mentioned, the in-line measuring device and, thus, also the measuring transducer 11, is provided especially for measurements also of high mass flows of more than 400 t/h in a pipeline of large caliber of more than 100 mm. Taking this into consideration, according to an additional embodiment of the invention, the nominal diameter of the measuring transducer 11, which, as already mentioned, corresponds to a caliber of the pipeline, in whose course the measuring transducer 11 is to be used, is so selected that it amounts to more than 100 mm, especially, however, is greater than 150 mm. Additionally, according to a further embodiment of the measuring transducer, it is provided that each of the measuring tubes $18_1$, $18_2$, $18_3$, $18_4$ has a caliber $D_{18}$ corresponding to a particular tube inner diameter, which amounts to more than 40 mm. Especially, the measuring tubes $18_1$, $18_2$, $18_3$, $18_4$ are additionally so embodied that each has a caliber $D_{18}$ of more than 60 mm. Alternatively thereto or in supplementation thereof, the measuring tubes $18_1$, $18_2$, $18_3$, $18_4$ are, according to another embodiment of the invention, additionally so dimensioned that they have, in each case, a measuring tube length $L_{18}$ of at least 1000 mm. The measuring tube length $L_{18}$ corresponds, in the here illustrated example of an embodiment with equal length measuring tubes $18_1$, $18_2$, $18_3$, $18_4$, in each case, to a length of a section of the deflection curve, or bending line, of the first measuring tube extending between the first flow opening of the first flow divider and the first flow opening of the second flow divider. Especially, the measuring tubes $18_1$, $18_2$, $18_3$, $18_4$ are, in such case, so designed that their measuring tube length $L_{18}$ is, in each case, greater than 1200 mm. Accordingly, there results, at least for the mentioned case that the measuring tubes $18_1$, $18_2$, $18_3$, $18_4$ are composed of steel, in the case of the usually used wall thicknesses of over 1 mm, a mass of, in each case, at least 20 kg, especially more than 30 kg. One tries, however, to keep the empty mass of each of the measuring tubes $18_1$, $18_2$, $18_3$, $18_4$ smaller than 50 kg.

In consideration of the fact that, as already mentioned, each of the measuring tubes $18_1$, $18_2$, $18_3$, $18_4$, in the case of the measuring transducer of the invention, weighs well over 20 kg and, in such case, such as directly evident from the above dimensional specifications, can have a capacity of easily 10 or more, the tube arrangement comprising then the four measuring tubes $18_1$, $18_2$, $18_3$, $18_4$ can, at least in the case of medium with high density flowing through, reach a total mass of far over 80 kg. Especially in the case of the application of measuring tubes with comparatively large caliber $D_{18}$, large wall thickness and large measuring tube length $L_{18}$, the mass of the tube arrangement formed by the measuring tubes $18_1$, $18_2$, $18_3$, $18_4$ can directly, however, also be greater than 100 kg or, at least with medium flowing through, e.g. oil or water, be more than 120 kg. As a result of this, an empty mass $M_{11}$ of the measuring transducer amounts, in total, also to far more than 200 kg, and, in the case of nominal diameters $D_{11}$ of significantly greater than 250 mm, even more than 300 kg. As a result, the measuring transducer of the invention can have a mass ratio $M_{11}/M_{18}$ of an empty mass $M_{11}$ of the total measuring transducer to an empty mass $M_{18}$ of the first measuring tube of easily greater than 10, especially greater than 15.

In order, in the case of the mentioned high empty mass $M_{11}$ of the measuring transducer, to employ the therefor, in total, applied material as optimally as possible and, thus, to utilize the—most often also very expensive—material, in total, as efficiently as possible, according to an additional embodiment, the nominal diameter $D_{11}$ of the measuring transducer is so dimensioned relative to its empty mass $M_{11}$ that a mass to nominal diameter ratio $M_{11}/D_{11}$ of the measuring transducer 11, as defined by a ratio of the empty mass $M_{11}$ of the measuring transducer 11 to the nominal diameter $D_{11}$ of the measuring transducer 11, is smaller than 2 kg/mm, especially as much as possible, however, smaller than 1 kg/mm. In order to assure a sufficiently high stability of the measuring transducer 11, the mass to nominal diameter ratio $M_{11}/D_{11}$ of the measuring transducer 11 is, at least in the case use of the above mentioned conventional materials, however, to be chosen as much as possible greater than 0.5 kg/mm. Additionally, according to an additional embodiment of the invention, for additional improvement of the efficiency of the installed material, the mentioned mass ratio $M_{11}/M_{18}$ is kept smaller than 25.

For creation of a nevertheless as compact as possible measuring transducer of sufficiently high oscillation quality factor and as little pressure drop as possible, according to an additional embodiment of the invention, the measuring tubes are so dimensioned relative to the above mentioned, installed length $L_{11}$ of the measuring transducer 11 that a caliber to installed length ratio $D_{18}/L_{11}$ of the measuring transducer, as defined by a ratio of the caliber $D_{18}$ at least of the first measuring tube to the installed length $L_{11}$ of the measuring transducer 11, amounts to more than 0.02, especially more than 0.05 and/or less than 0.09, especially less than 0.07. Alternatively or in supplementation, the measuring tubes $18_1$, $18_2$, $18_3$, $18_4$ are so dimensioned relative to the above mentioned installed length $L_{11}$ of the measuring transducer that a measuring tube length to installed length ratio $L_{18}/L_{11}$ of the measuring transducer, as defined by a ratio of the above-referenced measuring tube length $L_{18}$ at least of the first measuring tube to the installed length $L_{11}$ of the measuring transducer, amounts to more than 0.7, especially more than 0.8 and/or less than 1.2.

In case required, mechanical stresses and/or vibrations possibly or at least potentially caused on the inlet side, or on the outlet side in the transducer housing by the vibrating measuring tubes, especially measuring tubes dimensioned relatively large in the mentioned manner, can be minimized e.g. by connecting the four measuring tubes $18_1$, $18_2$, $18_3$, $18_4$ mechanically at least pairwise with one another on the inlet side and on the outlet side at least pairwise, in each case, by means of coupling elements—in the following coupling elements of first type—serving as so-called node plates. Moreover, by means of such coupling elements of first type, be it by their dimensions and/or by their positioning on the measuring tubes, mechanical eigenfrequencies of the measuring tubes and, thus, also mechanical eigenfrequencies of the tube arrangement formed by means of the four measuring tubes, as well as additional components of the measuring transducer placed thereon and, insofar, also the oscillatory behavior of the tube arrangement, as a whole, can be influenced with targeting. Particularly, by means of such coupling elements of first type, in simple, equally as well, effective manner, a sufficient separating of the mentioned V-mode from the X-mode as regards their eigenfrequencies $f_{18V}$; $f_{18X}$; on the one hand, as well as, on the other hand, also an improving of the mechanical coupling of the four measuring tubes for equalizing oscillations simultaneously executed by the four measuring tubes, for instance, also the bending oscillations actively excited in the wanted mode, can be achieved. The coupling elements of first type serving as node plates can be, for example, thin plates- or washers, especially plates- or washers manufactured from the same material as the measuring tubes and provided, in each case, with bores corresponding to the number and outer dimensions of the measuring tubes to be coupled with one another, in given cases, supplementally slitted to the edge, so that the washers can first be inserted to clamp on the respective measuring tubes $18_1$, $18_2$, $18_3$, and $18_4$ and, in given cases, thereafter connected with the respective measuring tubes, for example, bonded by hard solder or welding.

In accordance therewith, the measuring system further comprises, in an additional embodiment of the invention, especially also for the purpose of tuning oscillation characteristics of the tube arrangement: A first coupling element $24_1$ of first type spaced both from the first flow divider as well as also from the second flow divider and affixed on the inlet side to each of the four measuring tubes, for example, a first coupling element $24_1$ having an essentially X-shaped, basic shape or an essentially H-shaped, basic shape, for tuning eigenfrequencies of natural oscillation modes of the tube arrangement and, respectively, for forming inlet-side oscillation nodes for vibrations of the measuring tubes; as well as a second coupling element $24_2$ of first type spaced both from the first flow divider as well as also from the second flow divider and affixed on the outlet side to each of the four measuring tubes, for instance, a second coupling element $24_2$ essentially constructed equally to the first coupling element $24_1$ of first type, in given cases, also having an essentially X-shaped or essentially H-shaped, basic shape, for tuning eigenfrequencies of natural oscillation modes of the tube arrangement and, respectively, for forming outlet-side oscillation nodes for vibrations of the measuring tubes. The coupling elements $24_1$ of first type can, for example, in each case, be formed by means of plate shaped elements or, as schematically indicated in FIG. 4, be produced by means of a monolithic blanked, bent part. The two coupling elements of first type are in the example of an embodiment shown in FIG. 4, or 5a, 5b additionally so embodied and placed on the measuring tubes that they are essentially symmetrically placed relative to the mentioned first imaginary longitudinal section plane XZ of the measuring transducer, or relative to the mentioned second imaginary longitudinal section plane YZ of the measuring transducer, consequently, thus, the first imaginary longitudinal section plane XZ and/or the second imaginary longitudinal section plane YZ are/is, in each case, also a plane of symmetry of each of the two coupling elements of first type. The two coupling elements of first type in the measuring transducer are, moreover, also preferably symmetrical relative to the mentioned imaginary cross sectional plane XY of the measuring transducer and, consequently equidistant and parallel extending relative to said cross sectional plane XY. Each of the aforementioned coupling elements $24_1$, $24_2$ of first type, especially coupling elements $24_1$, $24_2$ of first type constructed equally to one another, is, in an additional embodiment of the invention, plate shaped, especially in such a manner that it has, as evident from the figures, as projected onto the mentioned imaginary cross sectional plane XY of the measuring transducer, a rather rectangular or also square, or, however, also a rather round or an oval, basic shape. Particularly also for attaining an as simple as possible, equally as well, effective, separating of the aforementioned V-mode of the tube arrangement from the likewise inherent X-mode as regards their eigenfrequencies $f_{18V}$, $f_{18X}$, it can, however, also be quite advantageous to construct each of the two coupling elements $24_1$, $24_2$ of first type in such a manner that it has, as projected onto the mentioned imaginary cross sectional plane XY of the measuring transducer, in each case, a cross-, or X-shaped or also a rather H-shaped, basic shape. As directly evident from FIG. 4, or FIGS. 5a, 5b, the two aforementioned coupling elements $24_1$, $24_2$ of first type are additionally so embodied and so placed in the measuring transducer that a center of mass of the first coupling element $24_1$ of first type has a distance from a center of mass of the measuring transducer 11, which is essentially equal to a distance of a center of mass of the second coupling element $24_2$ of first type from said center of mass of the measuring transducer 11, especially in such a manner that the two coupling elements $24_1$, $24_2$ are, as a result, arranged symmetrically to a shared imaginary cross sectional plane cutting the measuring tubes $18_1$, $18_2$, $18_3$, $18_4$, in each case, centrally. Additionally, the two coupling elements $24_1$, $24_2$ can be oriented extending essentially parallel relative to one another.

For additionally increasing the degrees of freedom in optimizing the oscillatory behavior of the tube arrangement formed by means of the four measuring tubes $18_1$, $18_2$, $18_3$, $18_4$, the measuring transducer 11, in a further development of the invention, additionally comprises a third coupling element $24_3$ of first type, which, for forming inlet-side oscillation nodes at least for vibrations, especially bending oscillations, of the third measuring tube $18_3$ and for thereto opposite phase vibrations, especially bending oscillations, of the fourth measuring tube $18_4$, is spaced both from the first flow divider $20_1$ as well as also from the second flow divider $20_2$ and affixed on the inlet side at least to the third $18_3$ measuring tube and to the fourth measuring tube $18_4$. Moreover, the measuring transducer 11 comprises, in the case of this further development, a fourth coupling element $24_4$ of first type (especially a fourth coupling element $24_4$ of first type constructed equally to the third coupling element $24_3$ of first type), which, for forming outlet-side oscillation nodes at least for vibrations, especially bending oscillations, of the third measuring tube $18_3$ and for thereto opposite phase vibrations, especially bending oscillations, of the fourth measuring tube $18_4$, is spaced both from the first flow divider $20_1$ as well as also from the second flow divider $20_2$, as well as also from the third coupling element $24_3$ of first type, and affixed on the outlet side at least to the third measuring tube $18_3$ and to the fourth measuring tube $18_4$.

Figure 5A:
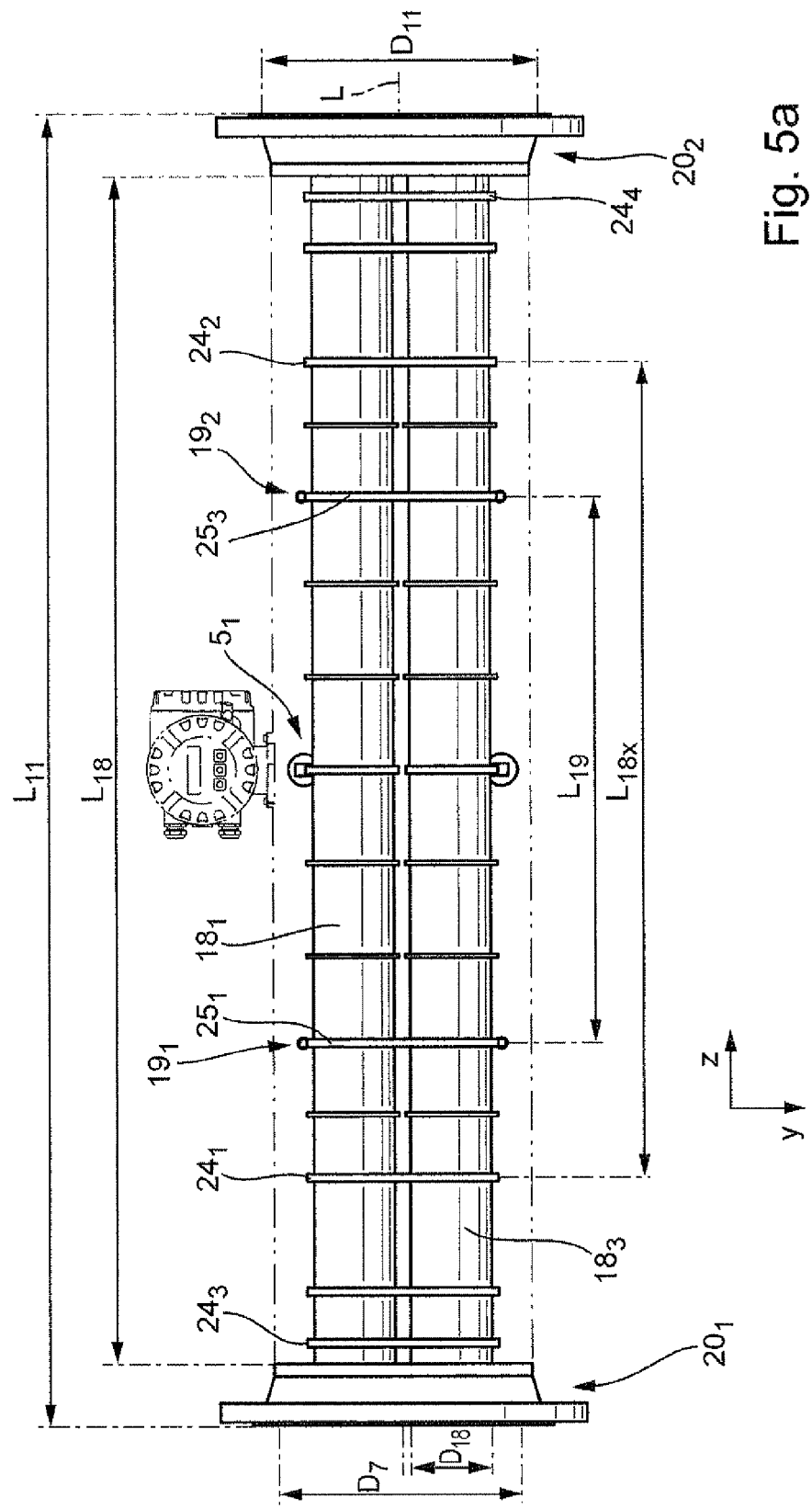
FIGS. 5*a* and 5*b* projection of the measuring transducer of FIG. 4 in two different side views.
Figure 5B:
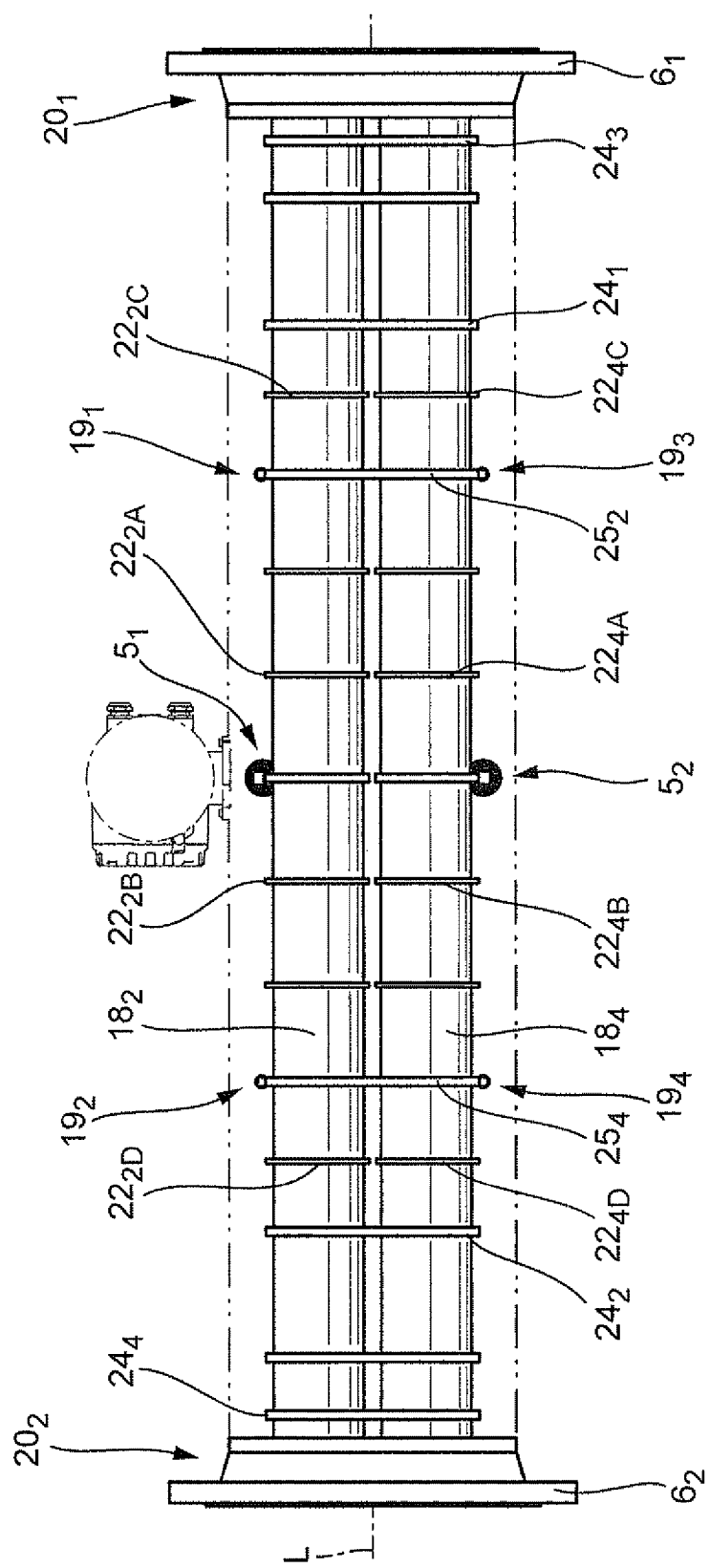
Figure 6B:
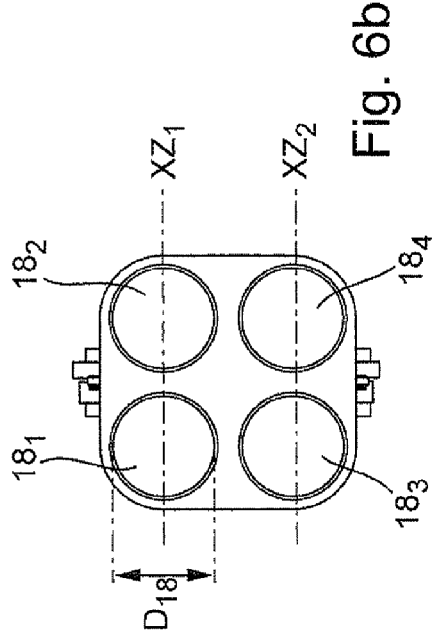
FIGS. 6*a* and 6*b* projection of an inner part of the measuring transducer of FIG. 4 in two different side views.
Figure 6A:
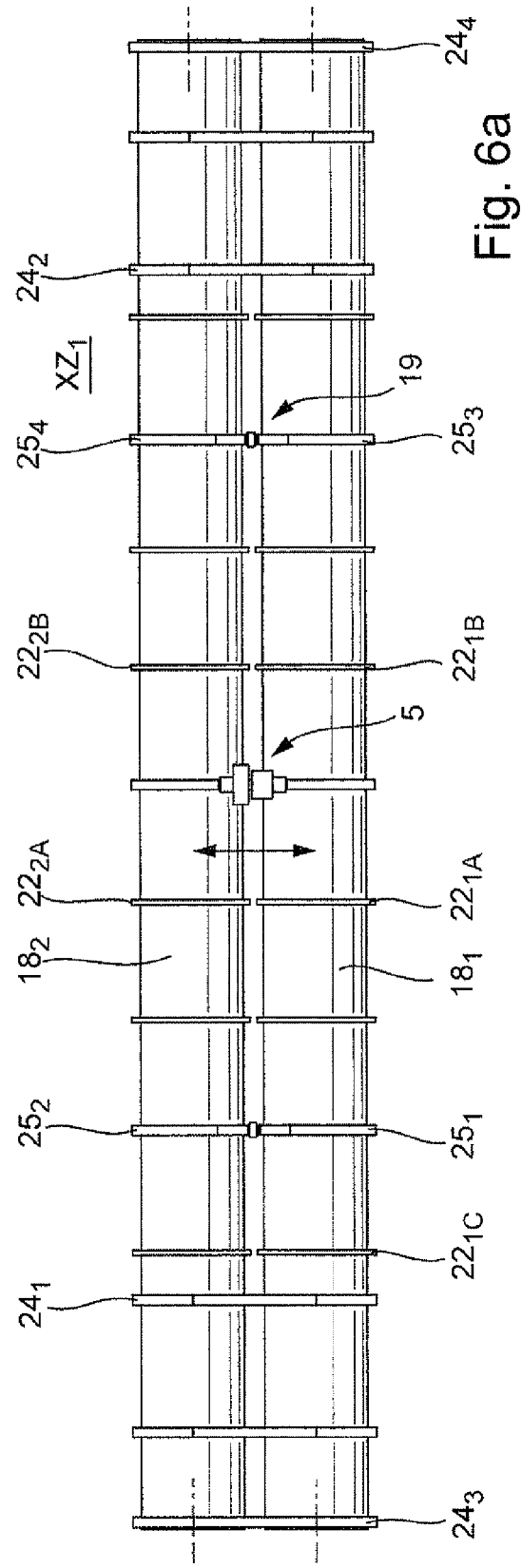

As evident, furthermore, from the combination of FIGS. 4, 5a and 5b, a minimum distance between the coupling element of first type—here the first coupling element $24_1$ of first type—lying nearest the center of mass of the measuring transducer 11 and affixed on the inlet side to the respective measuring tube and the coupling element of first type—here thus the second coupling element $24_2$ of first type—lying nearest the center of mass of the measuring transducer and affixed on the outlet side to said measuring tube defines, in each case, a wanted oscillation length, $L_{18x}$, of such measuring tube, wherein, in an additional embodiment of the invention, the coupling elements of first type are so placed in the measuring transducer that, as a result, the wanted oscillation length of each of the measuring tubes $18_1$, $18_2$, $18_3$, $18_4$ amounts to less than 2500 mm, especially less than 2000 mm and/or more than 800 mm. Alternatively or in supplementation, it is additionally provided that all four measuring tubes $18_1$, $18_2$, $18_3$, $18_4$ have the same wanted oscillation length $L_{18x}$. It can additionally be quite advantageous in the sense of a yet simpler and yet more exact adjusting of the oscillatory behavior of the measuring transducer, as well as also for the purpose of additional minimizing of mechanical stresses and/or vibrations potentially caused on the inlet side or on the outlet side in the transducer housing by the vibrating, in given cases, also relatively large dimensioned, measuring tubes, when the measuring transducer, moreover, has still other coupling elements of the aforementioned type, for example, thus, as a whole, 6 or 8 of such coupling elements of first type, serving for forming inlet-, or outlet-side oscillation nodes for vibrations, especially bending oscillations, of the first measuring tube and for thereto opposite phase vibrations, especially bending oscillations, of the second measuring tube, or for vibrations, especially bending oscillations, of the third measuring tube and for thereto opposite phase vibrations, especially bending oscillations, of the fourth measuring tube.

For the purpose of providing an as compact as possible measuring transducer of sufficiently high oscillation quality factor and high sensitivity to mass flow in the case of an as little as possible pressure drop, in an additional embodiment of the invention, the oscillation sensors, matched to the installed length of the measuring, transducer, are so arranged in the measuring transducer that a measuring length to installed length ratio of the measuring transducer, which is defined by a ratio of the measuring length to the installed length of the measuring transducer, amounts to more than 0.3, especially more than 0.4 and/or less than 0.7, and/or the oscillation sensors, matched to the wanted oscillation length, are so arranged in the measuring transducer that a measuring length to oscillatory length ratio of the measuring transducer, defined by a ratio of the mentioned measuring length of the measuring transducer to the wanted oscillation length of the first measuring tube, amounts to more than 0.6, especially more than 0.65 and/or less than 0.95. Alternatively or in supplementation, the oscillation sensors, matched to the measuring tubes, in an additional embodiment of the invention, are so placed in the measuring transducer that a caliber to measuring length ratio $D_{18}/L_{19}$, of the measuring transducer, which is defined by a ratio of the caliber $D_{18}$ of the first measuring tube to the measuring length $L_{19}$ of the measuring transducer, amounts to more than 0.05, especially more than 0.09. In an additional embodiment of the invention, the above mentioned measuring length $L_{19}$ is kept less than 1200 mm. Additionally, according to a further embodiment of the invention, the measuring tubes $18_1$, $18_2$, $18_3$, $18_4$ are, matched to the mentioned, wanted, oscillatory length, so dimensioned that a caliber to oscillatory length ratio $D_{18}/L_{18x}$ of the measuring transducer, defined by a ratio of the caliber $D_{18}$ of the first measuring tube to the wanted, oscillatory length $L_{18x}$ of the first measuring tube, amounts to more than 0.07, especially more than 0.09 and/or less than 0.15. Alternatively or in supplementation to this, according to an additional embodiment of the invention, the measuring tubes $18_1$, $18_2$, $18_3$, $18_4$ are, matched to the above mentioned installed length $L_{11}$ of the measuring transducer, so dimensioned that an oscillatory length to installed length ratio $L_{18x}/L_{11}$ of the measuring transducer, defined by a ratio of the wanted, oscillatory length $L_{18x}$ of the first measuring tube to the installed length $L_{18}$ of the measuring transducer, amounts to more than 0.55, especially more than 0.6 and/or less than 0.9.

In an additional embodiment of the invention, it is, moreover, provided that the measuring tubes $18_1$, $18_2$, $18_3$, $18_4$ are allowed during operation to oscillate in the mentioned V-mode and, in such case, also partially to execute wanted torsional oscillations about a respective torsional oscillation axis parallel to, or coincident with, the mentioned connecting axes $Z_1$, $Z_2$, $Z_3$, $Z_4$, for instance, for the purpose of measuring viscosity of the medium and/or for the purpose of expanded measuring transducer diagnosis. For such purpose, the measuring transducer includes, according to a further embodiment of the invention, additionally, a first coupling element $25_1$ of second type, especially a plate shaped or rod shaped, first coupling element $25_1$ of second type, which is spaced both from the first coupling element $24_1$ of first type as well as also from the second coupling element $24_2$ of first type and affixed to the first measuring tube $18_1$ and to the third measuring tube $18_3$, but, otherwise, however, to no other measuring tube, insofar, thus only to the first measuring tube $18_1$ and to the third measuring tube $18_3$. Furthermore, the measuring transducer comprises, at least in the case of this embodiment of the invention, at least a second coupling element $25_2$ of second type, especially a plate shaped or rod shaped, second coupling element $25_2$ of second type, which is spaced both from the first coupling element $24_1$ of first type as well as also from the second coupling element $24_1$ of first type, as well as also from the first coupling element $25_1$ of second type, and affixed to the second measuring tube $18_2$ and to the fourth measuring tube $18_4$, but, otherwise, however, to no other measuring tube, insofar, thus only to the second measuring tube $18_2$ and to the fourth measuring tube $18_4$. As directly evident from the combination of FIGS. 4, 5a and 5b, the first and second coupling elements $25_1$, $25_2$ of second type are placed as much as possible lying opposite one another in the measuring transducer 11. Moreover, the measuring transducer comprises, additionally, a third coupling element $25_3$ of second type, for example, again, a plate shaped or rod shaped, third coupling element $25_3$ of second type, which is spaced both from the first coupling element $24_1$ of first type as well as also from the second coupling element $24_2$ of first type, as well as also from the first coupling element $25_1$ of second type, and affixed to the first measuring tube $18_1$ and to the third measuring tube $18_3$, but, otherwise, however, to no other measuring tube, insofar, thus only to the first measuring tube $18_1$ and to the third measuring tube $18_3$, as well as a fourth coupling element $25_4$ of second type, especially a plate shaped or rod shaped, fourth coupling element $25_4$ of second type, which is spaced both from the first and second coupling elements of first type as well as also from the second and third coupling elements of second type, and, in each case, affixed to the second measuring tube $18_2$ and to the fourth measuring tube $18_4$, but, otherwise, however, to no other measuring tube, insofar, thus only to the second measuring tube $18_2$ and to the fourth measuring tube $18_4$. The third and fourth coupling elements $25_3$, $25_4$ of second type are, as directly evident from the combination of FIGS. 4, 5a and 5b, preferably placed likewise lying opposite one another in the measuring transducer 11. In the example of an embodiment shown here, the first and second coupling elements $25_1$ of second type are, in each case, affixed, in the region of the inlet-side, first oscillation sensor, to the first and third measuring tubes $18_1$, $18_3$, and, respectively, to the second and fourth measuring tubes $18_2$, $18_4$. Analogously thereto, the third and fourth coupling elements $25_3$ of second type are, in each case, affixed, in the region of the outlet-side, second oscillation sensor, to the first and third measuring tubes $18_1$, $18_3$, and, respectively, to the second and fourth measuring tubes $18_2$, $18_4$.

Furthermore, it can be of advantage to use the aforementioned coupling elements of second type also for holding individual components of the sensor arrangement. In accordance therewith, in an additional embodiment of the invention, it is provided that parts of the inlet-side, first oscillation sensor $19_1$ are held, respectively, on the first and second coupling elements $25_1$, $25_2$ of second type. Additionally, the second oscillation sensor $19_2$ is, in, corresponding manner, held on the third and fourth coupling elements $25_3$, $25_4$ of second type. For example, in the case of electrodynamic oscillation sensors, the cylindrical coil of the first oscillation sensor $19_1$ can be affixed to the first coupling element of second type and the associated permanent magnet to the oppositely lying, second coupling element of second type, or the cylindrical coil of the second oscillation sensor $19_2$ to the third and the associated permanent magnet to the oppositely lying fourth, coupling element of second type. For the mentioned case, in which the sensor arrangement 19 is formed by means of four oscillation sensors $19_1$, $19_2$, $19_3$, $19_4$, in an additional embodiment of the invention, both the first oscillation sensor $19_1$ and also the third oscillation sensor $19_3$ are, in each case, held partially on the first and partially on the second coupling elements of second type, especially in such a manner, that, as directly evident from the combination of FIGS. 4, 5a and 5b, a minimum distance between the first and third oscillation sensors $19_1$, $19_3$ is more than twice as great as a tube outer diameter of the first measuring tube $18_1$. In corresponding manner, additionally, also the second oscillation sensor $19_2$ and the fourth oscillation sensor $19_4$ are, in each case, held to the third and fourth coupling elements of second type, especially in such a manner that, as directly evident from the combination of FIGS. 4, 5a and 5b, a minimum distance between the second and fourth oscillation sensors $19_2$, $19_4$ is more than twice as great as a tube outer diameter of the first measuring tube $18_1$, whereby, as a whole, an optimal exploitation of the available room in the inner space of the transducer housing $7_1$, and also a simple mounting of the oscillation sensors of the sensor arrangement 19 are enabled. Therefore, in an additional embodiment of the invention, each of the oscillation sensors, especially equally constructed, oscillation sensors, of the sensor arrangement 19 is held on two oppositely lying coupling elements of second type.

For lessening possible cross sensitivities of the measuring transducer to pressure, especially also in the case of an as high as possible nominal diameter to installed length ratio $D_{11}/L_{11}$ of greater than 0.1 and an as low as possible oscillatory length to installed length ratio $L_{18x}/L_{11}$ of less than 1.5, the measuring transducer comprises, in an additional embodiment of the invention, a plurality of annular stiffening elements $22_{1A}$ ... $22_{2A}$ ... $22_{3A}$ ... $22_{4A}$ ..., especially equally constructed stiffening elements, of which each is so placed on exactly one of the measuring tubes $18_1$, $18_2$, $18_3$, $18_4$ that it grips around such along one of its, especially circularly orbiting, imaginary peripheral lines; compare, for this, also the initially mentioned U.S. Pat. No. 6,920,798. Especially, it is further provided in this case that, on each of the measuring tubes $18_1$, $18_2$, $18_3$, or $18_4$, at least four of said stiffening elements, especially equally constructed stiffening elements, $22_{1A}$, $22_{1B}$, $22_{1C}$, $22_{1D}$, or $22_{2A}$, $22_{2B}$, $22_{2C}$, $22_{2D}$, and $22_{3A}$, $22_{3B}$, $22_{3C}$, $22_{3D}$, or $22_{4A}$, $22_{4B}$, $22_{4C}$, $22_{4D}$, respectively, are placed. The stiffening elements $22_{1A}$ ... $22_{2A}$ ... $22_{3A}$ ... $22_{4A}$ ... are, in advantageous manner, so placed in the measuring transducer 11 that two adjoining stiffening elements mounted on the same measuring tube have a separation from one another, which amounts to at least 70% of a tube outer diameter of said measuring tube, at most, however, 150% of such tube outer diameter. Proved as especially suitable has been, in such case, a mutual separation of neighboring stiffening elements lying in the range of 80% to 120% of the tube outer diameter of the respective measuring tube $18_1$, $18_2$, $18_3$, or $18_4$.

Figure 3B:
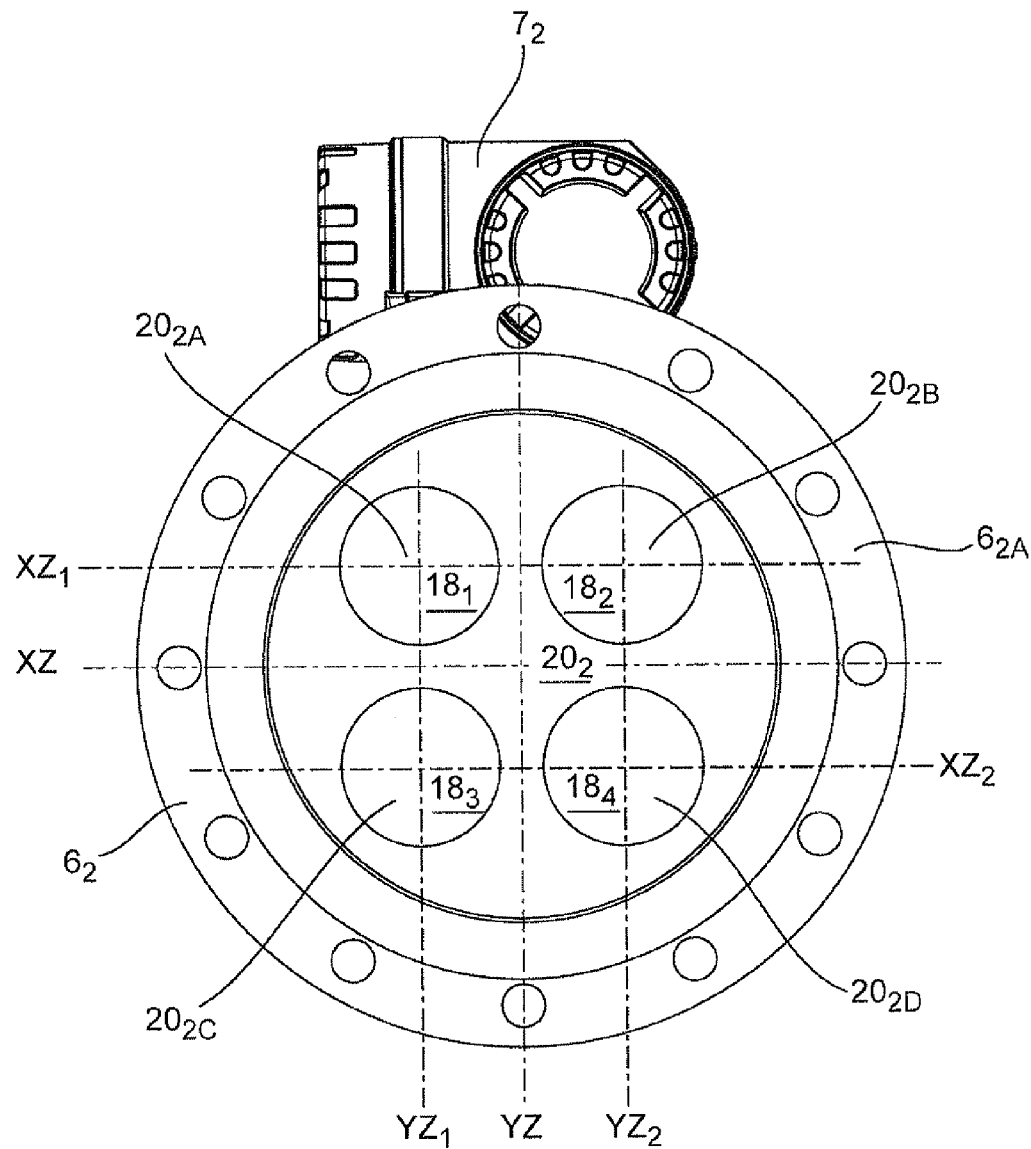
Figure 8:
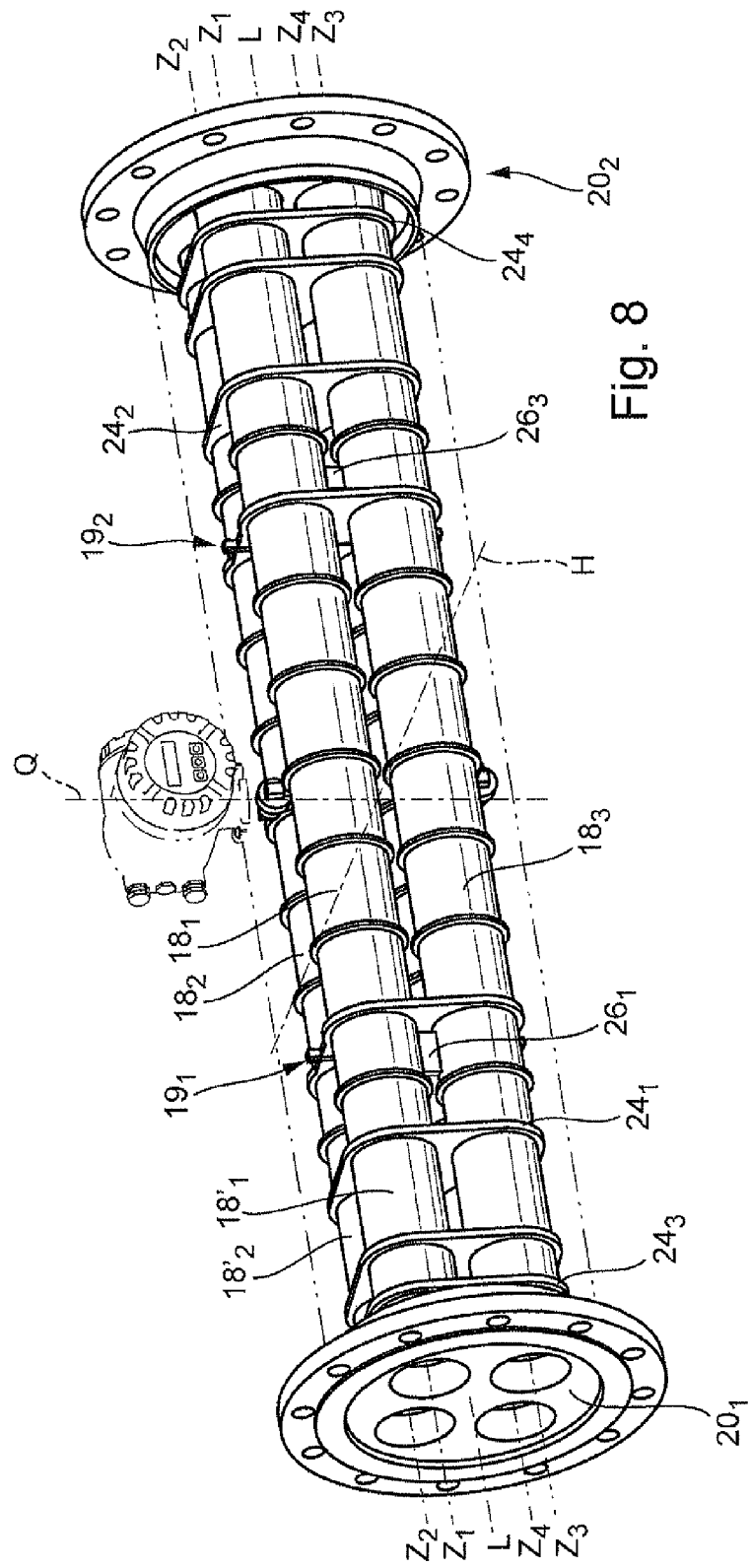
FIG. 8 in perspective side view, a further development of the measuring transducer of FIG. 4, as a component of a measuring system of FIG. 1.
Figure 9A:
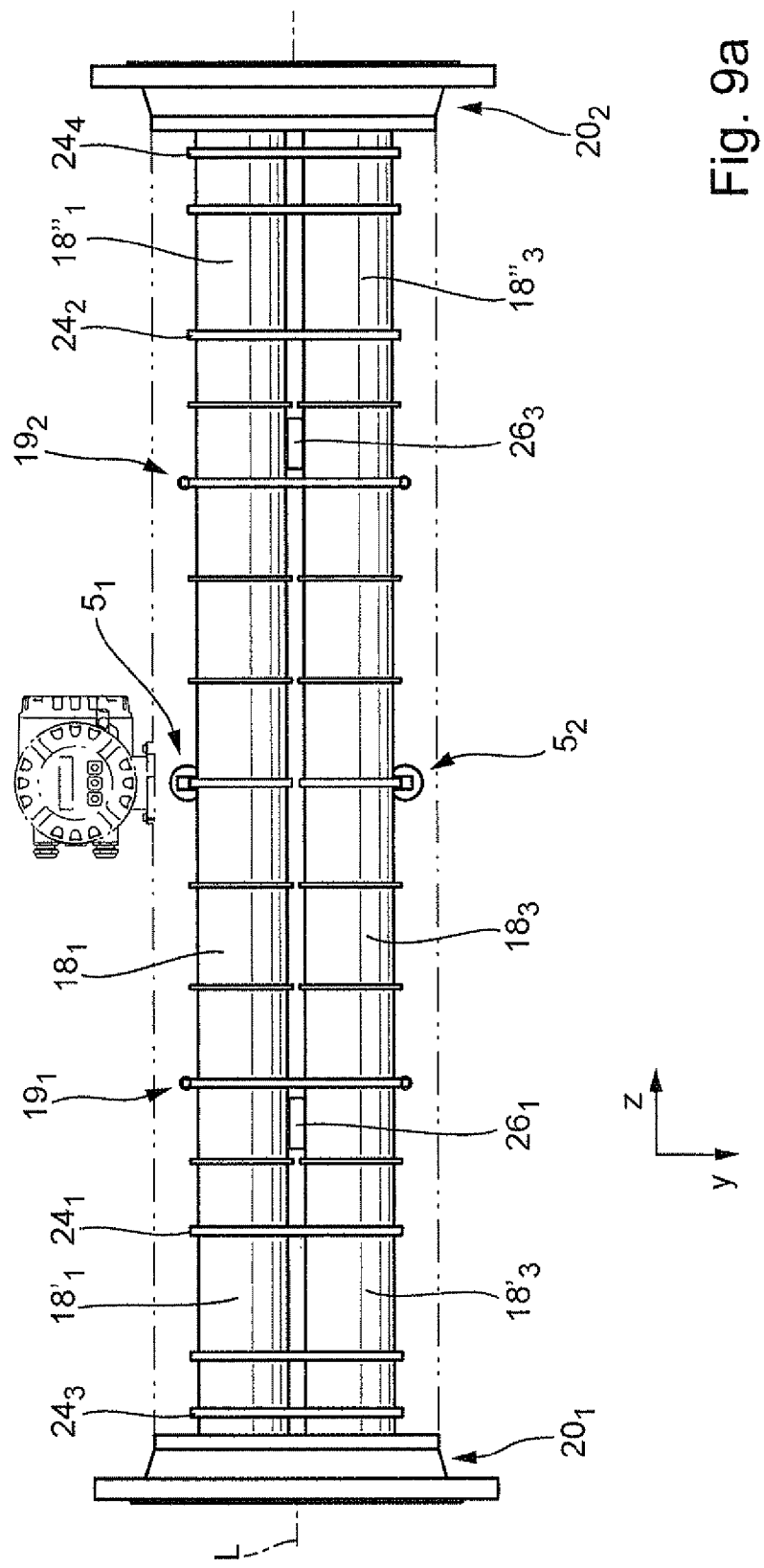
FIGS. 9*a* and 9*b* a projection of the measuring transducer of FIG. 8 in two different side views.
Figure 9B:
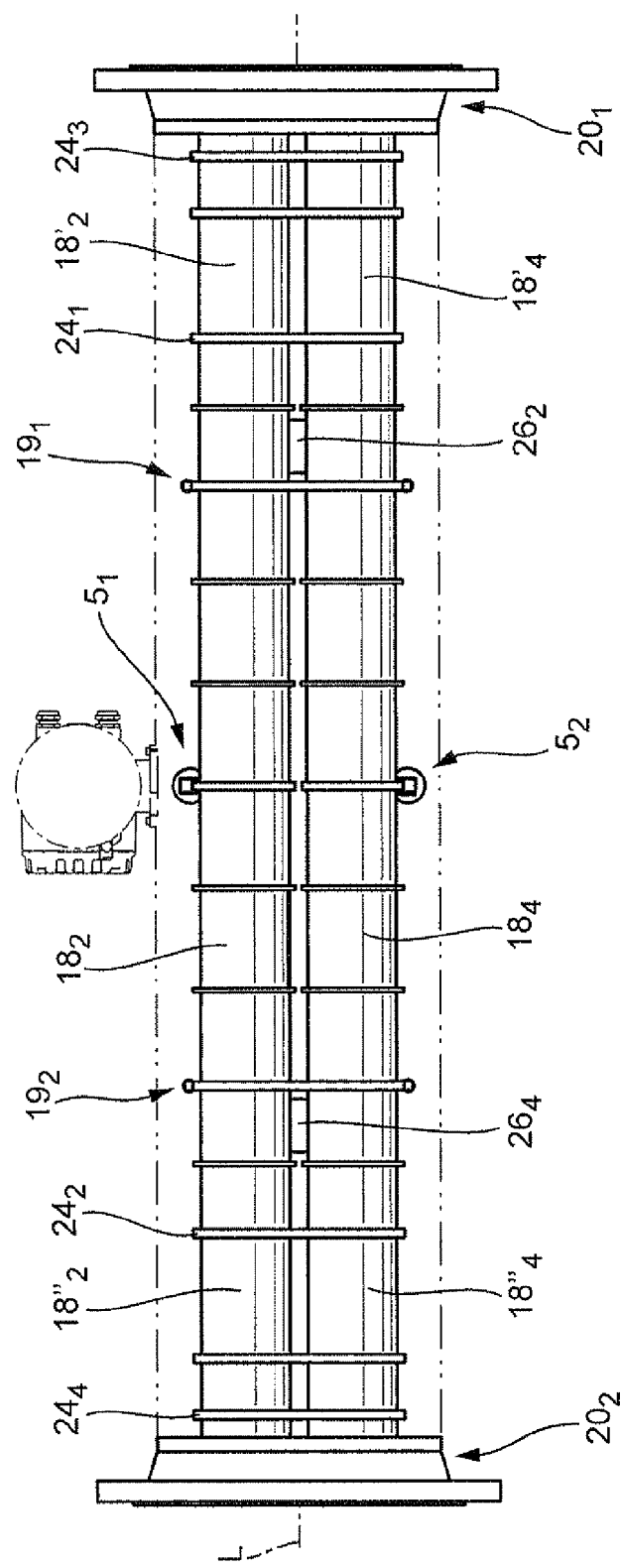

Alternatively thereto or in supplementation thereof, for improving the oscillation characteristics of the tube arrangement and, insofar, also for improving the accuracy of measurement of the measuring transducer, it is additionally provided that the measuring transducer has, as schematically presented in FIGS. 8, 9a and 9b, furthermore, plate-shaped stiffening elements $26_1$, $26_2$, $26_3$, $26_4$ for the tuning the natural eigenfrequencies of bending oscillations of the measuring tubes $18_1$, $18_2$, $18_3$, or $18_4$ also in those oscillation planes $YZ_1$, $YZ_2$ which are, as also evident in combination with FIGS. 3a, 3b, essentially perpendicular to the above mentioned planes of oscillation $XZ_1$, $XZ_2$. The plate-shaped stiffening elements, for example, equally constructed, plate-shaped stiffening elements, $26_1$, $26_2$, $26_3$, $26_4$ are, in such case, especially, so embodied and, in each case, so connected with the measuring tubes that, as a result, at least the bending oscillation, resonance frequencies of the bending oscillations of the measuring tubes $18_1$, $18_2$, $18_3$, or $18_4$ in the wanted mode excited in the aforementioned—primary—oscillation planes $XZ_1$, $XZ_2$ are always lower than the natural eigenfrequencies of bending oscillations of the measuring tubes, which are of equal modal order as the wanted mode, but would be executed within the —, insofar, secondary—oscillation planes $YZ_1$, $YZ_2$. In this way, in very simple, equally as well very effective manner as regards the respective resonance frequencies of the measuring tubes, a significant separating of the bending oscillation modes of the measuring tubes in the mutually perpendicular—here primary and secondary—oscillation planes of the tube arrangement, or the measuring tubes, can be achieved. For such purpose, the measuring transducer comprises, in an additional embodiment of the invention directly evident from the combination of FIGS. 8, 9a, 9b, a first plate shaped, stiffening element $26_1$, which, for tuning one or a plurality of resonance frequencies of bending oscillations of the first measuring tube $18_1$ and of the third measuring tube $18_3$ in a—secondary—third plane of oscillation $YZ_1$ essentially perpendicular to the—primary—oscillation planes $XZ_1$, or $XZ_2$, is, in each case, affixed to the first measuring tube $18_1$ and to the third measuring tube $18_3$, and, indeed, in each case, to a segment $18'_1$, $18'_3$ of the first, and, respectively, third measuring tube $18_1$, $18_3$ lying between the first oscillation exciter $5_1$ and the first flow divider $20_1$. Additionally, the measuring transducer, in the case of this embodiment of the invention, comprises a second plate shaped, stiffening element $26_2$, which, for tuning one or a plurality of resonance frequencies of bending oscillations of the second measuring tube $18_2$ and of the fourth measuring tube $18_4$ in a—secondary—fourth plane of oscillation $YZ_2$ essentially perpendicular to the—primary—oscillation planes $XZ_1$, or $XZ_2$, insofar, thus also essentially parallel to the aforementioned third plane of oscillation $YZ_1$, is affixed to the second measuring tube $18_2$ and to the fourth measuring tube $18_4$, namely, in each case, to a segment $18'_2$, $18'_4$ of the second and, respectively, fourth measuring tube $18_2$, $18_4$ lying between the first oscillation exciter $5_1$ and the first flow divider $20_1$. Moreover, the measuring transducer includes a third plate shaped, stiffening element $26_3$, which, for tuning said resonance frequencies of the first measuring tube $18_1$ and of the third measuring tube $18_3$ in the third plane of oscillation $YZ_1$, is affixed to the first measuring tube $18_1$ and to the third measuring tube $18_3$—here, in each case, to a segment $18''_1$, $18''_3$ of the first and, respectively, third measuring tube $18_1$, $18_3$ lying between the first oscillation exciter $5_1$ and the second flow divider $20_2$—as well as a fourth plate shaped, stiffening element $26_4$, which, for tuning said resonance frequencies of the second measuring tube $18_2$ and of the fourth measuring tube $18_4$ in the fourth plane of oscillation $YZ_2$, is affixed to the second measuring tube $18_2$ and to the fourth measuring tube $18_4$—here, in each case, on a segment $18''_2$, $18''_4$ of the second and, respectively, fourth measuring tube $18_2$, $18_4$ likewise lying between the first oscillation exciter $5_1$ and the second flow divider $20_2$. For example, in such case, the first and second plate-shaped stiffening elements $26_1$, $26_2$ can, in each case, be placed between the first oscillation sensor $19_1$ and the first flow divider $20_1$, especially also between the above mentioned first and third coupling elements $24_1$, $24_3$ of first type, as well as the third and fourth plate-shaped stiffening element $26_3$, $24_4$, can, in each case, be placed between the second oscillation sensor $19_2$ and the second flow divider $20_2$, especially also between the above mentioned second and fourth coupling elements $24_2$, $24_4$ of first type. The plate-shaped stiffening elements can, for example, however, also be so arranged in the measuring transducer that, as well as also evident from the combination of FIGS. 8, 9a, 9b, the first and second plate-shaped stiffening element $26_1$, $26_2$, in each case, is placed between the first coupling element $24_1$ of first type and the first oscillation sensor $19_1$; and the third and fourth plate-shaped stiffening element $26_3$, $26_4$, in each case, is placed between the second coupling element $24_2$ of first type and the second oscillation sensor $19_2$. The plate-shaped stiffening elements can be connected with the respective measuring tubes by soldering, brazing or welding. For example, the stiffening elements can, in such case, be connected with the measuring tubes in such a manner that, as well as also evident from the combination of FIGS. 8, 9a, 9b, the first plate-shaped stiffening element $26_1$ is affixed to the segment $18'_1$ of the first measuring tube $18_1$ lying between the first oscillation sensor $19_1$ and the first flow divider $20_1$, along one of the straight lateral surface elements of the segment—here, for instance that nearest the third measuring tube $18_3$—as well as to the segment $18'_3$ of the third measuring tube $18_3$ lying equally between the first oscillation sensor $19_1$ and the first flow divider $20_1$, along one of the straight lateral surface elements of the segment—here, for instance that nearest the first measuring tube. In manner analogous thereto, then also the second plate-shaped stiffening element $26_2$ is affixed to, respectively, the segments $18'_2$, and $18'_4$ of the second and fourth measuring tubes $18_2$, $18_4$ lying between the first oscillation sensor $19_1$ and the first flow divider $20_1$, the third plate-shaped stiffening element $26_3$ to, respectively, the segments $18''_1$ and $18''_3$ of the first and third measuring tubes $18_1$, $18_3$ lying between the second oscillation sensor $19_2$ and the second flow divider $20_2$, and the fourth plate-shaped stiffening element $26_4$ to, respectively, the segment $18''_2$, $18''_4$ of the second and fourth measuring tubes $18_2$, $18_4$ lying between the second oscillation sensor $19_2$ and the second flow divider $20_2$, and, indeed, in each case, along one of the straight lateral surface elements of the respective measuring tube. For achieving a sufficient separating of the resonance frequencies, each of the four plate-shaped stiffening elements $26_1$, $26_2$, $26_3$, $26_4$ in a further embodiment, is, additionally, so embodied and so placed in the measuring transducer that it has, corresponding to a smallest distance between the lateral surface elements of those two measuring tubes $18_1$, $18_3$, or $18_2$,$18_4$, along which it is, in each case, affixed, a width, which is smaller than a length of the respective plate-shaped stiffening element $26_1$, $26_2$, $26_3$, $26_4$ measured in the direction of said lateral surface elements, for example, in such a manner that the width amounts to less than 50%, especially less than 30%, of said length. Furthermore, it is advantageous, when each of the four plate-shaped stiffening elements $26_1$, $26_2$, $26_3$, $26_4$ additionally, in each case, is so embodied that the length of each of the plate-shaped stiffening elements is greater, for example, more than twice, especially more than 5-times, than an—measured transversely to length and width—associated thickness of the said plate-shaped stiffening element $26_1$, $26_2$, $26_3$, $26_4$. Alternatively, for affixing to the, in each case, nearest lying lateral surface elements, the stiffening elements can, for example, however, also, especially also while ensuring aforementioned width to thickness to length ratios, be so embodied and so connected with the measuring tubes that each of the stiffening elements of the respective two measuring tubes are essentially tangentially contacted, for example, in each case, along the farthest outwardly or, in each case, along the farthest internally lying, lateral element of each of the measuring tubes.

Further investigations with measuring transducers with four straight measuring tubes caused operationally to oscillate in the V-mode have additionally shown that a zero point stability of the measuring transducer can be further increased, or a sensitivity of the zero-point of the measuring transducer for mass flow further lessened, by so embodying the measuring tubes, consequently the tube arrangement formed therewith, that each of the four measuring tubes has, providing at least 40%, especially at least 60%, of the measuring tube length, $L_{18}$, and/or less than 90%, of the measuring tube length, $L_{18}$,—in given cases, however, carrying components of the exciter mechanism, such as, for instance, a permanent magnet, or a cylindrical coil—a middle segment, in which said measuring tube has no mechanical connection with another of the measuring tubes (thus e.g. none of the mentioned coupling elements of second type and/or the mentioned plate-shaped stiffening elements for tuning natural eigenfrequencies of bending oscillations of the measuring tubes $18_1$, $18_2$, $18_3$, or $18_4$ in the oscillation planes $YZ_1$, $YZ_2$) and/or in which it is freely movable relative to the other measuring tubes. It has, namely, been found that it can be advantageous for the desired high zero point stability of measuring transducers of the aforementioned type, when the V-mode has an as low as possible eigenfrequency and, as a result of this, a comparatively large frequency separation from the usually higher eigenfrequencies of the transducer housing can be created. Moreover, it is, in the sense of said zero point stability, advantageous, when the measuring tubes execute no, or in only small measure, torsional oscillations.

Through the application of a tube arrangement having four, V-mode operated, instead of, such as to this point in time, two, straight measuring tubes flowed-through in parallel, it is then also possible to manufacture, cost effectively, measuring transducers of the described type also for large mass flow rates of more than 400 t/h and, respectively, with large nominal diameters of far over 100 mm, on the one hand, with an accuracy of measurement of over 99.8% at an acceptable pressure drop, especially of less than 2 bar, and, on the other hand, with at least retained, high zero point stability, to keep the installed mass, as well as also the empty mass, of such measuring transducers sufficiently within limits, that, in spite of large nominal diameter, the manufacture, transport, installation, as well as also operation can always still occur economically sensibly. Especially also by implementing the above explained measures for further developing the invention—individually or also in combination —, measuring transducers of the type being discussed can also, in the case of large nominal diameter, be so embodied and so dimensioned that a mass ratio of the measuring transducer, as defined by a ratio of the mentioned empty mass of the measuring transducer to a total mass of the tube arrangement, can be kept directly smaller than 3, especially smaller than 2.5.

The invention claimed is:

1. A measuring system for measuring density and/or mass flow rate of a medium flowing in a pipeline said measuring system, comprising:
   a measuring transducer of the vibration type for producing oscillation measurement signals; and
   transmitter electronics electrically coupled with the measuring transducer for activating said measuring transducer and for evaluating oscillation measurement signals delivered from said measuring transducer,
   said measuring transducer includes:
   a transducer housing, with an inlet-side, first housing end formed by means of an inlet-side, first flow divider including four, mutually spaced, flow openings, and with an outlet-side, second housing end formed by means of an outlet-side, second flow divider including four, mutually spaced, flow openings;
   a tube arrangement including four, straight, measuring tubes forming flow paths arranged for parallel flow and connected to said flow dividers, of which measuring tubes:
   a first measuring tube opens with an inlet-side, first measuring tube end into a first flow opening of said first flow divider and with an outlet-side, second measuring tube end into a first flow opening of said second flow divider,
   a second measuring tube opens with an inlet-side, first measuring tube end into a second flow opening of said first flow divider and with an outlet-side, second measuring tube end into a second flow opening of said second flow divider,
   a third measuring tube opens with an inlet-side, first measuring tube end into a third flow opening of said first flow divider and with an outlet-side, second measuring tube end into a third flow opening of said second flow divider,
   and a fourth measuring tube opens with an inlet-side, first measuring tube end into a fourth flow opening of said first flow divider and with an outlet-side, second measuring tube end into a fourth flow opening of said second flow divider,
   and of which measuring tubes each one exhibits a middle segment, in which the respective measuring tube has no mechanical connection with any others of said measuring tubes and/or in which the respective measuring tube is freely movable relative to the other measuring tubes;
   an electromechanical exciter mechanism for producing and/or maintaining mechanical oscillations of said first, second, third and fourth measuring tubes;
   and a vibration sensor arrangement reacting to vibrations of said measuring tubes for producing oscillation measurement signals representing vibrations of said measuring tubes,
   said first, second, third and fourth straight measuring tubes are so embodied and so arranged in the measuring transducer:
   that the tube arrangement exhibits a first imaginary longitudinal section plane, relative to which the tube arrangement is mirror symmetric, said first imaginary longitudinal section plane lying both, between said first measuring tube and said third measuring tube as well as also between said second measuring tube and said fourth measuring tube, and the tube arrangement exhibits a second imaginary longitudinal section plane, relative to which the tube arrangement is likewise mirror symmetric, said second imaginary longitudinal section plane being perpendicular to said imaginary first longitudinal section plane and extending both, between said first measuring tube and said second measuring tube as well as also between said third measuring tube and said fourth measuring tube, and
   that a measuring tube length, corresponding to a minimum distance between the flow opening of said first flow divider corresponding to the respective inlet-side, first measuring tube end and the flow opening of said second flow divider corresponding to the respective outlet-side, second measuring tube end, amounts, for each of said measuring tubes to 1000 mm or more, and each of said middle segments providing at least 40% of the measuring tube length of the respective one of said first, second, third and fourth measuring tubes;
   and said transmitter electronics is adapted to feed electrical excitation power into said exciter mechanism by means of at least one electrical driver signal supplied to said exciter mechanism, wherein:
   the tube arrangement exhibits a natural bending oscillation mode of first type, in which said first measuring tube and said second measuring tube execute, relative to said second imaginary longitudinal section plane, opposite-equal—bending oscillations about, in each case, a static rest position associated with said respective measuring tube, and in which said third measuring tube and said fourth measuring tube execute, relative to said second imaginary longitudinal section plane, opposite-equal bending oscillations about, in each case, a static rest position associated with said respective measuring tube, in such a manner, that, relative to said second imaginary longitudinal section plane, said bending oscillations of said first measuring tube are also opposite-equal to said bending oscillations of said third measuring tube, and that, relative to said second imaginary longitudinal section plane, said bending oscillations of said second measuring tube are also opposite-equal to said bending oscillations of said fourth measuring tube;
   and said exciter mechanism is adapted to convert electrical excitation power at least partially both: into bending oscillations of said first measuring tube and into bending oscillations of said second measuring tube opposite-equal to bending oscillations of said first measuring tube relative to said second imaginary longitudinal section plane of the tube arrangement, as well as also into bending oscillations of said third measuring tube and into bending oscillations of said fourth measuring tube opposite-equal to the bending oscillations of said third measuring tube relative to said second imaginary longitudinal section plane of the tube arrangement, in such a manner that said four measuring tubes execute, at least partially bending oscillations in said natural bending oscillation mode of the first type.

2. The measuring system as claimed in claim 1, wherein:
the middle segment of each of said four measuring tubes provides at least 60% of the measuring tube length, and/or less than 90% of the measuring tube length, of the respective measuring tube.

3. The measuring system as claimed in claim 1, wherein:
said exciter mechanism includes at least a first oscillation exciter acting, especially differentially, on the first and second measuring tubes, especially a first oscillation exciter thereto affixed and/or an electro-dynamic, first oscillation exciter, for converting electrical excitation power fed by means of said transmitter electronics into said exciter mechanism into mechanical exciter forces effecting bending oscillations of said first measuring tube, especially bending oscillations variable and/or periodic with at least one signal frequency corresponding to an eigenfrequency of a natural mode of oscillation of the tube arrangement, and into bending oscillations of said second measuring tube opposite-equal to said bending oscillations of said first measuring tube relative to the second imaginary longitudinal section plane of the tube arrangement.

4. The measuring system as claimed in claim 3, wherein:
said first oscillation exciter is formed by means of a permanent magnet held on said first measuring tube, especially in the region of the middle segment, and a cylindrical coil permeated by the magnetic field of the permanent magnet and held on said second measuring tube, especially in the region of the middle segment.

5. The measuring system as claimed in claim 1, wherein:
said exciter mechanism further comprises a second oscillation exciter acting, especially differentially, on said third and said fourth measuring tubes, especially a second oscillation exciter thereto affixed and/or an electro-dynamic second oscillation exciter and/or one constructed equally to said first oscillation exciter and/or one connected electrically in series with said first oscillation exciter, for converting electrical excitation power fed by means of said transmitter electronics into said exciter mechanism into mechanical exciter forces effecting bending oscillations of said third measuring tube, especially bending oscillations variable and/or periodic with at least one signal frequency corresponding to an eigenfrequency of a natural mode of oscillation of the tube arrangement, and into bending oscillations of said fourth measuring tube opposite-equal to said bending oscillations of said third measuring tube relative to said second imaginary longitudinal section plane of the tube arrangement.

6. The measuring system as claimed in claim 5, wherein:
said second oscillation exciter is formed by means of a permanent magnet held on said third measuring tube and a cylindrical coil permeated by the magnetic field of the permanent magnet and held on said fourth measuring tube, especially in the region of the middle segment.

7. The measuring system as claimed in claim 1, wherein:
said at least one driver signal includes a plurality of signal components with signal frequencies different from one another; and at least one of the signal components of said at least one driver signal, especially a signal component dominating as regards signal power, exhibits a signal frequency corresponding to an eigenfrequency of a natural mode of oscillation of the tube arrangement, especially of the bending oscillation mode of the first type, in which each of said four measuring tubes executes bending oscillations.

8. The measuring system as claimed in claim 1, wherein:
said at least one driver signal is fed to the first oscillation exciter, especially in such a manner that a first exciter current driven by a variable first exciter voltage provided by means of said first driver signal flows through its cylindrical coil.

9. The measuring system as claimed in claim 1, wherein:
said exciter mechanism effects oscillations of said measuring tubes, especially bending oscillations in said first bending oscillation mode of first type, by providing an exciter force generated by means of said first oscillation exciter and acting on said first measuring tube in opposition to an exciter force, especially an opposite-equal exciter force, generated at the same time by means of said first oscillation exciter and acting on said second measuring tube.

10. The measuring system as claimed in claim 1, wherein:
the tube arrangement exhibits a natural bending oscillation mode of the second type, in which said first measuring tube and said second measuring tube execute, relative to said second imaginary longitudinal section plane, opposite equal bending oscillations, especially bending oscillations symmetric relative to said second imaginary longitudinal section plane, about, in each case, a static rest position associated with said respective measuring tube; and in which said third measuring tube and said fourth measuring tube execute, relative to said second imaginary longitudinal section plane, opposite equal bending oscillations, especially bending oscillations symmetric relative to said second imaginary longitudinal section plane, about, in each case, a static rest position associated with said respective measuring tube, in such a manner, that, relative to said second imaginary longitudinal section plane, said bending oscillations of said first measuring tube are also opposite equal to said bending oscillations of said fourth measuring tube, and that, relative to said second imaginary longitudinal section plane, said bending oscillations of said second measuring tube are also opposite equal to said bending oscillations of said third measuring tube.

11. The measuring system as claimed in claim 10, wherein:
an eigenfrequency, of the bending oscillation mode of the first type differs by more than 10 Hz from an eigenfrequency, of the bending oscillation mode of the second type.

12. The measuring system as claimed in claim 10, wherein:
said exciter mechanism is adapted to excite the bending oscillation mode of the second type.

13. The measuring system as claimed in claim 1, wherein:
the measuring tube length, of each of said measuring tubes amounts to more than 1200 mm and/or less than 2500 mm.

14. The measuring system as claimed in claim 1, wherein:
said vibration sensor arrangement is formed by means of an inlet-side, first oscillation sensor as well as by an outlet-side, second oscillation sensor.

15. The measuring system as claimed in claim 1, further comprising:
a first coupling element of the first type first coupling element of the first type, which, for forming inlet-side, oscillation nodes at least for vibrations of said first measuring tube and for thereto opposite-equal vibrations of said second measuring tube, is spaced both from said first flow divider as well as also from said second flow divider and affixed on the inlet side at least to said first measuring tube and to said second measuring tube; as well as a second coupling element of the first type, which, for forming outlet-side oscillation nodes at least for vibrations of said first measuring tube and for thereto opposite-equal vibrations of said second measuring tube, is spaced both from said first flow divider as well as also from said second flow divider as well as also from said first coupling element, and affixed on the outlet side at least to said first measuring tube and to said second measuring tube.

16. The measuring system as claimed in claim 15, wherein: said first coupling element of the first type is also affixed to said third measuring tube and to said fourth measuring tube, said second coupling element of the first type is affixed to said third measuring tube and to said fourth measuring tube; and/or
a center of mass of said first coupling element of the first type exhibits a distance to a center of mass of said measuring transducer, which is essentially equal to a distance of a center of mass of said second coupling element of the first type to said center of mass of said measuring transducer.

17. The measuring system as claimed in claim 11, further comprising:
a third coupling element of the first type, which, for forming inlet-side oscillation nodes at least for vibrations of said third measuring tube and for thereto opposite-equal vibrations of said fourth measuring tube, is spaced both from said first flow divider as well as also from said second flow divider and affixed on the inlet side at least to said third measuring tube and to said fourth measuring tube; as well as
a fourth coupling element of first type, which, for forming outlet-side oscillation nodes at least for vibrations of the third measuring tube and for thereto opposite-equal vibrations of the fourth measuring tube, is spaced both from the first flow divider as well as also from the second flow divider, as well as also from the third coupling element of first type and affixed on the outlet side at least to the third measuring tube and to the fourth measuring tube.

18. The measuring system as claimed in claim 17, wherein: said third coupling element of the first type is spaced, respectively, from said first and second coupling elements of the first type and affixed both to said first measuring tube as well as also to said second measuring tube, and said fourth coupling element of the first type is spaced, respectively, from said first and second coupling elements of the first type and affixed both to said first measuring tube as well as also to said second measuring tube; and/or a center of mass of said third coupling element of the first type exhibits a distance to a center of mass of said measuring transducer, which is essentially equal to a distance of a center of mass of said fourth coupling element of the first type to said center of mass of said measuring transducer, especially in such a manner that the distance of the center of mass of said third coupling element of the first type from the center of mass of said measuring transducer is greater than a distance of the center of mass of said first coupling element of the first type from said center of mass of said measuring transducer and greater than a distance of the center of mass of said second coupling element of the first type from said center of mass of said measuring transducer.

19. The measuring system as claimed in claim 15, wherein: a wanted oscillation length, of each of said measuring tubes corresponding to a minimum distance between said first coupling element of the first type and said second coupling element of the first type amounts to more than 800 mm.

20. The measuring system as claimed in claim 9, wherein: the wanted oscillation length, of each of said measuring tubes amounts to less than 2500 mm.

21. The measuring system as claimed in claim 11, wherein: all four measuring tubes are mechanically connected with one another by means of said first coupling element of the first type as well as by means of said second coupling element of the first type.

22. The measuring system as claimed in claim 21, wherein: said first coupling element of the first type includes a plate shape, especially in such a manner that it exhibits a rectangular, square, round, cross shaped or H shaped, basic shape.

23. The measuring system as claimed in claim 22, wherein: said second coupling element of the first type, especially one exhibiting equally, as said first coupling element of the first type, a plate shape.

24. The measuring system as claimed in claim 15, wherein: said first coupling element of the first type is also affixed to said third measuring tube and to said fourth measuring tube; and said second coupling element of the first type is affixed to said third measuring tube and to said fourth measuring tube.

25. The measuring system as claimed in claim 15, wherein: a center of mass of said first coupling element of the first type exhibits a distance to a center of mass of said measuring transducer, which is essentially equal to a distance of a center of mass of said second coupling element of the first type to said center of mass of said measuring transducer.

26. The measuring system as claimed in claim 15, further comprising:
a third coupling element of the first type, which, for forming inlet-side oscillation nodes at least for vibrations of the third measuring tube and for opposite phase vibrations of said fourth measuring tube, is spaced both from said first flow divider as well as also from said second flow divider and affixed on the inlet side at least to said third measuring tube and to said fourth measuring tube; as well as a fourth coupling element of the first type, which, for forming outlet-side oscillation nodes at least for vibrations, especially bending oscillations, of said third measuring tube and for opposite phase vibrations of said fourth measuring tube, is spaced both from said first flow divider as well as also from said second flow divider, as well as also from said third coupling element of the first type and affixed on the outlet side at least to said third measuring tube and to said fourth measuring tube.

27. The measuring system as claimed in claim 26, wherein: all four measuring tubes are mechanically connected with one another also by means of said third coupling element of the first type as well as by means of said fourth coupling element of the first type.

28. The measuring system as claimed in claim 17, wherein: a center of mass of said third coupling element of the first type exhibits a distance to a center of mass of said measuring transducer, which is essentially equal to a distance of a center of mass of said fourth coupling element of the first type to said center of mass of said measuring transducer.

29. The measuring system as claimed in claim 28, wherein: the distance of the center of mass of said third coupling element of the first type from the center of mass of said measuring transducer is greater than a distance of the center of mass of said first coupling element of the first type from said center of mass of said measuring transducer and greater than a distance of the center of mass of said second coupling element of the first type from said center of mass of said measuring transducer.

30. The measuring system as claimed in claim 15, wherein:
a wanted oscillation length, of said first measuring tube, corresponding to a minimum distance between said first coupling element of the first type and said second coupling element of the first type, amounts to less than 2500 mm.

31. The measuring system as claimed in claim 15, further comprising:
a first coupling element of the second type, which is spaced both from said first coupling element of the first type as well as also from said second coupling element of the first type and affixed to said first measuring tube and to said third measuring tube, but otherwise, however, to no other measuring tube;
a second coupling element of the second type, which is spaced both from said first coupling element of the first type as well as also from said second coupling element of the first type, as well as also from said first coupling element of the second type and affixed to said second measuring tube and to said fourth measuring tube, but otherwise, however, to no other measuring tube;
a third coupling element of the second type, which is spaced both from said first coupling element of the first type as well as also from said second coupling element of the first type, as well as also from said first coupling element of the second type and affixed to said first measuring tube and to said third measuring tube, but otherwise, however, to no other measuring tube;
and a fourth coupling element of the second type, which is spaced both from said first and said second coupling elements of the first type as well as also from said second and said third coupling elements of the second type and affixed, respectively, to said second measuring tube and to said fourth measuring tube, but otherwise, however, to no other measuring tube.

32. The measuring system as claimed in claim 31, wherein:
said first and said second coupling elements of the second type are placed lying opposite one another in said measuring transducer; and said third and said fourth coupling elements of the second type are placed lying opposite one another in said measuring transducer.

33. The measuring system as claimed in claim 1, wherein:
each of the four measuring tubes exhibits a caliber, which amounts to more than 60 mm.

34. The measuring system as claimed in claim 19, wherein:
each of the four measuring tubes exhibits a caliber, which amounts to more than 60 mm, and
a caliber to oscillatory length ratio, of said measuring transducer, defined by a ratio of the caliber, of said first measuring tube to the wanted oscillation length, of said first measuring tube, amounts to more than 0.07.

35. The measuring system as claimed in claim 34, wherein:
the sensor arrangement is formed by means of an inlet-side, first oscillation sensor as well as by means of an outlet-side, second oscillation sensor in a such manner that:
a measuring length, of said measuring transducer corresponding to a minimum distance between said first oscillation sensor and said second oscillation sensor amounts to more than 500 mm, and
a caliber to measuring length ratio, of said measuring transducer, defined by a ratio of the caliber, of said first measuring tube to the measuring length, of said measuring transducer, amounts to more than 0.05.

36. The measuring system as claimed in claim 1, wherein:
said first flow divider includes a flange for connecting said measuring transducer to a tube segment of the pipeline serving for supplying medium to said measuring transducer and said second flow divider includes a flange for connecting said measuring transducer to a tube segment of the pipeline serving for removing medium from said measuring transducer.

37. The measuring system as claimed in claim 36, wherein:
each of said two flanges exhibits a mass of more than 50 kg.

38. The measuring system as claimed in claim 36, wherein:
each of said flanges includes a sealing surface for fluid tight connecting of said measuring transducer with the corresponding tube segment of the pipeline; and a distance between said sealing surfaces of said two flanges defines an installed length, of said measuring transducer.

39. The measuring system as claimed in claim 19, wherein:
each of said flanges includes a sealing surface for fluid tight connecting of said measuring transducer with the corresponding tube segment of the pipeline; and a distance between said sealing surfaces of said two flanges defines an installed length, of said measuring transducer, and
an oscillatory length to installed length ratio, of said measuring transducer, defined by a ratio of the wanted oscillation length, of said first measuring tube to the installed length, of said measuring transducer, amounts to more than 0.55.

40. The measuring system as claimed in claim 39, wherein:
each of the four measuring tubes exhibits a caliber, which amounts to more than 60 mm, and
a caliber to installed length ratio, of said measuring transducer, defined by a ratio of the caliber, of said first measuring tube to the installed length, of said measuring transducer, amounts to more than 0.02.

41. The measuring system as claimed in claim 38, wherein:
a measuring tube length to installed length ratio, of said measuring transducer, defined by a ratio of the measuring tube length, of said first measuring tube to the installed length, of said measuring transducer, amounts to more than 0.7.

42. The measuring system as claimed in claim 1, wherein:
the measuring tube length, of said first measuring tube amounts to more than 1200 mm and/or less than 2000 mm.

43. The measuring system as claimed in claim 1, wherein:
each of the four measuring tubes is so arranged that a smallest lateral distance of each of said four measuring tubes from a housing side wall of said transducer housing amounts, in each case, to greater than 3 mm and/or greater than twice a respective tube wall thickness; and/or that a smallest lateral distance between two neighboring measuring tubes amounts, in each case, to greater than 3 mm and/or greater than the sum of their respective tube wall thicknesses.

44. The measuring system as claimed in claim 1, wherein:
each of the flow openings is so arranged, that a smallest lateral distance of each of said flow openings from a housing side wall of said transducer housing amounts, in each case, to greater than 3 mm and/or greater than twice a smallest tube wall thickness of the measuring tubes; and/or that a smallest lateral distance between said flow openings amounts to greater than 3 mm and/or greater than twice a smallest tube wall thickness of the measuring tubes.

45. The measuring system as claimed in claim 1, further comprising:
a plurality of annular stiffening elements serving for increasing the oscillation quality factor of said measuring tubes, wherein:
each stiffening element is so placed on exactly one of the measuring tubes that it grips around such along one of its peripheral lines.

46. The measuring system as claimed in claim 45, wherein:
at least four annular stiffening elements are placed on each of said measuring tubes.

47. The measuring system as claimed in claim 46, wherein:
said stiffening elements are so placed in said measuring transducer that two adjoining stiffening elements mounted on the same measuring tube exhibit a separation from one another, which amounts to at least 70% of a tube outer diameter, of said measuring tube, at most, however, to 150% of said tube outer diameter.

48. The measuring system as claimed in claim 1, wherein:
said sensor arrangement is formed by means of an inlet-side, first oscillation sensor as well as by an outlet-side, second oscillation sensor.

49. The measuring system as claimed in claim 48, wherein:
said sensor arrangement is formed by means of an inlet-side, third oscillation sensor as well as by means of an outlet-side, fourth oscillation sensor.

50. The measuring system as claimed in claim 49, wherein:
said first and said third oscillation sensors are electrically serially interconnected in such a manner that a common oscillation measurement signal represents shared inlet-side, oscillations of said first and said third measuring tubes relative to said second and said fourth measuring tubes.

51. The measuring system as claimed in claim 50, wherein:
said second and said fourth oscillation sensors are electrically serially interconnected in such a manner that a common oscillation measurement signal represents shared outlet-side, oscillations of said first and said third measuring tubes relative to said second and said fourth measuring tubes.

52. The measuring system as claimed in claim 48, wherein:
said first oscillation sensor is formed by means of a permanent magnet held on said first measuring tube and a cylindrical coil held on said second measuring tube and permeated by the magnetic field of the respective permanent magnet; and said second oscillation sensor is formed by means of a permanent magnet held on said first measuring tube and a cylindrical coil held on said second measuring tube and permeated by the magnetic field of the respective permanent magnet.

53. The measuring system as claimed in claim 49, wherein:
said third oscillation sensor is formed by means of a permanent magnet held on said third measuring tube and a cylindrical coil held on said fourth measuring tube and permeated by the magnetic field of the respective permanent magnet; and said fourth oscillation sensor is formed by means of a permanent magnet held on said third measuring tube and a cylindrical coil held on said fourth measuring tube and permeated by the magnetic field of the respective permanent magnet.

54. The measuring system as claimed in claim 49, wherein:
a measuring length, of said measuring transducer corresponding to a minimum distance between said first oscillation sensor and said second oscillation sensor amounts to more than 500 mm.

55. The measuring system as claimed in claim 54, wherein:
a measuring length to installed length ratio, of said measuring transducer, defined by a ratio of the measuring length, to the installed length, of said measuring transducer, amounts to more than 0.3.

56. The measuring system as claimed in claim 19, wherein:
a measuring length to oscillatory length ratio, of said measuring transducer, defined by a ratio of the measuring length, of said measuring transducer to the wanted oscillation length, of said first measuring tube, amounts to more than 0.6.

57. The measuring system as claimed in claim 38, wherein:
a measuring length to installed length ratio, of said measuring transducer, defined by a ratio of the measuring length, to the installed length, of said measuring transducer, amounts to more than 0.3.

58. The measuring system as claimed in claim 33, wherein:
a caliber to measuring length ratio, of said measuring transducer, defined by a ratio of the caliber, of said first measuring tube to the measuring length, of said measuring transducer, amounts to more than 0.05.

59. The measuring system as claimed in claim 19, wherein:
a measuring length to oscillatory length ratio, of said measuring transducer, defined by a ratio of the measuring length, of said measuring transducer to the wanted oscillation length, of said first measuring tube, amounts to more than 0.6.

60. The measuring system as claimed in claim 48, wherein:
each of said oscillation sensors of said sensor arrangement is held, respectively, to two coupling elements of the second type lying opposite to one another.

61. The measuring system as claimed in claim 60, wherein:
both the first oscillation sensor and also said third oscillation sensor are held, respectively, to said third and said fourth coupling elements of the second type, especially in such a manner that a minimum distance between said first and said third oscillation sensors is more than twice as large as a tube outer diameter of said first measuring tube.

62. The measuring system as claimed in claim 61, wherein:
both said second oscillation sensor and also said fourth oscillation sensor are held, respectively, to said fifth and said sixth coupling element of the second type, especially in such a manner that a minimum distance between said second and said fourth oscillation sensors is more than twice as large as a tube outer diameter of said first measuring tube.

63. The measuring system as claimed in claim 1, wherein:
a mass ratio, of an empty mass, of the total measuring transducer to an empty mass, of said first measuring tube is greater than 10.

64. The measuring system as claimed in claim 1, wherein:
each of said two flow dividers has a mass of more than 20 kg.

65. The measuring system as claimed in claim 1, wherein:
an empty mass, of said first measuring tube.

66. The measuring system as claimed in claim 1, wherein:
an empty mass, of said measuring transducer is greater than 200 kg.

67. The measuring system as claimed in claim 1, wherein:
a nominal diameter, of said measuring transducer, which corresponds to a caliber of the pipeline, in whose course said measuring transducer is to be used, amounts to more than 100 mm.

68. The measuring system as claimed in claim 66, wherein:
a mass to nominal diameter ratio, of said measuring transducer, defined by a ratio of the empty mass, of said measuring transducer to the nominal diameter, of said measuring transducer, is less than 2 kg/mm.

69. The measuring system as claimed in claim 38, wherein: a nominal diameter to installed length ratio, of said measuring transducer, defined by a ratio of said nominal diameter of the measuring transducer to the installed length of said measuring transducer, is less than 0.3.

70. The measuring system as claimed in claim 38, wherein: said four measuring tubes are equal as regards material of tube walls and/or as regards their geometric dimensions.

71. The measuring system as claimed in claim 38, wherein: the tube walls of said four measuring tubes are, at least partially, titanium and/or zirconium and/or duplex steel and/or super duplex steel.

72. The measuring system as claimed in claim 38, wherein: said transducer housing, said flow dividers and tube walls of said measuring tubes comprise, in each case, steel.

73. The measuring system as claimed in claim 1, wherein: each of said measuring tubes has a bending oscillation, fundamental mode of minimum bending oscillation, resonance frequency; and the minimum bending oscillation, resonance frequencies of all said four measuring tubes are essentially equal.

74. The measuring system as claimed in claim 38, wherein: said four flow openings of said first flow divider are so arranged that imaginary areal centers of gravity associated with cross sectional areas of said flow openings of said first flow divider form the vertices of an imaginary square; and said cross sectional areas lie in a shared imaginary, cutting plane of said first flow divider extending perpendicularly to a longitudinal axis of said measuring transducer.

75. The measuring system as claimed in claim 1, wherein: said four flow openings of said second flow divider are so arranged that imaginary areal centers of gravity associated with cross sectional areas, especially circularly shaped, cross sectional areas, of said flow openings of said second flow divider form the vertices of an imaginary square; and said cross sectional areas lie in a shared imaginary cutting plane of said second flow divider extending perpendicularly to a longitudinal axis of said measuring transducer, especially a longitudinal axis parallel to a principal flow axis of said measuring transducer.

76. The measuring system as claimed in claim 48, further comprising:
a first plate shaped, stiffening element, which, for tuning resonance frequencies of bending oscillations of said first measuring tube and of said third measuring tube in a third plane of oscillation essentially perpendicular to said first and/or said second plane of oscillation; is affixed to said first measuring tube and to said third measuring tube, and, indeed, in each case, to a segment of said first, and, respectively, said third measuring tube lying between said first oscillation exciter and said first flow divider; a second plate shaped, stiffening element, which, for tuning resonance frequencies of bending oscillations of said second measuring tube and of said fourth measuring tube in a fourth plane of oscillation essentially perpendicular to said first and/or said second plane of oscillation, is affixed to said second measuring tube and to said fourth measuring tube, and, indeed, in each case, to a segment of said second and, respectively, said fourth measuring tube lying between said first oscillation exciter and said first flow divider; a third plate shaped, stiffening element, which, for tuning resonance frequencies of bending oscillations of said first measuring tube and of said third measuring tube in said third plane of oscillation, is affixed to said first measuring tube and to said third measuring tube, and, indeed, in each case, to a segment of said first, and, respectively, said third measuring tube lying between said first oscillation exciter and said second flow divider; as well as a fourth plate shaped, stiffening element, which, for tuning resonance frequencies of bending oscillations of said second measuring tube and of said fourth measuring tube in the said fourth plane of oscillation, is affixed to said second measuring tube and to said fourth measuring tube, and, indeed, in each case, to a segment of said second and, respectively, said fourth measuring tube lying between said first oscillation exciter and said second flow divider.

77. The measuring system as claimed in claim 76, wherein: said first plate-shaped stiffening element is placed between said first oscillation sensor and said first flow divider; said second plate-shaped stiffening element is placed between said first oscillation sensor and said first flow divider; said third plate-shaped stiffening element is placed between said second oscillation sensor and said second flow divider; and said fourth plate-shaped stiffening element is placed between said second oscillation sensor and said second flow divider.

78. The measuring system as claimed in claim 77, wherein: said first plate-shaped stiffening element is placed between said first coupling element of the first type and said third coupling element of the first type; said second plate-shaped stiffening element is placed between said first coupling element of the first type and said third coupling element of the first type; said third plate-shaped stiffening element is placed between said second coupling element of the first type and said fourth coupling element of the first type; and said fourth plate-shaped stiffening element is placed between said second coupling element of the first type and said fourth coupling element of the first type.

79. The measuring system as claimed in claim 77, wherein: said first plate-shaped stiffening element is placed between said first coupling element of the first type and said first oscillation sensor; said second plate-shaped stiffening element is placed between said first coupling element of the first type and said first oscillation sensor; said third plate-shaped stiffening element is placed between said second coupling element of the first type and said second oscillation sensor; and said fourth plate-shaped stiffening element is placed between said second coupling element of the first type and said second oscillation sensor.

80. The measuring system as claimed in claim 79, wherein: said first plate-shaped stiffening element is affixed to the segment of said first measuring tube lying between said first oscillation sensor and said first flow divider along one of its straight lateral surface elements as well as to the segment of said third measuring tube lying between said first oscillation sensor and said first flow divider, along one of its straight lateral surface elements; said second plate-shaped stiffening element is affixed to said segment of said second measuring tube lying between said first oscillation sensor and said first flow divider, along one of its straight lateral surface elements, as well as to the segment of said fourth measuring tube lying between said first oscillation sensor and said first flow divider, along one of its straight lateral surface elements; said third plate-shaped stiffening element is affixed to the segment of said first measuring tube lying between said second oscillation sensor and said second flow divider, along one of its straight lateral surface elements as well as to the segment of said third measuring tube lying between said second oscillation sensor and said second flow divider, along one of its straight lateral surface elements; and said fourth plate-shaped stiffening element is affixed to the segment of said second measuring tube lying between said second oscillation sensor and said second flow divider, along one of its straight lateral surface elements as well as to the segment of said fourth measuring tube lying between said second oscillation sensor and said second flow divider, along one of its straight lateral surface elements.

81. The measuring system as claimed in claim 80, wherein: each of said four plate-shaped stiffening elements is so embodied and so placed in said measuring transducer that it has a width corresponding to a smallest distance between the lateral surface elements of those two measuring tubes, along which it is, in each case, affixed; and the width is smaller than a length of said plate-shaped stiffening element measured in the direction of said lateral surface elements.

82. The measuring system as claimed in claim 81, wherein: each of said four plate-shaped stiffening elements is, in each case, so embodied that the length of each of said plate-shaped stiffening elements is greater than a thickness of said plate-shaped stiffening elements.

83. The measuring system as claimed in claim 1, wherein: a middle segment of said transducer housing is formed by means of a straight tube, especially a circularly cylindrical, straight tube.

84. The measuring system as claimed in claim 1, wherein: said transducer housing is embodied essentially tubularly.

85. The measuring system as claimed in claim 84, wherein: said transducer housing has a largest housing inner diameter, which is greater than 150 mm.

86. The measuring system as claimed in claim 85, wherein: a housing to measuring tube inner diameter ratio, of said measuring transducer, defined by a ratio of the largest housing inner diameter, to a caliber, of said first measuring tube, is greater than 3.

87. The measuring system as claimed in claim 85, wherein: a housing inner diameter to nominal diameter ratio, of said measuring transducer, defined by a ratio of the largest housing inner diameter, to the nominal diameter, of said measuring transducer, is less than 1.5.

88. The measuring system as claimed in claim 87, wherein: said housing inner diameter to nominal diameter ratio, of said measuring transducer is equal to one.

89. The measuring system as claimed in claim 1, wherein: said transmitter electronics, based on electrical excitation power converted in said exciter mechanism, generates a viscosity measured value representing viscosity of the flowing medium; and/or said transmitter electronics, based on oscillation signals delivered by the measuring transducer, generates a mass flow measured value representing mass flow rate of the flowing medium and/or density measured value representing density of the flowing medium.

90. The use of a measuring system as claimed in claim 1, wherein:
for measuring density and/or mass flow rate and/or viscosity and/or Reynolds number of a medium flowing in a process line at least at times, with mass flow rate of more than 400 t/h.

* * * * *